United States Patent
Kawazu et al.

(10) Patent No.: US 11,463,647 B2
(45) Date of Patent: Oct. 4, 2022

(54) IMAGING DEVICE, IMAGING SYSTEM, AND IMAGING METHOD

(71) Applicant: SONY SEMICONDUCTOR SOLUTIONS CORPORATION, Kanagawa (JP)

(72) Inventors: Naoki Kawazu, Kanagawa (JP); Mohammad Munirul Haque, San Jose, CA (US); Yuichi Motohashi, Tokyo (JP); Atsushi Suzuki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 8 days.

(21) Appl. No.: 16/976,748

(22) PCT Filed: Jan. 31, 2019

(86) PCT No.: PCT/JP2019/003410
§ 371 (c)(1),
(2) Date: Aug. 29, 2020

(87) PCT Pub. No.: WO2019/171839
PCT Pub. Date: Sep. 12, 2019

(65) Prior Publication Data
US 2020/0412993 A1 Dec. 31, 2020

Related U.S. Application Data

(60) Provisional application No. 62/639,553, filed on Mar. 7, 2018.

(51) Int. Cl.
*H04N 5/335* (2011.01)
*H04N 5/378* (2011.01)
(Continued)

(52) U.S. Cl.
CPC ........ *H04N 5/378* (2013.01); *H04N 5/23229* (2013.01); *H04N 5/3698* (2013.01); *H04N 5/379* (2018.08)

(58) Field of Classification Search
CPC .. H04N 5/378; H04N 5/23229; H04N 5/3698; H04N 5/379
See application file for complete search history.

(56) References Cited

U.S. PATENT DOCUMENTS

2014/0226027 A1* 8/2014 Johansson ............ H04N 17/002
348/187
2018/0324373 A1* 11/2018 Kim ......................... H04N 5/30

FOREIGN PATENT DOCUMENTS

JP 2002-027916 A 1/2002
JP 2006-314025 A 11/2006
(Continued)

OTHER PUBLICATIONS

International Search Report and Written Opinion of PCT Application No. PCT/JP2019/003410, dated Jan. 31, 2019, 07 pages of ISRWO.

*Primary Examiner* — Kelly L Jerabek
(74) *Attorney, Agent, or Firm* — Chip Law Group

(57) ABSTRACT

An imaging device includes an imaging unit that generates image data on the basis of a first power voltage, an image processing unit that performs image processing on the image data on the basis of a second power voltage, a reference voltage generating unit that generates a first reference voltage on the basis of the first power voltage, and a first flag generating unit that generates a first flag signal for the second power voltage on the basis of a comparison of the second power voltage and the first reference voltage and outputs the first flag signal.

17 Claims, 39 Drawing Sheets

(51) Int. Cl.
*H04N 5/369* (2011.01)
*H04N 5/232* (2006.01)

(56) References Cited

FOREIGN PATENT DOCUMENTS

| | | |
|---|---|---|
| JP | 2008-079240 A | 4/2008 |
| WO | 2017/078312 A1 | 5/2017 |

* cited by examiner

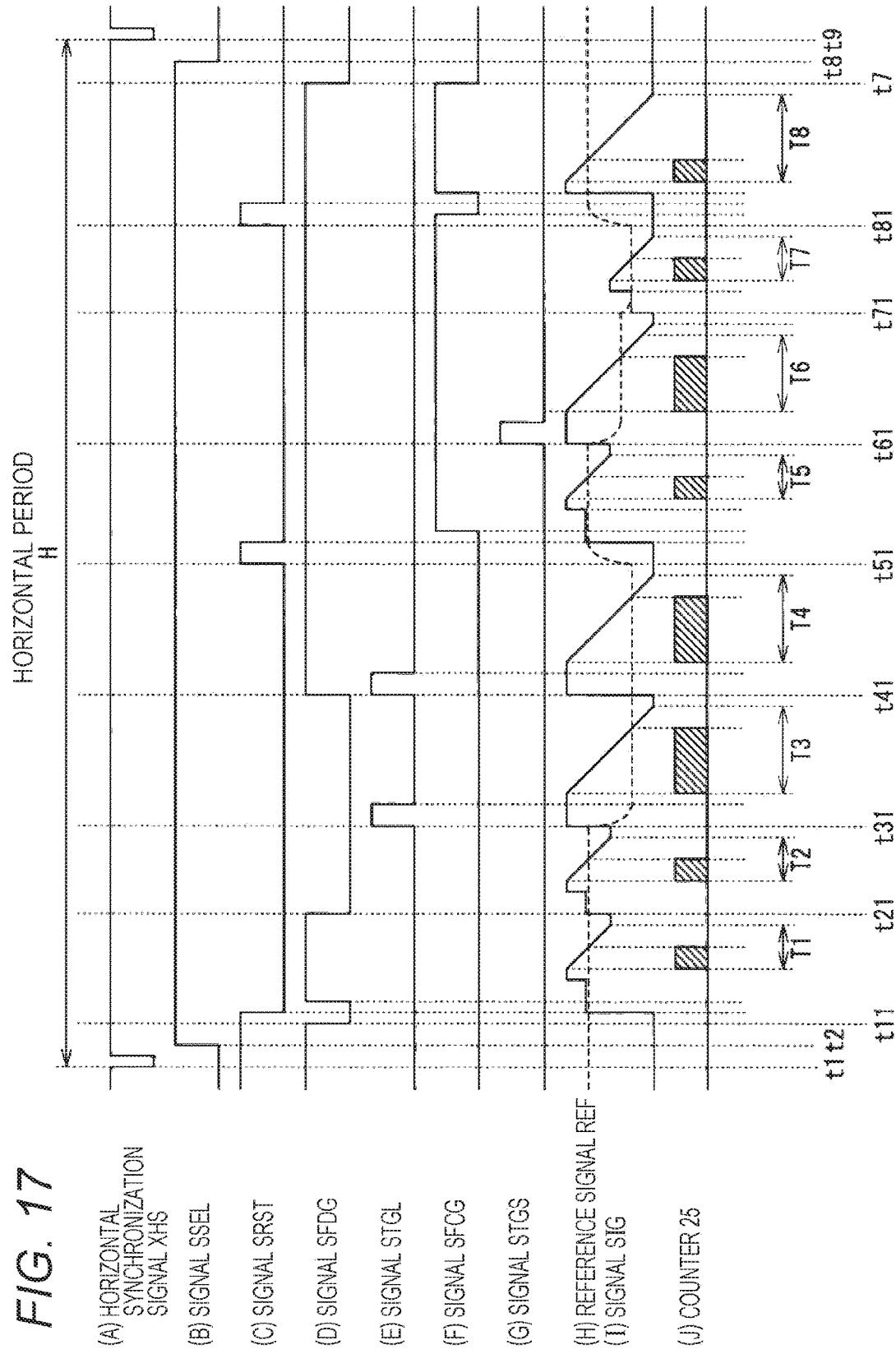

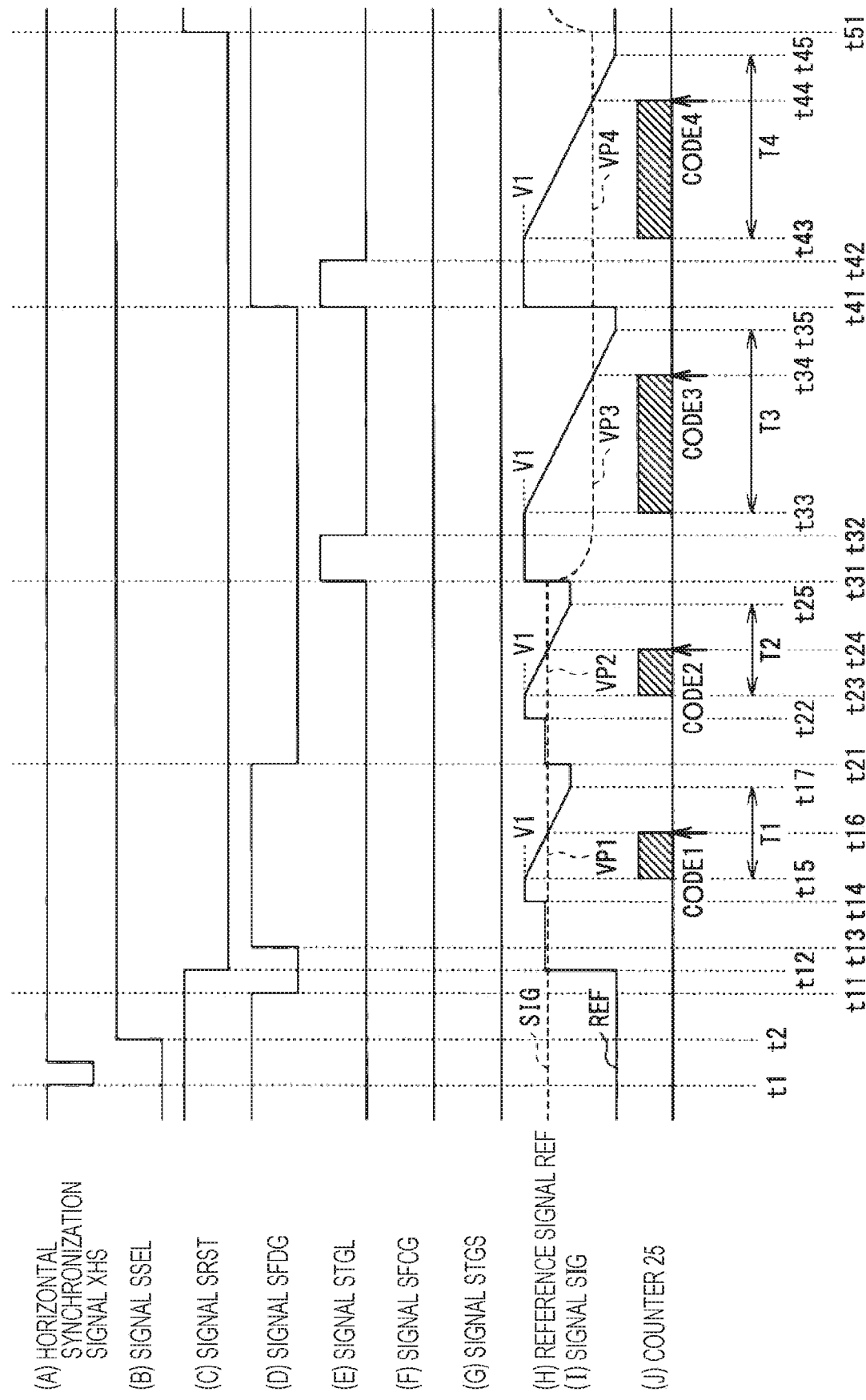

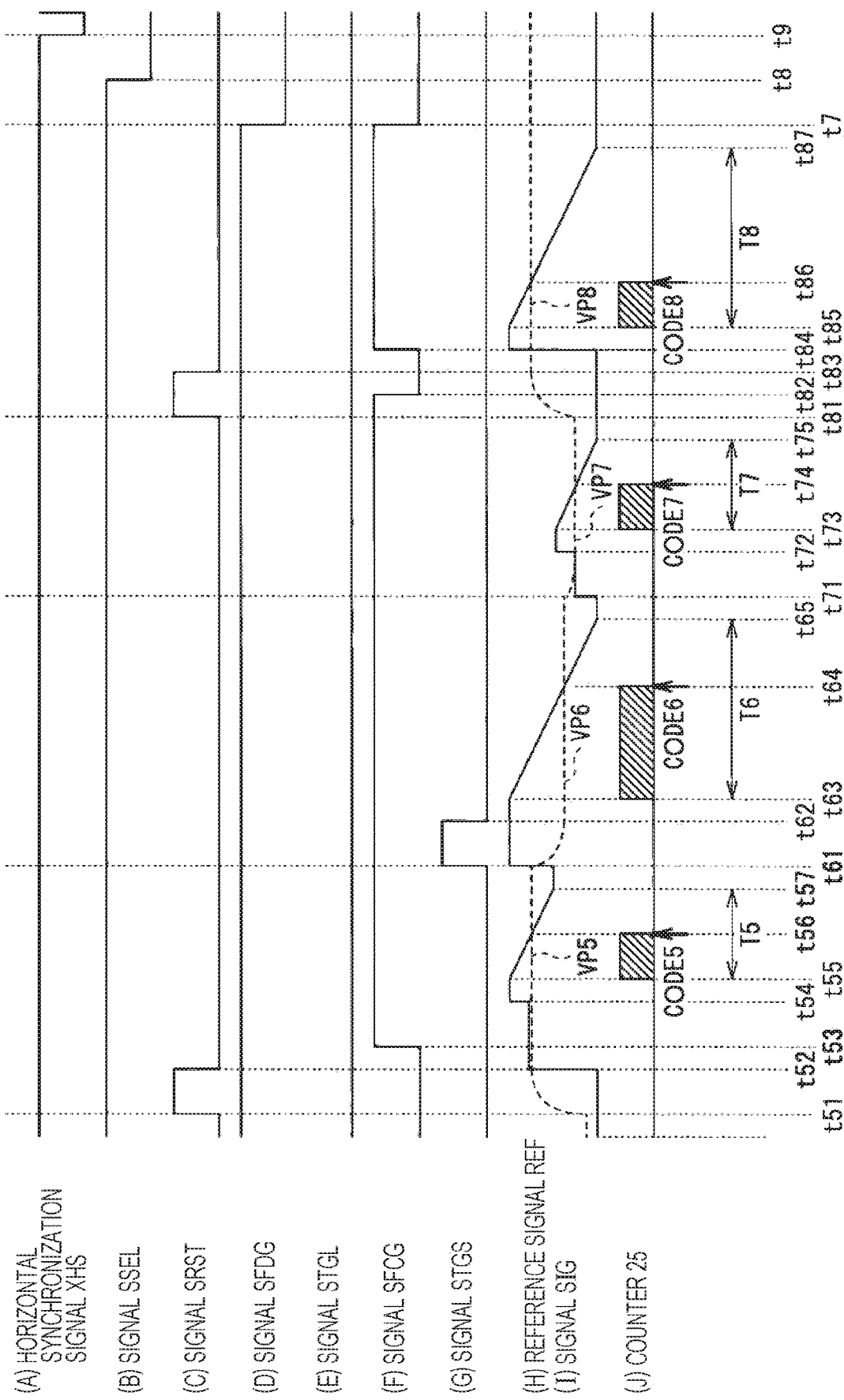

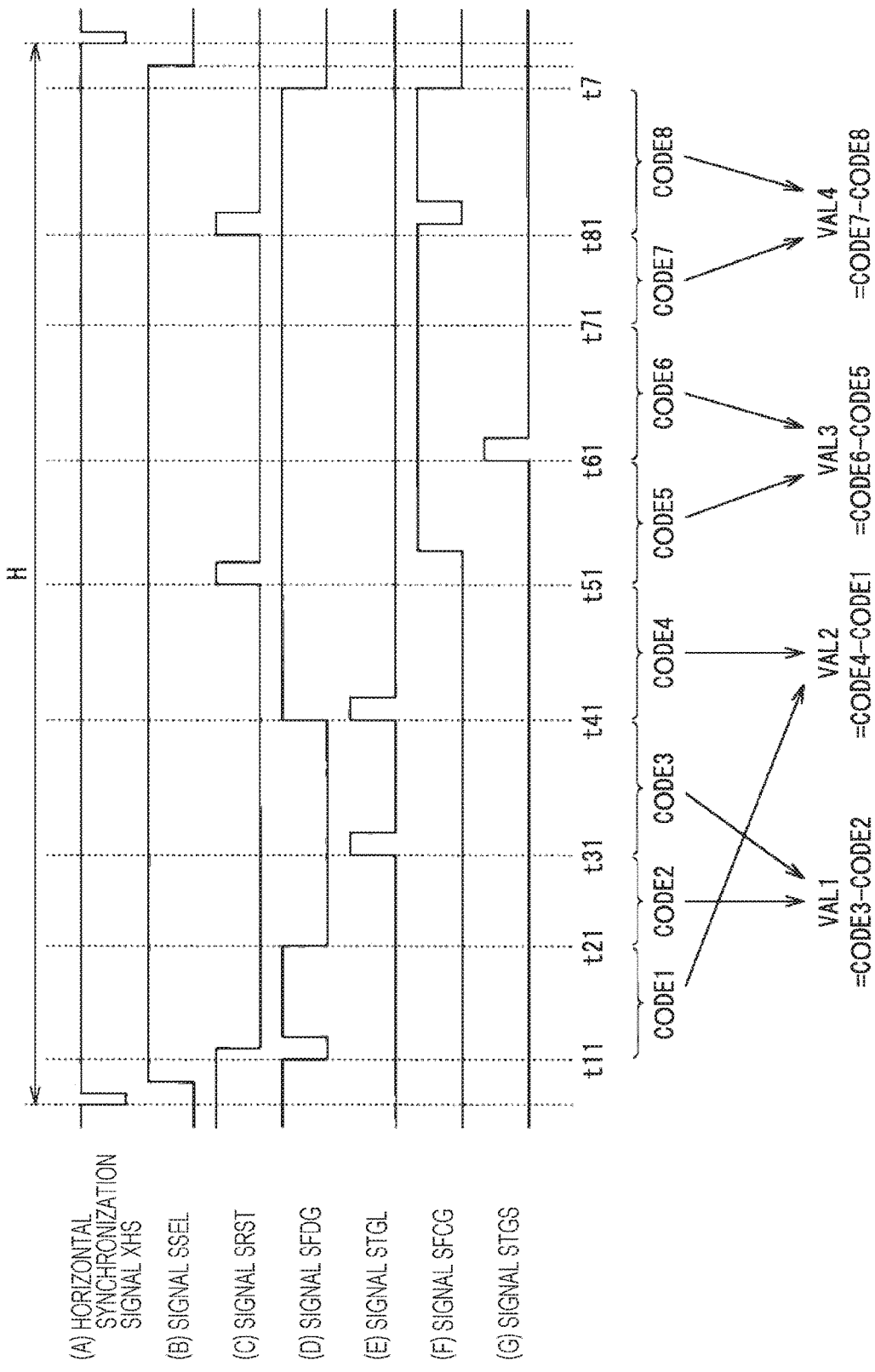

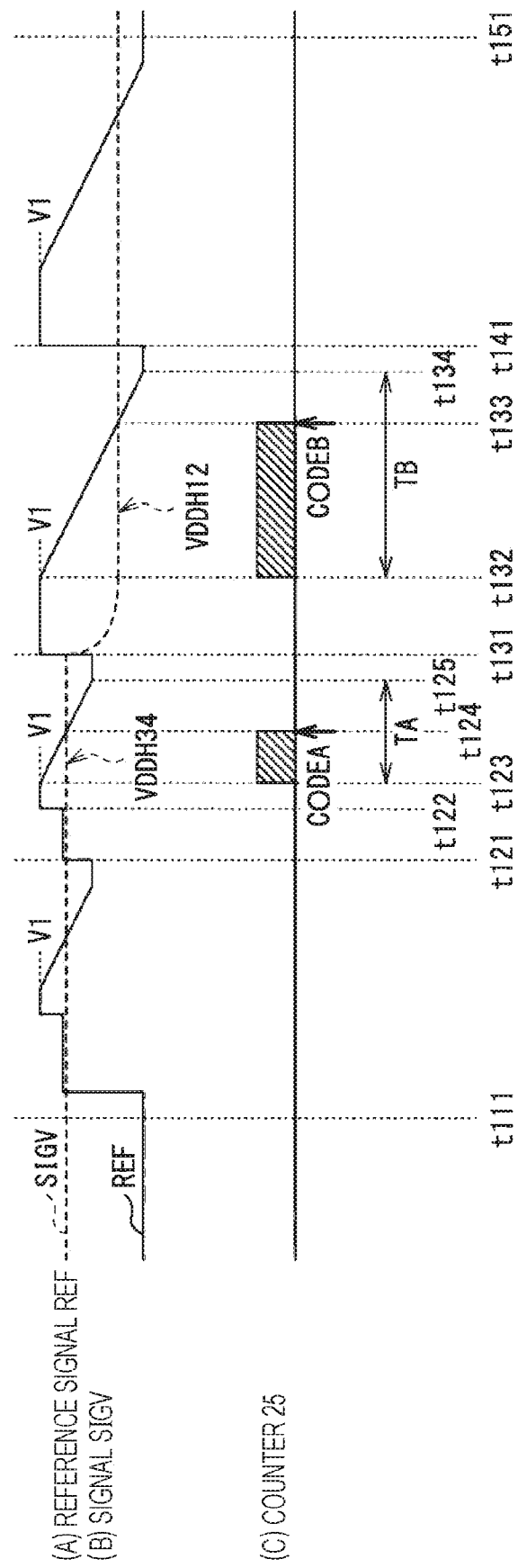

IMAGING DEVICE, IMAGING SYSTEM, AND IMAGING METHOD

CROSS REFERENCE TO RELATED APPLICATIONS

This application is a U.S. National Phase of International Patent Application No. PCT/JP2019/003410 filed on Jan. 31, 2019, which claims the benefit of U.S. Patent Application 62/639,553 filed Mar. 7, 2018. Each of the above-referenced applications is hereby incorporated herein by reference in its entirety.

TECHNICAL FIELD

The present disclosure relates to an imaging device, an imaging system, and an imaging method which are capable of performing an imaging operation.

BACKGROUND ART

For example, an imaging device which detects a defect in a case in which the defect occurs is known (for example, Patent Literature 1).

CITATION LIST

Patent Literature

[PTL 1]
Japanese Patent Application Laid-Open No. 2002-027916

SUMMARY

Technical Problem

In the imaging device, it is desired to be able to detect the defect in a case in which the defect occurs as described above.

It is desirable to provide an imaging device, an imaging system, and an imaging method which are capable of detecting the defect in a case in which the defect occurs.

Solution to Problem

An imaging device according to an embodiment of the present disclosure includes an imaging unit, an image processing unit, a reference voltage generating unit, and a first flag generating unit. The imaging unit is capable of generating image data by performing an imaging operation on the basis of a first power voltage. The image processing unit is capable of performing image processing on the image data on the basis of a second power voltage. The reference voltage generating unit is capable of generating a first reference voltage on the basis of the first power voltage. The first flag generating unit is capable of comparing the second power voltage with the first reference voltage and generating a first flag signal for the second power voltage and capable of outputting the first flag signal.

Here, the "imaging device" is not limited to a so-called image sensor and includes an electronic device having an imaging function such as a digital camera or a smartphone.

The imaging system according to an embodiment of the present disclosure includes an imaging device and a processing device. The imaging device can be mounted on a vehicle and is capable of imaging a peripheral region of a vehicle and generating an image. The processing device can be mounted on the vehicle and is capable of executing a process of controlling the vehicle on the basis of the image. The imaging device includes an imaging unit, an image processing unit, a reference voltage generating unit, and a first flag generating unit. The imaging unit is capable of generating image data by performing an imaging operation on the basis of a first power voltage. The image processing unit is capable of performing image processing on the image data on the basis of a second power voltage. The reference voltage generating unit is capable of generating a first reference voltage on the basis of the first power voltage. The first flag generating unit is capable of comparing the second power voltage with the first reference voltage and generating a first flag signal for the second power voltage and capable of outputting the first flag signal.

An imaging method according to an embodiment of the present disclosure embodiment including generating image data by performing an imaging operation on the basis of a first power voltage, performing image processing on the image data on the basis of a second power voltage, generating a first reference voltage on the basis of the first power voltage, and comparing the second power voltage with the first reference voltage, generating a first flag signal for the second power voltage, and outputting the first flag signal.

In the imaging device, the imaging system, and the imaging method according to an embodiment of the present disclosure, the imaging operation is performed on the basis of the first power voltage, and the image data is generated. Further, image processing is performed on the image data on the basis of the second power voltage. The first reference voltage is generated on the basis of the first power voltage. Then, the second power voltage and the first reference voltage are compared, and the first flag signal for the second power voltage is generated. Then, the first flag signal is output.

Advantageous Effects

According to the imaging device, the imaging system, and the imaging method in an embodiment of the present disclosure, the first reference voltage is generated on the basis of the first power voltage, the second power voltage is compared with the first reference voltage, and since the first flag signal for the second power voltage is generated, and the first flag signal is output, it is possible to detect the defect. Further, the effect described herein is not necessarily limited, and any effect described in the present disclosure may be included.

BRIEF DESCRIPTION OF DRAWINGS

FIG. 17 is a timing waveform diagram illustrating an operation example of an imaging device illustrated in FIG. 1.

FIG. 18A is another timing waveform diagram illustrating an operation example of the imaging device illustrated in FIG. 1. FIG. 18B is another timing waveform diagram illustrating an operation example of an imaging device illustrated in FIG. 1.

FIG. 20 is an explanatory diagram illustrating an example of image synthesis in an imaging device illustrated in FIG. 1.

FIG. 21 is a timing waveform diagram illustrating an example of a voltage detection operation in an imaging device illustrated in FIG. 1.

DESCRIPTION OF EMBODIMENTS

Hereinafter, exemplary embodiment of the present disclosure will be described in detail with reference to the appended drawings. Further, the description will proceed in the following order.

Figure 1:
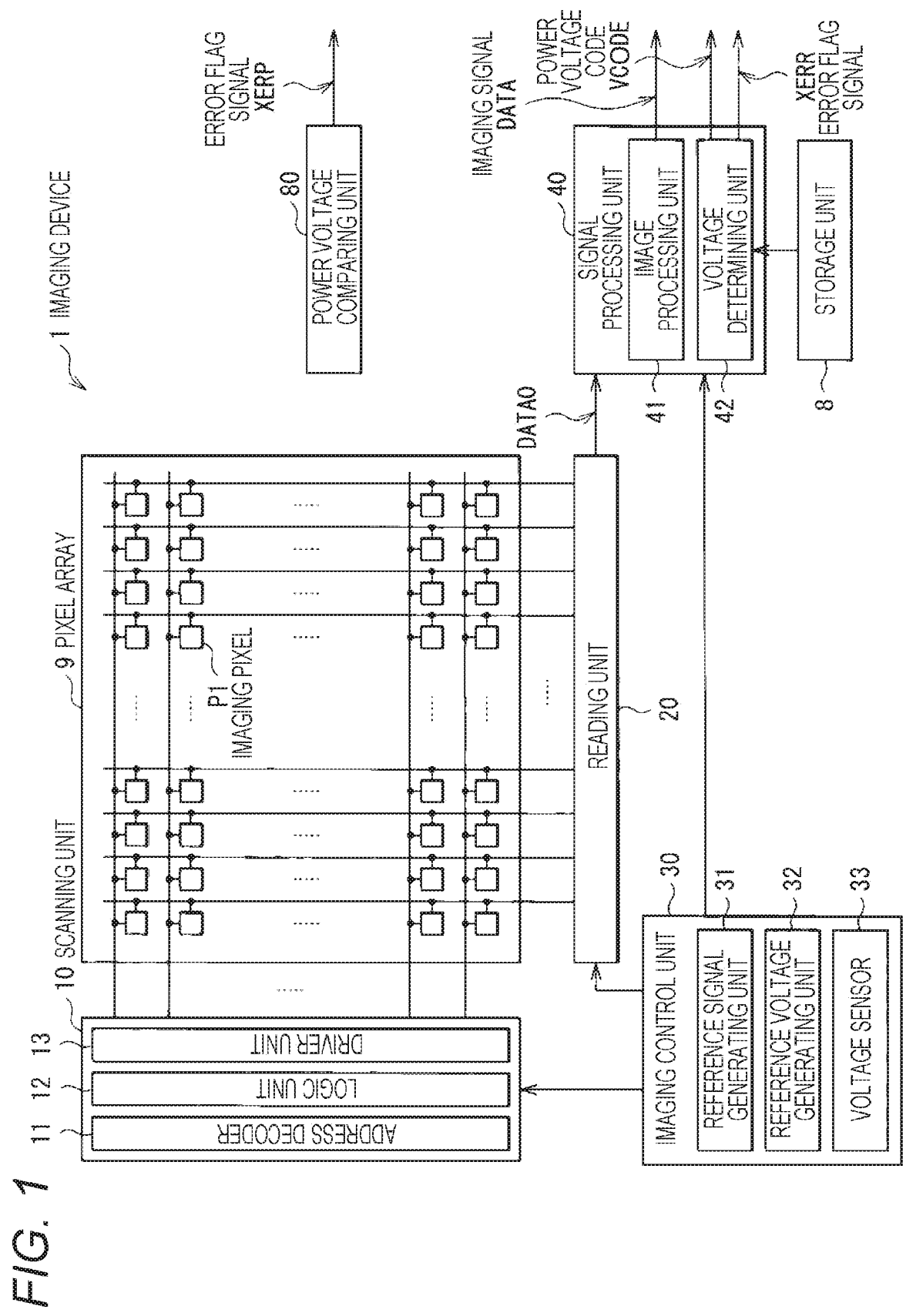
FIG. 1 is a block diagram illustrating a configuration example of an imaging device according to an embodiment of the present disclosure.

1. Embodiments
2. Use example of imaging device
3. Application example to movable object 1. Embodiments Configuration Example FIG. 1 illustrates a configuration example of an imaging device (an imaging device 1) according to an embodiment. The imaging device 1 includes a pixel array 9, a scanning unit 10, a reading unit 20, an imaging control unit 30, a signal processing unit 40, a storage unit 8, and a power voltage comparing unit 80.

Three power voltages VDD (power voltages VDDH, VDDM, and VDDL) are supplied to the imaging device 1 as described later, and the imaging device 1 operates on the basis of the power voltages VDD. The power voltage VDDH is a power voltage which is mainly supplied to an analog circuit in the imaging device 1, and is, for example, 3.3 V. The power voltage VDDM is a power voltage which is mainly supplied to an input/output buffer of the imaging device 1, and is, for example, 1.8 V. The power voltage VDDL is a power voltage which is mainly supplied to a logic circuit in the imaging device 1, and is, for example, 1.1 V.

The pixel array 9 includes a plurality of imaging pixels P1 which are arranged in a matrix form. The imaging pixel P1 includes a photodiode and generates a pixel voltage VP related to the imaging pixel P1.

Figure 2:
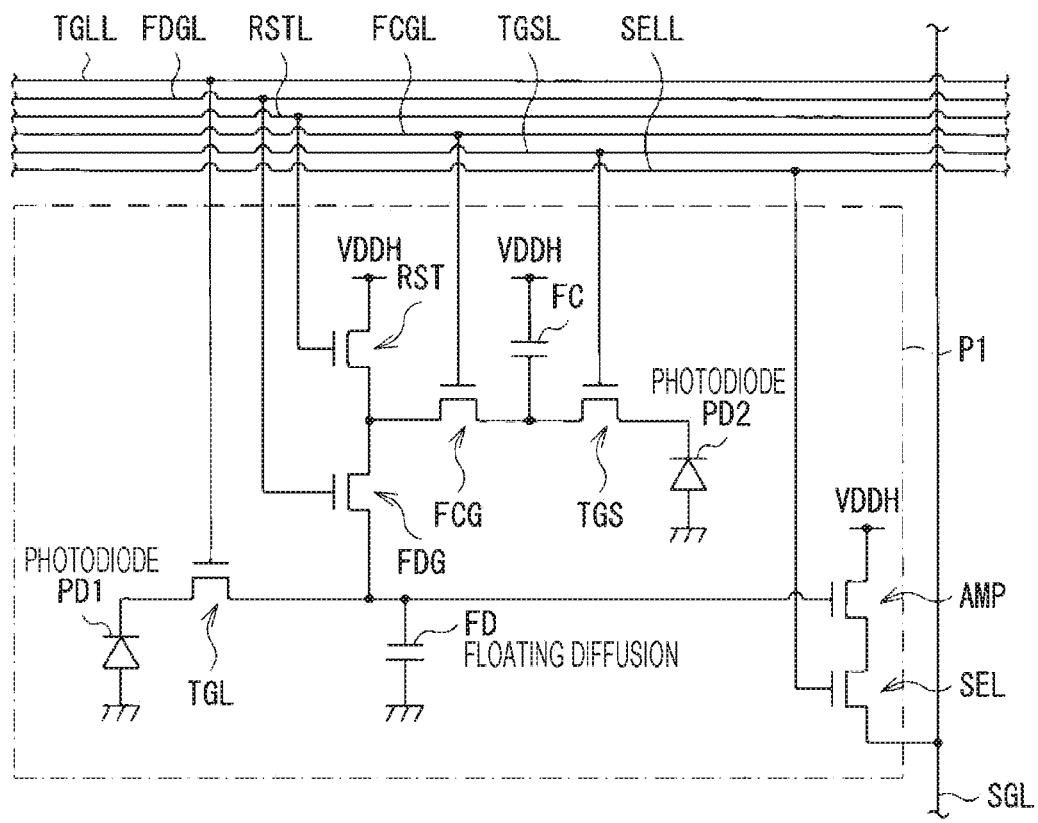
FIG. 2 is a circuit diagram illustrating a configuration example of a pixel array illustrated in FIG. 1.

FIG. 2 illustrates a configuration example of the imaging pixel P1. The pixel array 9 includes a plurality of control lines TGLL, a plurality of control lines FDGL, a plurality of control lines RSTL, a plurality of control lines FCGL, a plurality of control lines TGSL, a plurality of control lines SELL, and a plurality of signal lines SGL. The control line TGLL extends in a horizontal direction (a traverse direction in FIG. 1), and a signal STGL is applied to the control line TGLL by the scanning unit 10. The control line FDGL extends in the horizontal direction, and a signal SFDG is applied to the control line FDGL by the scanning unit 10. The control line RSTL extends in the horizontal direction, and a signal SRST is applied to the control line RSTL by the scanning unit 10. The control line FCGL extends in the horizontal direction, and a signal SFCG is applied to the control line FCGL by the scanning unit 10. The control line TGSL extends in the horizontal direction, and a signal STGS is applied to the control line TGSL by the scanning unit 10. The control line SELL extends in the horizontal direction, and a signal SSEL is applied to the control line SELL by the scanning unit 10. The signal line SGL extends in a vertical direction (a longitudinal direction in FIG. 1) and is connected to the reading unit 20.

The imaging pixel P1 includes a photodiode PD1, a transistor TGL, photodiode PD2, a transistor TGS, a capacitive element FC, transistors FCG, RST, and FDG, a floating diffusion FD, and transistors AMP and SEL. In this example, the transistors TGL, TGS, FCG, RST, FDG, AMP, and SEL are N-type metal oxide semiconductor (MOS) transistors.

The photodiode PD1 is a photoelectric conversion element which generates an amount of electric charges corresponding to an amount of received light and accumulates the electric charges therein. A light receiving region in which the photodiode PD1 can receive light is wider than a light receiving region in which the photodiode PD2 can receive light. An anode of the photodiode PD1 is grounded, and a cathode is connected to a source of the transistor TGL.

A gate of the transistor TGL is connected to the control line TGLL, a source is connected to a cathode of the photodiode PD1, and a drain is connected to the floating diffusion FD.

The photodiode PD2 is a photoelectric conversion element which generates an amount of electric charges corresponding to an amount of received light and accumulates the electric charges therein. A light receiving region in which the photodiode PD2 can receive light is narrower than a light receiving region in which the photodiode PD1 can receive light. An anode of the photodiode PD2 is grounded, and a cathode is connected to a source of the transistor TGS.

A gate of the transistor TGS is connected to the control line TGSL, the source is connected to a cathode of the photodiode PD2, a drain is connected to one end of the capacitive element FC and a source of the transistor FCG.

The one end of the capacitive element FC is connected to the drain of the transistor TGS and the source of the transistor FCG, and the other end is supplied with the power voltage VDDH.

A gate of the transistor FCG is connected to the control line FCGL, a source is connected to one end of the capacitive element FC and the drain of the transistor TGS, and a drain is connected to the source of the transistor RST and the drain of the transistor FDG.

A gate of the transistor RST is connected to the control line RSTL, a drain is supplied with the power voltage VDDH, and a source is connected to the drains of the transistors FCG and FDG.

A gate of the transistor FDG is connected to the control line FDGL, a drain is connected to the source of the transistor RST and the drain of the transistor FCG, and a source is connected to the floating diffusion FD.

The floating diffusion FD accumulates electric charges supplied from the photodiodes PD1 and PD2, and is configured using, for example, a diffusion layer formed on a surface of a semiconductor substrate. In FIG. 2, the floating diffusion FD is illustrated using a symbol of a capacitive element.

A gate of the transistor AMP is connected to the floating diffusion FD, a drain is supplied with the power voltage VDDH, and a source is connected to a drain of the transistor SEL.

A gate of transistor SEL is connected to the control line SELL, the drain is connected to the source of the transistor AMP, and a source is connected to the signal line SGL.

With this configuration, in the imaging pixel P1, the transistor SEL enters an ON state on the basis of the signal SSEL applied to the control line SELL, and thus the imaging pixel P1 is electrically connected to the signal line SGL. Accordingly, the transistor AMP is connected to a current source 23 of the reading unit 20 (to be described later) and operates as a so-called source follower. Further, the imaging pixel P1 outputs the pixel voltage VP corresponding to a voltage in the floating diffusion FD to the signal line SGL as the signal SIG. Specifically, the imaging pixel P1 sequentially outputs eight pixel voltages VP (VP1 to VP8) in eight periods (conversion periods T1 to T8) in a so-called horizontal period H as described later.

Figure 3:
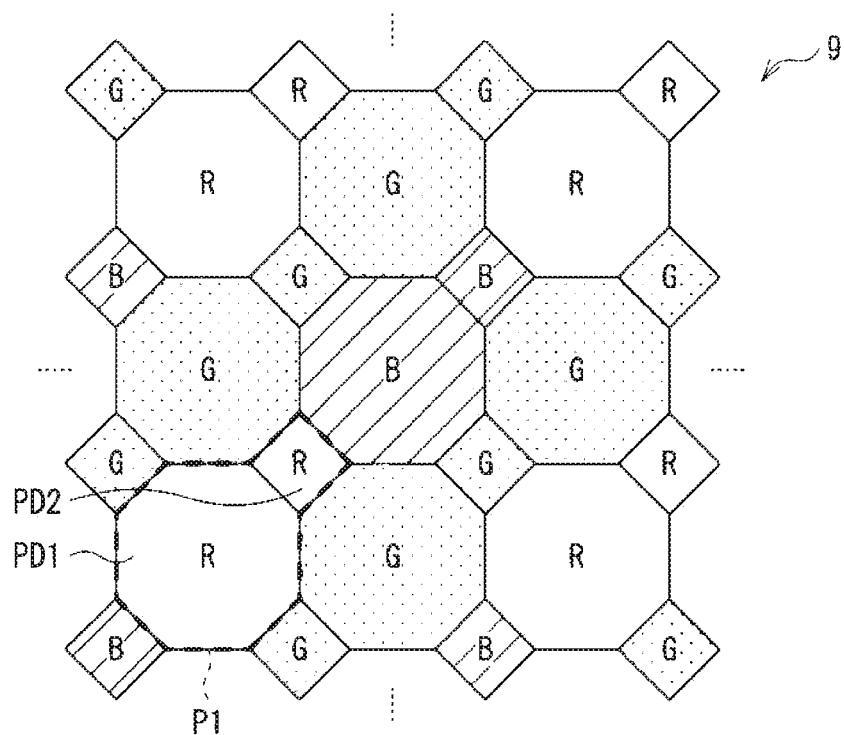
FIG. 3 is an explanatory diagram illustrating a configuration example of a pixel array illustrated in FIG. 1.

FIG. 3 illustrates an example of an array of the photodiodes PD1 and PD2 in the pixel array 9. In FIG. 3, "R" indicates a red color filter, "G" indicates a green color filter, and "B" indicates a blue color filter. In each imaging pixel P1, the photodiode PD2 is formed on an upper right portion of the photodiode PD1. The color filters of the same color are formed in the two the photodiodes PD1 and PD2 in each imaging pixel P1. In this example, the photodiode PD1 has an octagonal shape, and the photodiode PD2 has a quadrangular shape. As illustrated in FIG. 3, the photodiode PD1 can receive light in the light receiving region wider than the light receiving region in which the photodiode PD2 can receive light.

The scanning unit 10 (FIG. 1) sequentially drives the imaging pixel P1 in the pixel array 9 in units of pixel lines L on the basis of an instruction from the imaging control unit 30. The scanning unit 10 operates on the basis of the power voltage VDDH and the power voltage VDDL among the supplied three power voltages VDD. The scanning unit 10 includes an address decoder 11, a logic unit 12, and a driver unit 13.

On the basis of an address signal supplied from the imaging control unit 30, the address decoder 11 selects the pixel line L corresponding to an address indicated by the address signal in the pixel array 9. The logic unit 12 generates signals STGL1, SFDG1, SRST1, SFCG1, STGS1, and SSEL1 corresponding to the respective pixel lines L on the basis of an instruction from the address decoder 11. On the basis of the signals STGL1, SFDG1, SRST1, SFCG1, STGS1, and SSEL1 corresponding to the respective pixel lines L, the driver unit 13 generates signals STGL, SFDG, SRST, SFCG, STGS, and SSEL corresponding to the respective pixel lines L.

The reading unit 20 generates an image signal DATA0 by performing AD conversion on the basis of the signal SIG supplied from the pixel array 9 via the signal line SGL. The reading unit 20 operates on the basis of the power voltage VDDH and the power voltage VDDL among the supplied three power voltages VDD.

Figure 4:
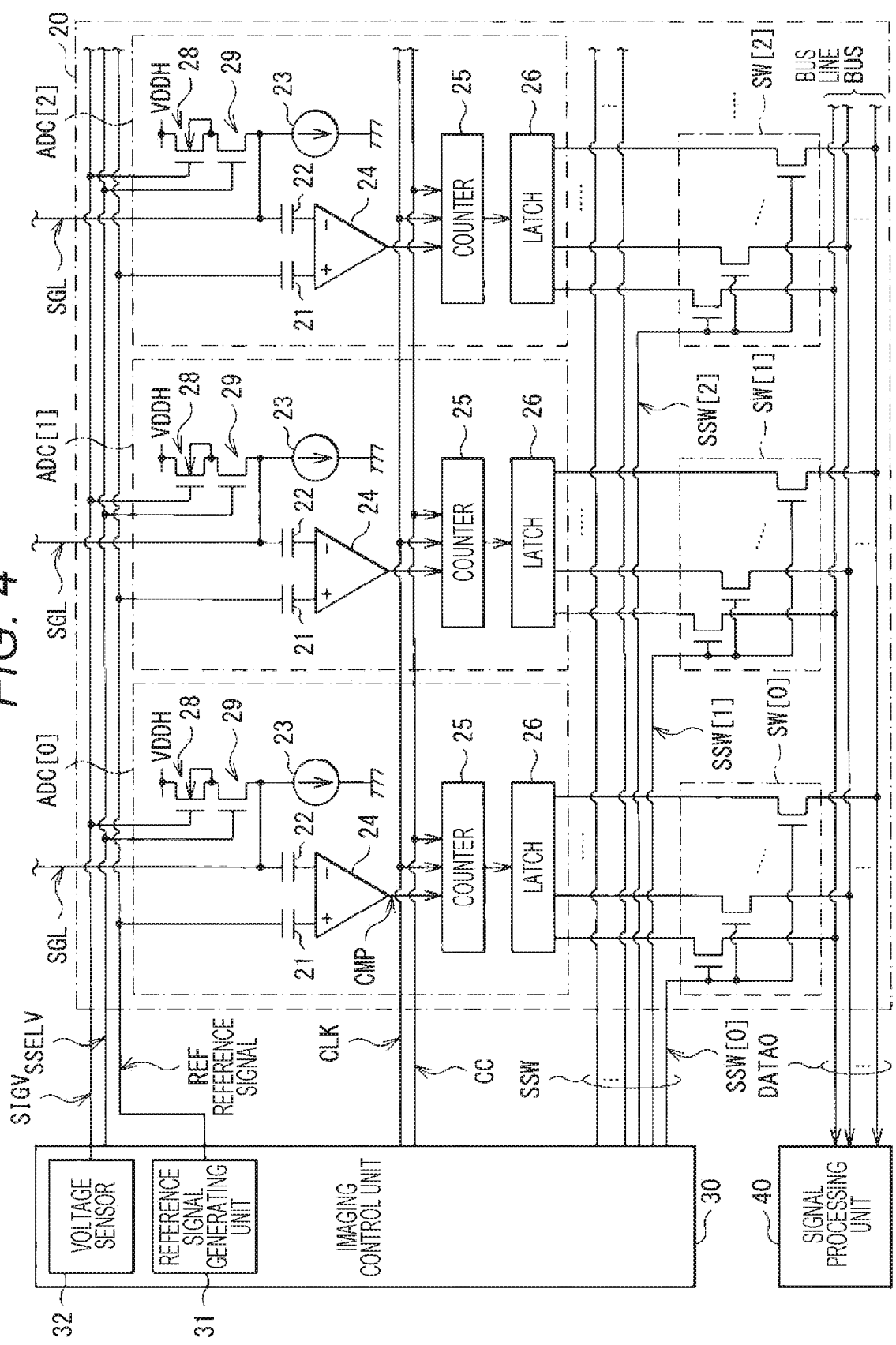
FIG. 4 is a circuit diagram illustrating a configuration example of a reading unit illustrated in FIG. 1.

FIG. 4 illustrates a configuration example of the reading unit 20. Further, in addition to the reading unit 20, the imaging control unit 30 and the signal processing unit 40 are also illustrated in FIG. 4. The reading unit 20 includes a plurality of analog to digital (AD) converting units ADC (AD converting units ADC[0], ADC[1], ADC[2], ... ), a plurality of switch unit SW (switch units SW[0], SW[1], SW[2], ... ), and a bus line BUS.

The AD converting unit ADC converts the voltage of the signal SIG to a digital code CODE by performing AD conversion on the basis of the signal SIG supplied from the pixel array 9. A plurality of AD converting units ADC are disposed corresponding to a plurality of signal lines SGL. Specifically, a 0-th AD converting unit ADC[0] is disposed corresponding to a 0-th signal line SGL[0], a first AD converting unit ADC[1] is a first signal line SGL[1], and a second AD converting unit ADC[2] is disposed corresponding to a second signal line SGL[2].

Further, the AD converting unit ADC has a function of converting the voltage of a signal SIGV into the digital code CODE by performing AD conversion on the basis of the signal SIGV supplied from a voltage sensor 33 of the imaging control unit 30 (to be described later) in a vertical blanking period (a blanking period T20 to be described later).

The AD converting unit ADC includes capacitive elements 21 and 22, transistors 28 and 29, a current source 23, a comparator 24, a counter 25, and a latch 26. One end of the capacitive element 21 is supplied with a reference signal REF, and the other end is connected to a positive input terminal of the comparator 24. The reference signal REF is generated by a reference signal generating unit 31 of the imaging control unit 30 (to be described later), and has a so-called ramp waveform in which a voltage level gradually decreases with the passage of time in the eight periods in which AD conversion is performed (the conversion periods T1 to T8) as will be described later. One end of the capacitive element 22 is connected to the signal line SGL, and the other end is connected to a negative input terminal of the comparator 24. The transistors 28 and 29 are N-type MOS transistors. The signal SIGV is supplied to a gate of the transistor 28, the power voltage VDDH is supplied to a drain, and a source is connected to a drain of the transistor 29. A back gate of transistor 28 is connected to a source in this example. A control signal SSELV is supplied to the gate of the transistor 29, a drain is connected to the source of the transistor 28, and the source is connected to one end of the capacitive element 22. The current source 23 causes an electric current having a predetermined current value to flow from the signal line SGL to the ground. The comparator 24 compares an input voltage in the positive input terminal with an input voltage in the negative input terminal and outputs a comparison result as a signal CMP. The comparator 24 operates on the basis of the power voltage VDDH. The reference signal REF is supplied to the positive input terminal of the comparator 24 via the capacitive element 21, and the signal SIG is supplied to the negative input terminal via the capacitive element 22. The comparator 24 also has a function of performing a zero adjustment of electrically connecting the positive input terminal with the negative input terminal in a predetermined period to be described later. The counter 25 performs a count operation of counting pulses of the clock signal CLK supplied from the imaging control unit 30 on the basis of the signal CMP and the control signal CC supplied from the comparator 24. The latch 26 holds a count value CNT obtained by the counter 25 as the digital code CODE having a plurality of bits. The counter 25 and the latch 26 operate on the basis of the power voltage VDDL.

The switch unit SW supplies the digital code CODE output from the AD converting unit ADC to the bus line BUS on the basis of the control signal SSW supplied from the imaging control unit 30. A plurality of switch units SW are disposed corresponding to the plurality of AD converting units ADC. Specifically, a 0-th switch unit SW[0] is disposed corresponding to a 0-th AD converting unit ADC[0], a first switch unit SW[1] is disposed corresponding to a first AD converting unit ADC[1], and a second switch unit SW[2] is disposed corresponding to a second AD converting unit ADC[2].

In this example, the switch unit SW is configured using transistors which are equal in number to bits of the digital code CODE. The transistors are on/off controlled on the basis of respective bits of the control signal SSW supplied from the imaging control unit 30 (control signals SSW[0], SSW[1], SSW[2], ... ). Specifically, for example, a 0-th switch unit SW[0] supplies the digital code CODE output from the 0-th AD converting unit ADC[0] to the bus line BUS when each transistor enters the ON state on the basis of the control signal SSW[0]. Similarly, for example, the first switch unit SW[1] supplies the digital code CODE output from the first AD converting unit ADC[1] to the bus line BUS when each transistor enters the ON state on the basis of the control signal SSW[1]. The same applies to the other switch units SW.

The bus line BUS includes a plurality of lines and transfers the digital code CODE output from the AD converting unit ADC. The reading unit 20 sequentially transfers a plurality of digital code CODEs supplied from the AD converting units ADC to the signal processing unit 40 as an image signal DATA0 using the bus line BUS (a data transfer operation).

The imaging control unit 30 (FIG. 1) supplies the control signals to the scanning unit 10, the reading unit 20, and the signal processing unit 40, and controls the operation of the imaging device 1 by controlling the operations of the circuits. Specifically, for example, the imaging control unit 30 supplies the address signal to the scanning unit 10 and performs control such that the scanning unit 10 sequentially drives the imaging pixel P1 in the pixel array 9 in units of pixel lines L. Further, the imaging control unit 30 supplies the reference signal REF, the clock signal CLK, the control signal CC, and the control signal SSW (the control signals SSW[0], SSW[1], SSW[2], ... ) to the reading unit 20, and performs control such that the reading unit 20 generates the image signal DATA0 on the basis of the signals SIG and SIGV. Further, the imaging control unit 30 supplies the control signal to the signal processing unit 40 and controls the operation of the signal processing unit 40. The imaging control unit 30 operates on the basis of the power voltage VDDH and the power voltage VDDL among the supplied three power voltages VDD. The logic circuit in the imaging control unit 30 operates on the basis of the power voltage VDDL. The imaging control unit 30 includes the reference signal generating unit 31, a standard voltage generating unit 32, and the voltage sensor 33.

The reference signal generating unit 31 generates the reference signal REF. The reference signal REF has a so-called ramp waveform in which the voltage level gradually decreases with the passage of time in the eight periods in which AD conversion is performed (the conversion periods T1 to T8). Then, the reference signal generating unit 31 supplies the generated reference signal REF to a plurality of AD converting units ADC of the reading unit 20. The reference signal generating unit 31 operates on the basis of the power voltage VDDH.

The standard voltage generating unit 32 is a so-called bandgap voltage reference circuit which generates a voltage Vbgr serving as a standard voltage. Further, the standard voltage generating unit 32 supplies the voltage Vbgr to various circuits in the imaging device 1. The standard voltage generating unit 32 operates on the basis of the power voltage VDDH.

The voltage sensor 33 generates the signal SIGV. The signal SIGV includes a voltage corresponding to the power voltage VDDH, a voltage corresponding to the power voltage VDDM, a voltage corresponding to the power voltage VDDL, and a voltage corresponding to the voltage Vbgr.

Figure 5:
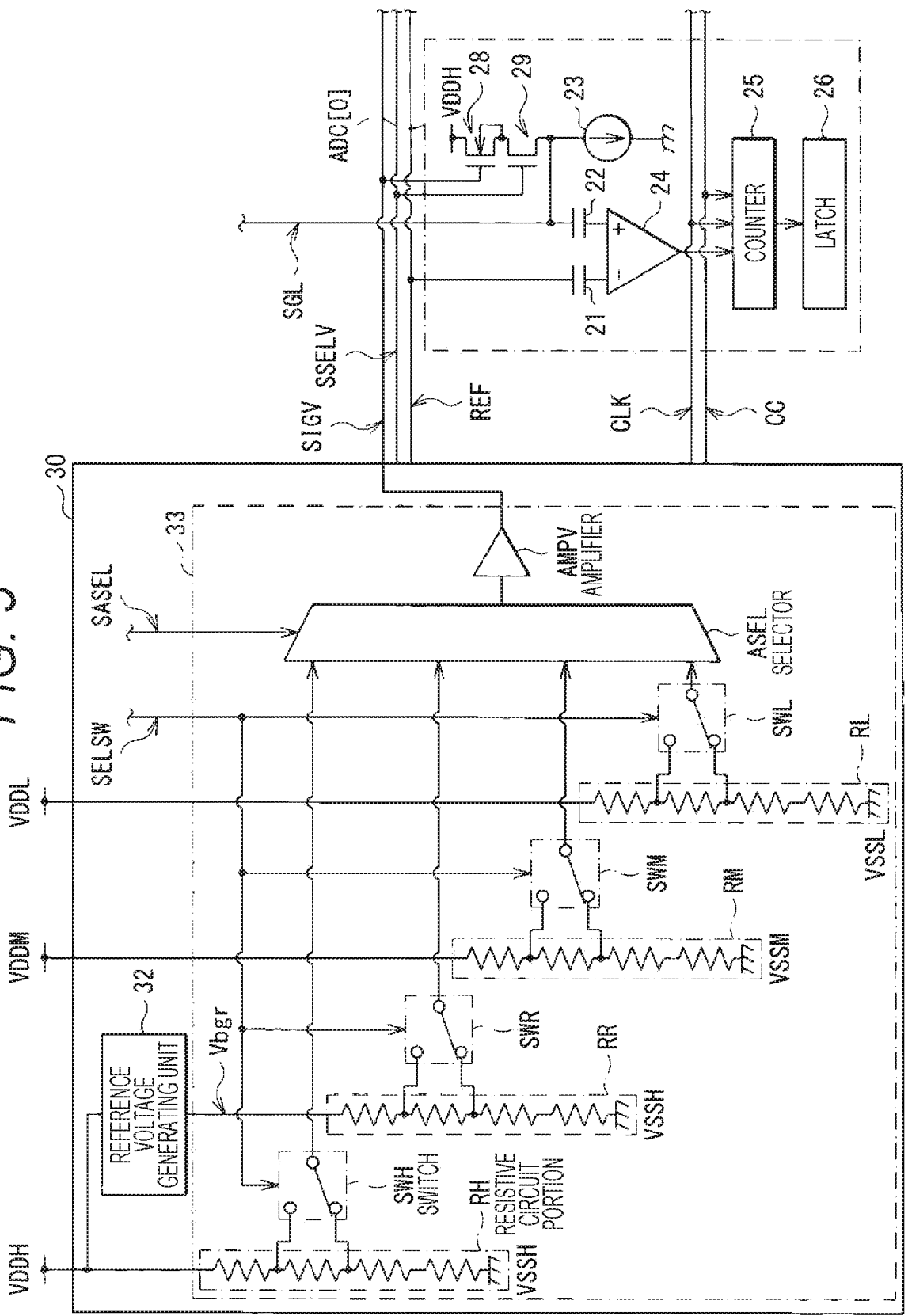
FIG. 5 is a circuit diagram illustrating a configuration example of a voltage sensor illustrated in FIG. 1.

FIG. 5 illustrates a configuration example of the voltage sensor 33. Further, in addition to the voltage sensor 33, the AD converting unit ADC[0] of the reading unit 20 is also illustrated in FIG. 5. The voltage sensor 33 includes resistive circuit portions RH, RR, RM, and RL, switches SWH, SWR, SRM, and SWL, a selector ASEL, and an amplifier AMPV.

Each of the resistive circuit portions RH, RR, RM, and RL has a plurality of resistive elements (four resistive elements in this example) which are connected in series. The power voltage VDDH is supplied to one end of the resistive circuit portion RH, and a ground voltage VSSH is supplied to the other end. Further, in this example, the resistive circuit portion RH outputs a voltage obtained by dividing the power voltage VDDH into "¾" and a voltage obtained by dividing the power voltage VDDH into "½." The voltage Vbgr is supplied to one end of the resistive circuit portion RR, and the ground voltage VSSH is supplied to the other end. Further, in this example, the resistive circuit portion RR outputs a voltage obtained by dividing the voltage Vbgr into "¾" and a voltage obtained by dividing the voltage Vbgr into "½." The power voltage VDDM is supplied to one end of the resistive circuit portion RM, and the ground voltage VSSM is supplied to the other end. Further, in this example, the resistive circuit portion RM outputs a voltage obtained by dividing the power voltage VDDM into "¾" and a voltage obtained by dividing the power voltage VDDM into "½." The power voltage VDDL is supplied to one end of the resistive circuit portion RL, and the ground voltage VSSL is supplied to the other end. Further, in this example, the resistive circuit portion RL outputs a voltage obtained by dividing the power voltage VDDL into "¾" and a voltage obtained by dividing the power voltage VDDL into "½."

The switch SWH selects one of the voltage obtained by dividing the power voltage VDDH into "¾" and the voltage obtained by dividing the power voltage VDDH into "½" on the basis of a control signal SELSW generated by the imaging control unit 30, and outputs the selected voltage. The switch SWR selects one of the voltages obtained by dividing the voltage Vbgr into "¾" and the voltage obtained by dividing the voltage Vbgr into "½" on the basis of the control signal SELSW generated by the imaging control unit 30, and outputs the selected voltage. The switch SWM selects one of the voltages obtained by dividing the power voltage VDDM into "¾" and the voltage obtained by dividing the power voltage VDDM into "½" on the basis of the control signal SELSW generated by the imaging control unit 30, and outputs the selected voltage. The switch SWL selects one of the voltage obtained by dividing the power voltage VDDL into "¾" and the voltage obtained by dividing the power voltage VDDL into "½" on the basis of the control signal SELSW generated by the imaging control unit 30, and outputs the selected voltage.

The selector ASEL selects one of the voltages supplied from the switches SWH, SWR, SWM, and SWL on the basis of a control signal SASEL generated by the imaging control unit 30, and outputs the selected voltage.

The amplifier AMPV amplifies the voltage supplied from the selector ASEL and outputs the amplified voltage as the signal SIGV. The amplifier AMPV operates on the basis of the power voltage VDDH.

With this configuration, the voltage sensor 33 generates the signal SIGV including the voltage corresponding to the power voltage VDDH, the voltage corresponding to the power voltage VDDM, the voltage corresponding to the power voltage VDDL, and the voltage corresponding to the voltage Vbgr. Further, the voltage sensor 33 supplies the generated signal SIGV to a plurality of AD converting units ADC of the reading unit 20.

The signal processing unit 40 performs signal processing on the image signal DATA0. The signal processing unit 40 operates on the basis of the power voltage VDDL among the supplied three power voltages VDD. The signal processing unit 40 includes an image processing unit 41 and a voltage determining unit 42.

The image processing unit 41 performs predetermined image processing on an image indicated by the image signal DATA0. The predetermined image processing includes, for example, an image synthesis process. In the image synthesis process, the image processing unit 41 generates four images PIC (images PIC1, PIC2, PIC3, and PIC4) on the basis of the eight digital codes CODE (the digital codes CODE1 to CODER) obtained in the eight periods in which AD conversion is performed (the conversion periods T1 to T8) supplied from the reading unit 20. Then, the image processing unit 41 synthesizes the four images PIC and generates one captured image PICA. Then, the image processing unit 41 outputs the captured image PICA as the image signal DATA.

The voltage determining unit 42 generates voltage codes VCODE (voltage codes VCODEH, VCODEM, VCODEL, and VCODOR) indicating voltage values of the power voltage VDDH, VDDM, and VDDL and the voltage Vbgr, and generates an error flag signal XERR by checking whether or not each of the voltage values of the power voltages VDDH, VDDM, and VDDL and the voltage Vbgr falls within a predetermined voltage range.

Figure 6:
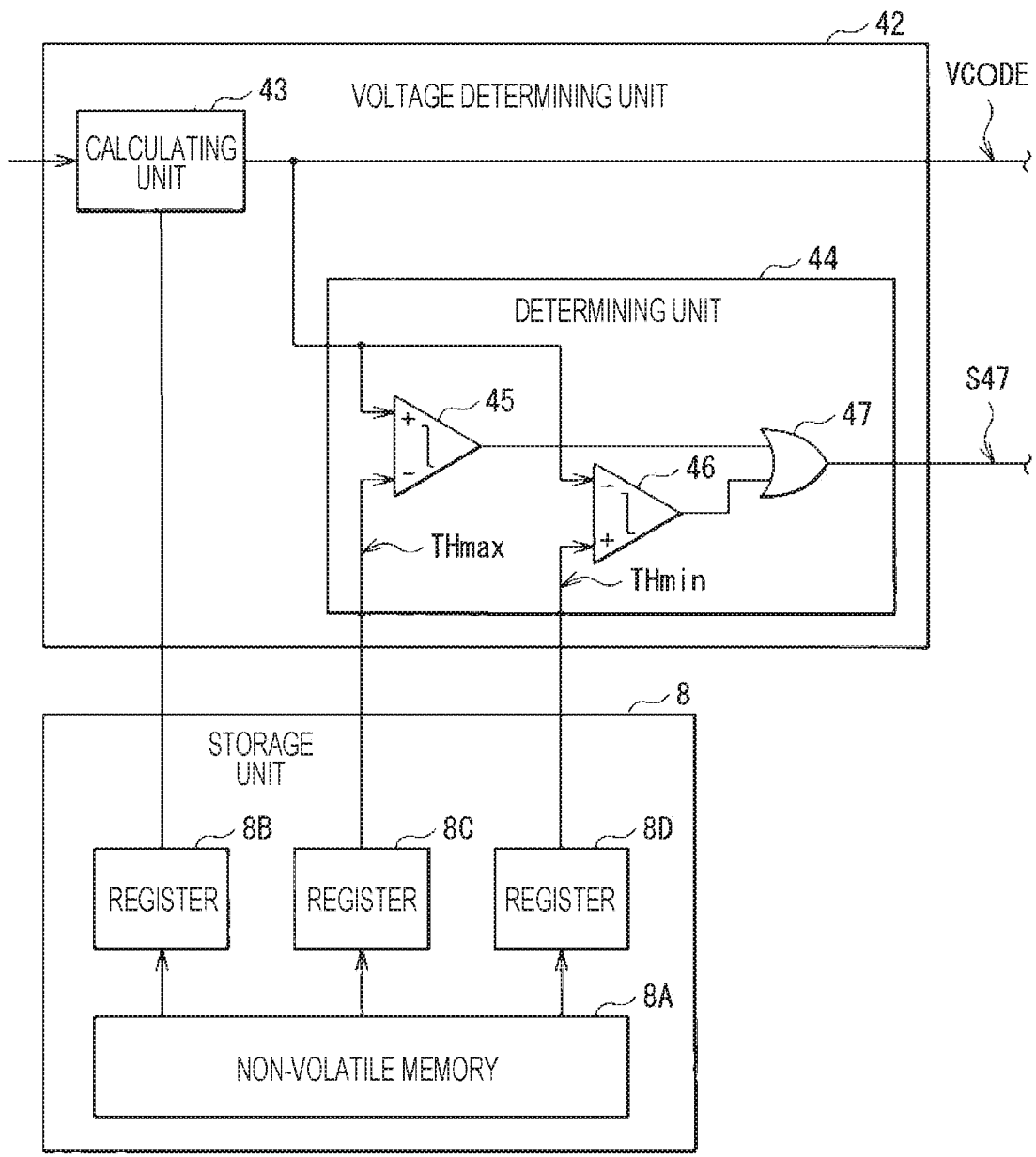
FIG. 6 is a block diagram illustrating a configuration example of a voltage determining unit illustrated in FIG. 1.

FIG. 6 illustrates a configuration example of the voltage determining unit 42. Further, in addition to the voltage determining unit 42, the storage unit 8 is also illustrated in FIG. 6. The voltage determining unit 42 has a calculating unit 43 and a determining unit 44.

The calculating unit 43 calculates the four voltage codes VCODE (the voltage codes VCODEH, VCODEM, VCODEL, and VCODOR) indicating the voltage values of the power voltages VDDH, VDDM, VDDL and the voltage Vbgr on the basis of the digital code CODE obtained on the basis of the signal SIGV in the vertical blanking period included in the image signal DATA0. Specifically, the calculating unit 43 performs a calculation process on the basis of each of a plurality of digital values VALV related to the power voltage VDDH obtained from a plurality of AD converting units ADC, and generates a plurality of voltage code VCODE1 having a predetermined code system. In this code system, for example, the voltage code VCODE1 is indicated as a value obtained by multiplying the voltage value by "100." Specifically, in a case in which the voltage value of the power voltage VDDH is "3.3 V," a value indicated by the voltage code VCODE1 is "3300." When the voltage code VCODE1 is generated, the calculating unit 43 generates the voltage code VCODE1 on the basis of a calibration parameter PCAL (to be described later) stored in the storage unit 8. Then, the calculating unit 43 obtains an average value of the values indicated by a plurality of voltage codes VCODE1 and generates one voltage code VCODE. The calculating unit 43 outputs the voltage code VCODE generated as described above as the voltage code VCODEH corresponding to the power voltage VDDH. Similarly, the calculating unit 43 generates the voltage code VCODEM corresponding to the power voltage VDDM, generates the voltage code VCODEL corresponding to the power voltage VDDL, and generates the voltage code VCODER corresponding to the voltage Vbgr. Hereinafter, a process related to the power voltage VDDH will be described in detail by way of example, but the same applies to the processes related to the power voltages VDDM and VDDL and the voltage Vbgr. Further, the average value calculated by the calculating unit 43 is preferably an average value based on an arithmetic average, but a geometric mean, a weighted average, a harmonic mean, or the like may be applied.

Figure 7:
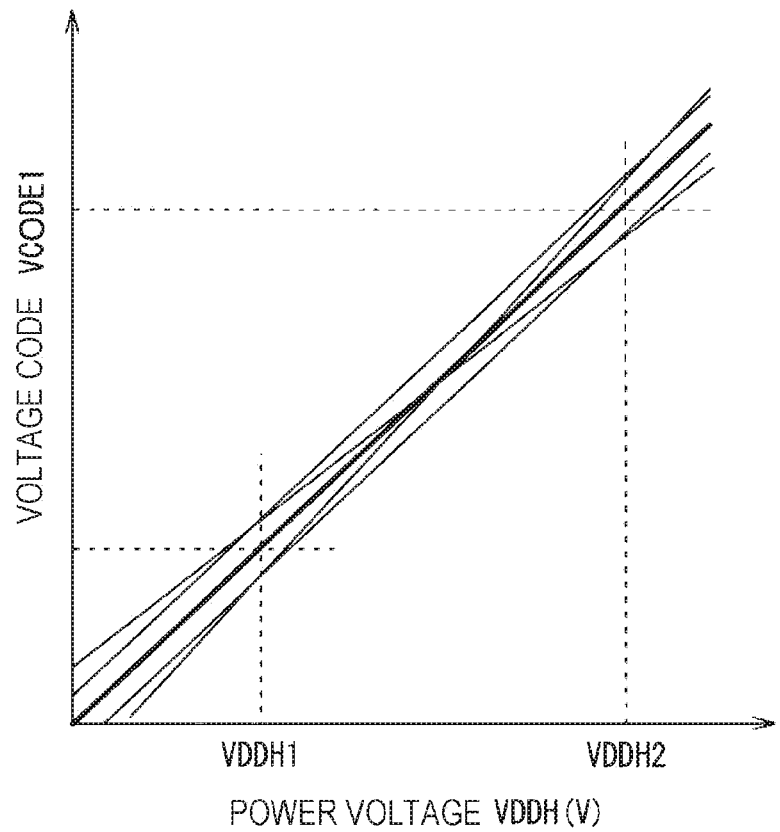
FIG. 7 is another explanatory diagram illustrating an operation example of a calculating unit illustrated in FIG. 6.

FIG. 7 schematically illustrates an example of the calculation process in the calculating unit 43. Each voltage in the signal SIGV generated by the voltage sensor 33 may deviate from a desired voltage due to a so-called manufacturing variation, impedance of a power supply wiring in the imaging device 1, or the like. In this case, as illustrated in FIG. 7, the voltage code VCODE1 also deviates from a desired code. In this regard, in the imaging device 1, for example, in an inspection process before shipping, an inspecting device supplies a power voltage VDDH set as a predetermined voltage VDDH1 (for example, 3.1 V) to the imaging device 1, and at this time, the voltage code VCODE generated by the imaging device 1 and an ideal voltage code corresponding to the voltage VDDH1 are stored in a non-volatile memory 8A of the storage unit 8 (to be described later) in advance. Similarly, the inspecting device supplies a power voltage VDDH set as a predetermined voltage VDDH2 (for example, 3.5 V) to the imaging device 1, and at this time the voltage code VCODE generated by the imaging device 1 and an ideal voltage code corresponding to the voltage VDDH2 are stored in the non-volatile memory 8A of the storage unit 8 (to be described later) in advance. Then, the calculating unit 43 obtains the calibration parameter PCAL on the basis of these pieces of information stored in the storage unit 8, and then generates the voltage code VCODE1 by performing the calculation process using the calibration parameter PCAL. Accordingly, the calculating unit 43 can obtain the voltage code VCODE1 using a more desirable conversion characteristic indicated by a bold line in FIG. 7. The calculating unit 43 generates a plurality of voltage codes VCODE1 by performing the calculation process on the basis of the digital codes CODE obtained from a plurality of AD converting units ADC.

Figure 8A:
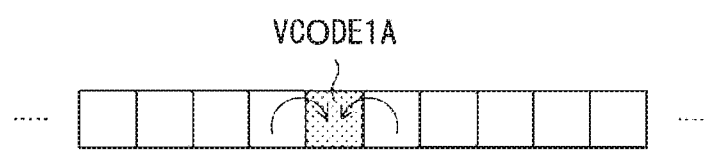
FIG. 8A is another explanatory diagram illustrating an operation example of a calculating unit illustrated in FIG. 6.

Then, the calculating unit 43 generates one voltage code VCODE by obtaining the average value of the values indicated by a plurality of voltage codes VCODE1. Since a plurality of AD converting unit ADC performs the AD conversion on the basis of one signal SIGV in the blanking period, the values indicated by a plurality of voltage codes VCODE1 are expected to be substantially equal. However, for example, in a case in which the AD converting unit ADC (the AD converting unit ADCA) among a plurality of AD converting units ADC has a failure, a value indicated by the voltage code VCODE1 (a voltage code VCODE1A) generated on the basis of the digital code CODE generated by the AD converting unit ADC may significantly deviate from values indicated by the other voltage codes VCODE1. Further, for example, a value indicated by a certain voltage code VCODE1 (the voltage code VCODE1A) may significantly deviate from values indicated by the other voltage codes VCODE1 due to a variation in a characteristic caused by a so-called manufacturing variation of a plurality of AD converting units ADC. In this regard, for example, in a case in which a value of a certain voltage code VCODE1 (the voltage code VCODE1A) significantly deviates from the values of a plurality of voltage codes VCODE1 other than the voltage code VCODE1A, the calculating unit 43 corrects the voltage code VCODE1A, for example, by performing an interpolation calculation using the voltage code VCODE1 related to the AD converting unit ADC adjacent to the AD converting unit ADCA related to the voltage code VCODE1A as illustrated in FIG. 8A. Then, the calculating unit 43 generates one voltage code VCODE by obtaining an average value of the values indicated by all the voltage codes VCODE1 including the corrected voltage code VCODE1A. Then, the calculating unit 43 outputs the voltage code VCODE generated as described above as the voltage code VCODEH corresponding to the power voltage VDDH.

Figure 8B:
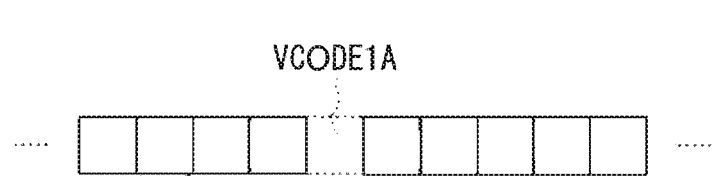
FIG. 8B is an explanatory diagram illustrating another operation example of a calculating unit illustrated in FIG. 6.

Further, the calculating unit 43 is not limited to this example, and in a case in which the value of the voltage code VCODE1 (the voltage code VCODE1A) may significantly deviate from the values of a plurality of voltage codes VCODE1 other than the voltage code VCODE1A, one voltage code VCODE may be generated by obtaining an average value of a plurality of voltage codes VCODE1 other than the voltage code VCODE1A among all the voltage codes VCODE1 as illustrated in FIG. 8B.

As described above, the calculating unit 43 generates the voltage code VCODEH corresponding to the power voltage VDDH, generates the voltage code VCODEM corresponding to the power voltage VDDM, generates the voltage code VCODEL corresponding to the power voltage VDDL, and generates the voltage code VCODER corresponding to the voltage Vbgr.

The determining unit 44 (FIG. 6) checks whether or not each of the voltage values of the power voltages VDDH, VDDM, VDDL, and voltage Vbgr falls within a predetermined voltage range on the basis of each of the voltage codes VCODEH, VCODEM, VCODEL, and VCODER obtained by the calculating unit 43, and generates the error flag signal XERR. The determining unit 44 includes comparator 45 and 46 and an OR circuit 47.

The comparator 45 compares the value indicated by the voltage code VCODE with a threshold value THmax. The voltage code VCODE is supplied to a positive input terminal of the comparator 45, and the threshold value THmax is supplied to a negative input terminal. With this configuration, the comparator 45 outputs "1" in a case in which the value indicated by the voltage code VCODE is higher than the threshold value THmax, and outputs "0" in a case in which the value indicated by the voltage code VCODE is the threshold value THmax or less.

The comparator 46 compares the value indicated by the voltage code VCODE with a threshold value THmin. The threshold value THmin is supplied to a positive input terminal of the comparator 46, and the voltage code VCODE is supplied to a negative input terminal. With this configuration, the comparator 46 outputs "1" in a case in which the value indicated by the voltage code VCODE is smaller than the threshold value THmin, and outputs "0" in a case in which the value indicated by the voltage code VCODE is the threshold value THmin or more.

The OR circuit 47 obtains a logical sum (OR) of an output signal of the comparator 45 and an output signal of the comparator 46, and outputs the result as a signal S47.

With this configuration, the determining unit 44 sets the signal S47 to "1" in a case in which the value indicated by the voltage code VCODE is smaller than the threshold value THmin, and the value indicated by the voltage code VCODE is higher than the threshold value THmax, and sets the signal S47 to "0" in a case in which the value indicated by VCODE is the threshold value THmin or more and the threshold value THmax or less.

As described above, the determining unit 44 checks whether or not the values (voltage value) indicated by the four voltage codes VCODE fall within predetermined ranges set corresponding to the four voltage codes VCODE, respectively. Specifically, the determining unit 44 checks whether or not the value (voltage value) indicated by the voltage code VCODEH related to the power voltage VDDH falls within a predetermined range related to the power voltage VDDH, checks whether or not the value (voltage value) indicated by the voltage code VCODEM related to the power voltage VDDM falls within a predetermined range related to the power voltage VDDM, checks whether or not the value (voltage value) indicated by the voltage code VCODEL related to the power voltage VDDL falls within a predetermined range related to the power voltage VDDL, and checks whether or not the value (voltage value) indicated by the voltage code VCODER related to the power voltage Vbgr falls within a predetermined range related to the power voltage Vbgr.

Figure 9:
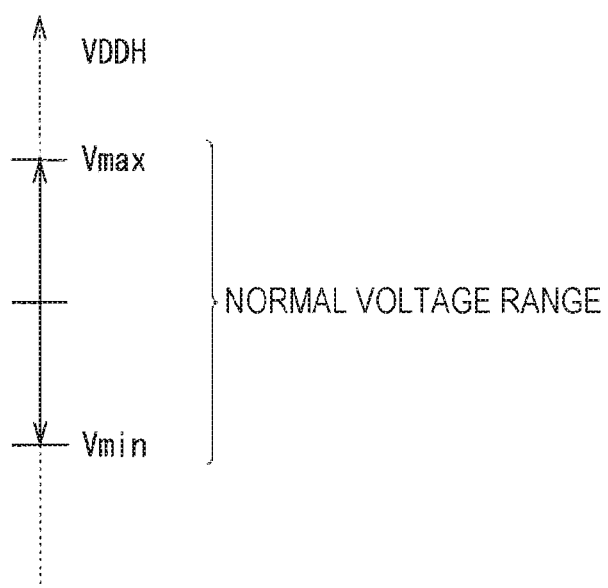
FIG. 9 is an explanatory diagram illustrating an operation example of a determining unit illustrated in FIG. 6.

FIG. 9 illustrates an example of a process related to the power voltage VDDH in the determining unit 44. The determining unit 44 determines that it is normal in a case in which the power voltage VDDH is equal to or higher than the voltage Vmin (for example, 3.1 V) corresponding to the threshold value THmin and equal to or lower than the voltage Vmax (for example, 3.5 V) corresponding to the threshold value THmax, and determines that a defect occurs in a case in which the power voltage VDDH is lower than the voltage Vmin or in a case in which the power voltage VDDH is higher than the voltage Vmax. The same applies to the power voltages VDDM and VDDL and the voltage Vbgr. Then, the imaging device 1 sets the error flag signal XERR to a low level (active) in a case in which the determining unit 44 determines that a defect occurs in one or more of the power voltages VDDH, VDDM, and VDDL, and the voltage Vbgr.

The storage unit 8 (FIG. 1) stores various setting information used in the imaging device 1. As illustrated in FIG. 6, the storage unit 8 includes the non-volatile memory 8A and registers 8B, 8C, and 8D. The non-volatile memory 8A stores various setting information used in the imaging device 1. The register 8B stores information used in a case in which the calculating unit 43 performs a process. The register 8C stores the four threshold values THmax related to the power voltages VDDH, VDDM, and VDDL and the voltage Vbgr. The register 8D stores the four threshold values THmin related to the power voltages VDDH, VDDM, and VDDL and the voltage Vbgr. Information stored in the registers 8B, 8C, and 8D is read from the non-volatile memory 8A, for example, when the imaging device 1 is powered on.

The power voltage comparing unit 80 (FIG. 1) compares the power voltage VDDL among the four power voltages VDD with two threshold voltages (threshold voltages VthL and VthH to be described later) generated on the basis of the power voltage VDDH, and detects whether or not the power voltage VDDL falls within a predetermined voltage range. Then, the power voltage comparing unit 80 generates an error flag signal XERP on the basis of the comparison result. The power voltage comparing unit 80 operates on the basis of the power voltage VDDH among the supplied three power voltages VDD.

Figure 10:
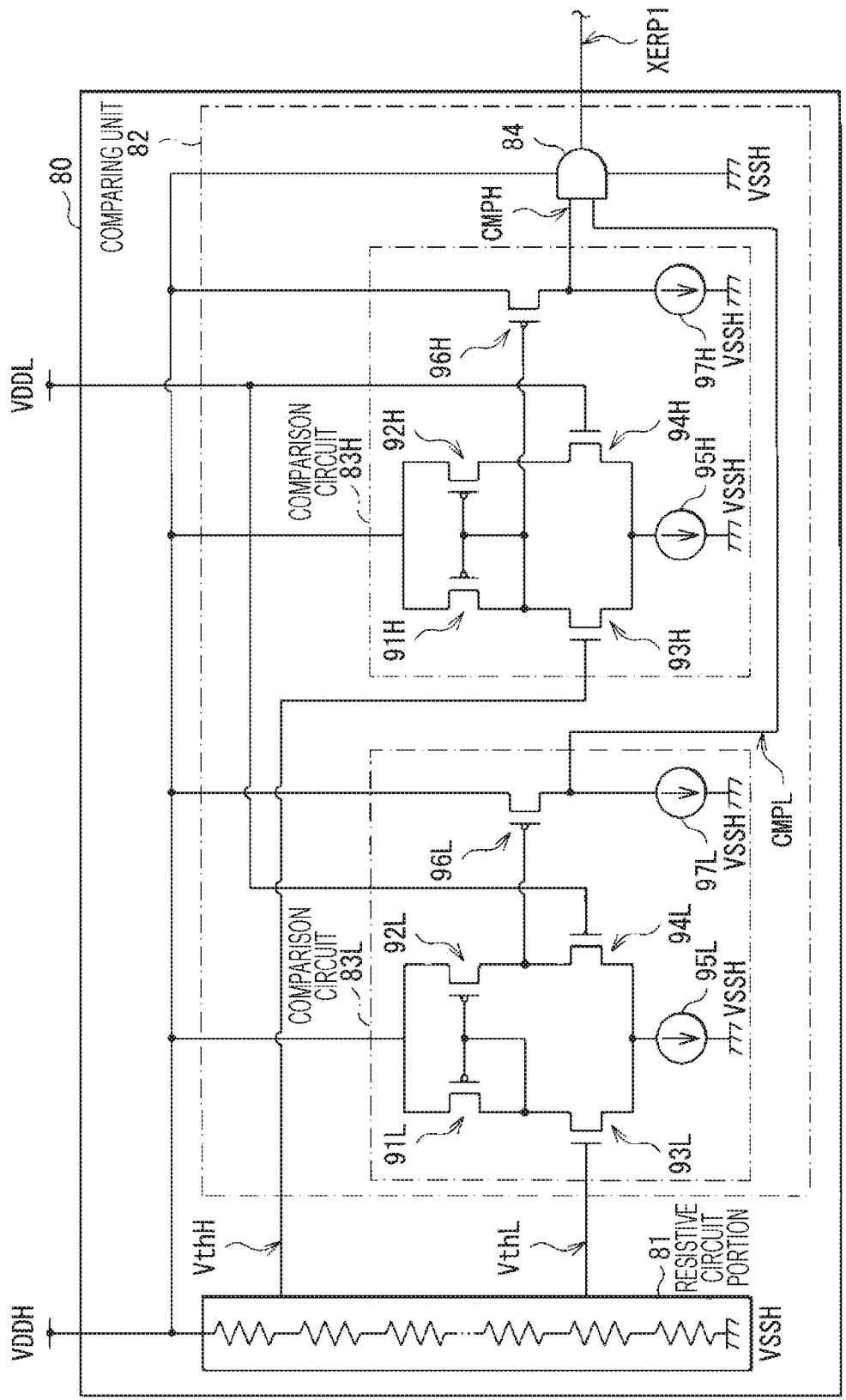
FIG. 10 is a circuit diagram illustrating a configuration example of a power voltage comparing unit illustrated in FIG. 1.

FIG. 10 illustrates a configuration example of the power voltage comparing unit 80. The power voltage comparing unit 80 includes a resistive circuit portion 81 and a comparing unit 82.

The resistive circuit portion 81 includes a plurality of resistive elements which are connected in series. The power voltage VDDH is supplied to one end of the resistive circuit portion 81, and the ground voltage VSSH is supplied to the other end. Further, the resistive circuit portion 81 generates the threshold voltage VthL (0.8 V in this example) and the threshold voltage VthH (1.4 V in this example) by dividing the power voltage VDDH.

The comparing unit 82 includes comparison circuits 83L and 83H and an AND circuit 84.

The comparison circuit 83L compares the power voltage VDDL with the threshold voltage VthL. Then, the comparison circuit 83L generates a signal CMPL which becomes a high level in a case in which the power voltage VDDL is higher than the threshold voltage VthL and becomes a low level in a case in which the power voltage VDDL is lower than the threshold voltage VthL.

The comparison circuit 83L includes transistors 91L, 92L, 93L, and 94L, a current source 95L, a transistor 96L, and a current source 97L. The transistors 91L, 92L, and 96L are P-type MOS transistors, and the transistors 93L and 94L are N-type MOS transistors. A source of the transistor 91L is supplied with the power voltage VDDH, a gate is connected to a gate of the transistor 92L and drains of the transistors 91L and 93L, and a drain is connected to the gates of the transistors 91L and 92L and a drain of the transistor 93L. A source of the transistor 92L is supplied with the power voltage VDDH, the gate is connected to the gate of the transistor 91L and the drains of the transistors 91L and 93L, and the drain is connected to the drain of the transistor 94L and the gate of the transistor 96L. The drain of the transistor 93L is connected to the gates of the transistors 91L and 92L and the drain of the transistor 91L, the gate is supplied with the threshold voltage VthL, the source is connected to the source of the transistor 94L and the one end of the current source 95L. A drain of the transistor 94L is connected to the drain of the transistor 92L and a gate of the transistor 96L, a gate is supplied with the power voltage VDDL, a source is connected to the source of the transistor 93L and the one end of the current source 95L. One end of the current source 95L is connected to the sources of the transistors 93L and 94L, and the other end is supplied with the ground voltage VSSH. A source of the transistor 96L is supplied with the power voltage VDDH, the gate is connected to the drains of the transistors 92L and 94L, and a drain is connected to one end of the current source 97L. One end of the current source 97L is connected to the drain of the transistor 96L, and the other end is supplied with the ground voltage VSSH. With this configuration, the comparison circuit 83L compares the power voltage VDDL with the threshold voltage VthL, and outputs the signal CMPL corresponding to the comparison result from the drain of the transistor 96L. The signal CMPL becomes a high level in a case in which the power voltage VDDL is higher than threshold voltage VthL and becomes a low level in a case in which the power voltage VDDL is lower than the threshold voltage VthL.

The comparison circuit 83H compares the power voltage VDDL with the threshold voltage VthH. Then, the comparison circuit 83H generates a signal CMPH which becomes a high level in a case in which the power voltage VDDL is lower than the threshold voltage VthH and becomes a low level in a case in which the power voltage VDDL is higher than the threshold voltage VthH.

The comparison circuit 83H has transistors 91H, 92H, 93H, and 94H, a current source 95H, a transistor 96H, and a current source 97H. The transistors 91H, 92H, 96H are P-type MOS transistors, and the transistors 93H and 94H are N-type MOS transistors. A source of the transistor 91H is supplied with the power voltage VDDH, a gate is connected to gates of the transistors 92H and 96H and drains of the transistors 91H and 93H, and a drain is connected to gates of the transistors 91H, 92H and 96H and a drain of the transistor 93H. A source of the transistor 92H is supplied with the power voltage VDDH, the gate is connected to the gates of the transistors 91H and 96H and the drains of the transistors 91H and 93H, and a drain is connected to a drain of the transistor 94H. The drain of the transistor 93H is connected to the gates of the transistors 91H, 92H, 96H and the drain of the transistor 91H, a gate is supplied with the threshold voltage VthH, a source is connected to the source of the transistor 94H and the one end of the current source 95H. The drain of the transistor 94H is connected to the drain of the transistor 9H, the gate is supplied with the power voltage VDDL, the source is connected to the source of the transistor 93H and the one end of the current source 95H. One end of the current source 95H is connected to the sources of the transistors 93H and 94H, and the other end is supplied with the ground voltage VSSH. A source of the transistor 96H is supplied with the power voltage VDDH, the gate is connected to the gates of the transistors 91H and 92H and the drains of the transistors 91H and 93H, and a drain is connected to one end of the current source 97H. One end of the current source 97H is connected to the drain of the transistor 96H, and the other end is supplied with the ground voltage VSSH. With this configuration, the comparison circuit 83H compares the power voltage VDDL with the threshold voltage VthH, and outputs the signal CMPH corresponding to the comparison result from the drain of the transistor 96H. The signal CMPH becomes a high level in a case in which the power voltage VDDL is lower than the threshold voltage VthH and becomes a low level in a case in which the power voltage VDDL is higher than the threshold voltage VthH.

The AND circuit 84 obtains a logical product (AND) of the signal CMPL and the signal CMPH and outputs the result as a signal XERP1. The power voltage VDDH and the ground voltage VSSH are supplied to the AND circuit 84.

With this configuration, the power voltage comparing unit 80 sets the signal XERP1 to "1" in a case in which the power voltage VDDL is the threshold voltage VthL or more and the threshold voltage VthH or less, and sets the signal XERP1 "0" in a case in which the power voltage VDDL is smaller than the threshold voltage VthL and higher than the threshold voltage VthH.

Figure 11:
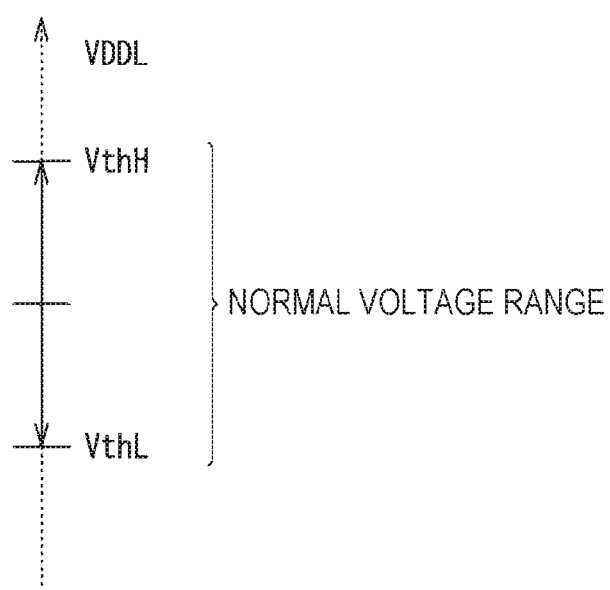
FIG. 11 is an explanatory diagram illustrating an operation example of a power voltage comparing unit illustrated in FIG. 10.

FIG. 11 illustrates an operation example of the power voltage comparing unit 80. The power voltage comparing unit 80 determines that it is normal in a case in which the power voltage VDDL is the threshold voltage VthL (for example, 0.8 V) or more and the threshold voltage VthH (for example, 1.4 V) or less, and determines that a defects occurs in a case in which the power voltage VDDL is lower than the threshold voltage VthL or in a case in which the power voltage VDDL is higher than the threshold voltage VthH. Then, in the imaging device 1, in a case in which the power voltage comparing unit 80 determines that a defect occurs in the power voltage VDDL, the error flag signal XERP is set to the low level (active).

Figure 12:
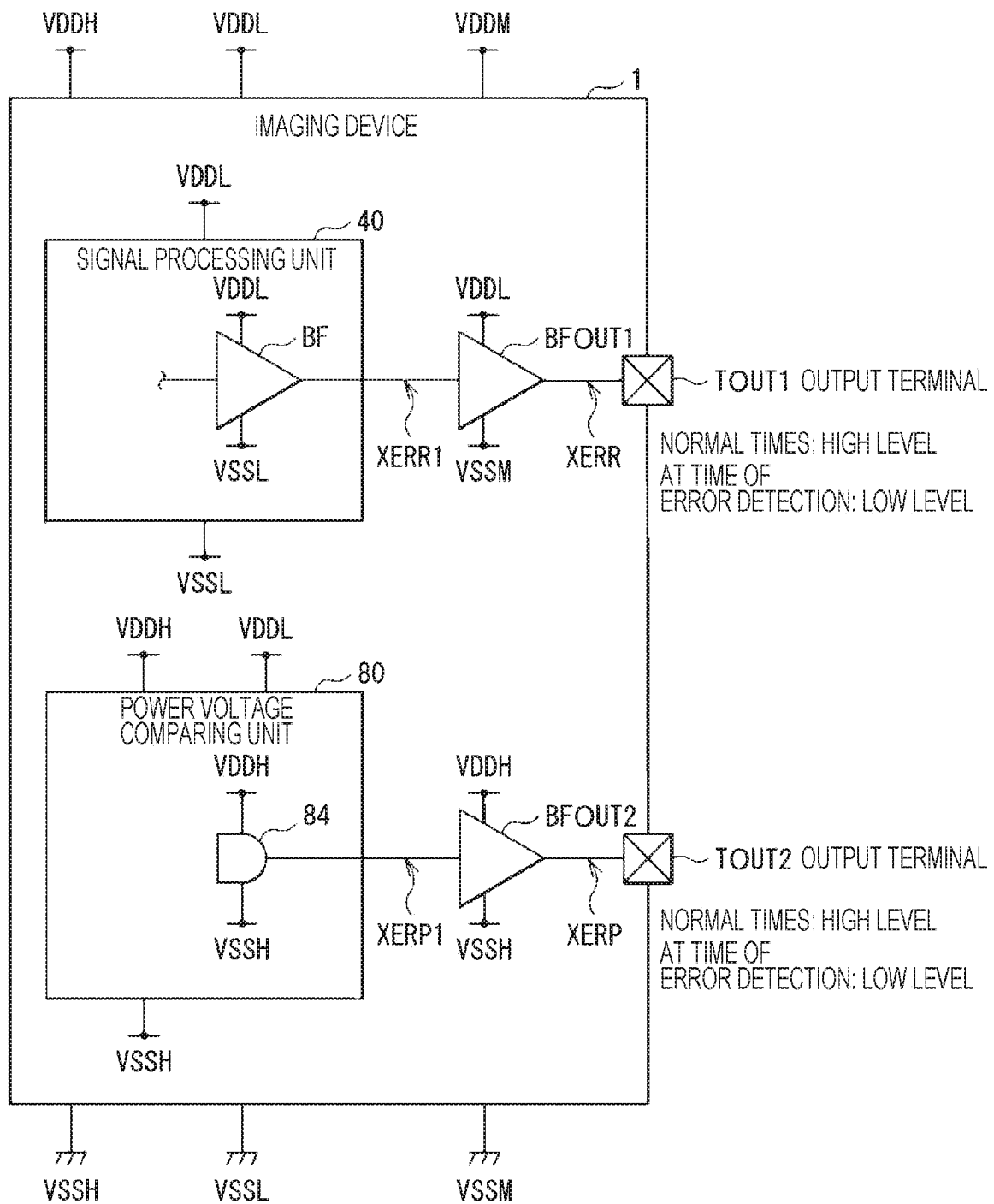
FIG. 12 is an explanatory diagram illustrating a configuration example of a circuit that outputs an error flag signal illustrated in FIG. 1.

FIG. 12 illustrates a configuration example of a circuit that outputs the error flag signals XERR and XERP in the imaging device 1. Three power voltages VDD (the power voltages VDDH, VDDM, and VDDL) and three ground voltages VSS (ground voltages VSSH, VSSM, and VSSL) are supplied to the imaging device 1. The power voltage VDDH is, for example, 3.3 V, the power voltage VDDM is, for example, 1.8 V, and the power voltage VDDL is, for example, 1.1 V. All the ground voltages VSSH, VSSM, and VSSL are 0 V.

The signal processing unit 40 includes a buffer BF. The buffer BF generates a signal XERR1. Since the power voltage VDDL and the ground voltage VSSL are supplied to the signal processing unit 40, the buffer BF operates on the basis of the power voltage VDDL and the ground voltage VSSL. The signal XERR1 generated by the buffer BF is a logical signal which transits between the power voltage VDDL and the ground voltage VSSL. The signal XERR1 is a so-called negative logical signal which becomes a high level (the power voltage VDDL) in a case in which no defect is confirmed by the voltage determining unit 42 of the signal processing unit 40 and becomes a low level (the ground voltage VSSL) in a case in which a defect is confirmed.

Since the power voltage VDDH and the ground voltage VSSH are supplied to the AND circuit 84 of the power voltage comparing unit 80 as illustrated in FIG. 10, the AND circuit 84 operates on the basis of the power voltage VDDH and the ground voltage VSSH. The signal XERP1 generated by the AND circuit 84 is a logical signal which transitions between the power voltage VDDH and the ground voltage VSSH. The signal XERP1 is a so-called negative logical signal which becomes a high level (the power voltage VDDH) in a case in which a defect is not confirmed in the power voltage comparing unit 80 and becomes a low level (the ground voltage VSSH) in a case in which a defect is confirmed.

The imaging device 1 includes output buffers BFOUT1 and BFOUT2.

The output buffer BFOUT1 generates the error flag signal XERR on the basis of the signal XERR1 and outputs the error flag signal XERR via an output terminal TOUT1. The output buffer BFOUT1 operates on the basis of the power voltage VDDM and the ground voltage VSSM. The error flag signal XERR is a logical signal which transitions between the power voltage VDDM and the ground voltage VSSM. The error flag signal XERR is a so-called negative logical signal which becomes a high level (the power voltage VDDM) in a case in which a defect is not confirmed in the voltage determining unit 42 of the signal processing unit 40 and becomes a low level (the ground voltage VSSM) in a case in which a defect is confirmed.

The output buffer BFOUT2 generates the error flag signal XERP on the basis of the signal XERP1 and outputs the error flag signal XERP via an output terminal TOUT2. The output buffer BFOUT2 operates on the basis of the power voltage VDDH and the ground voltage VSSH. The error flag signal XERP is a logical signal which transitions between the power voltage VDDH and the ground voltage VSSH. The error flag signal XERP is a negative logical signal which becomes a high level (the power voltage VDDH) in a case in which a defect is not confirmed in the power voltage comparing unit 80 and becomes a low level (the ground voltage VSSH) in a case in which a defect is confirmed.

Next, an implementation of the imaging device 1 will be described. In the imaging device 1, the blocks illustrated in FIG. 1 may be formed, for example, on a single semiconductor substrate or on a plurality of semiconductor substrates.

Figure 13:
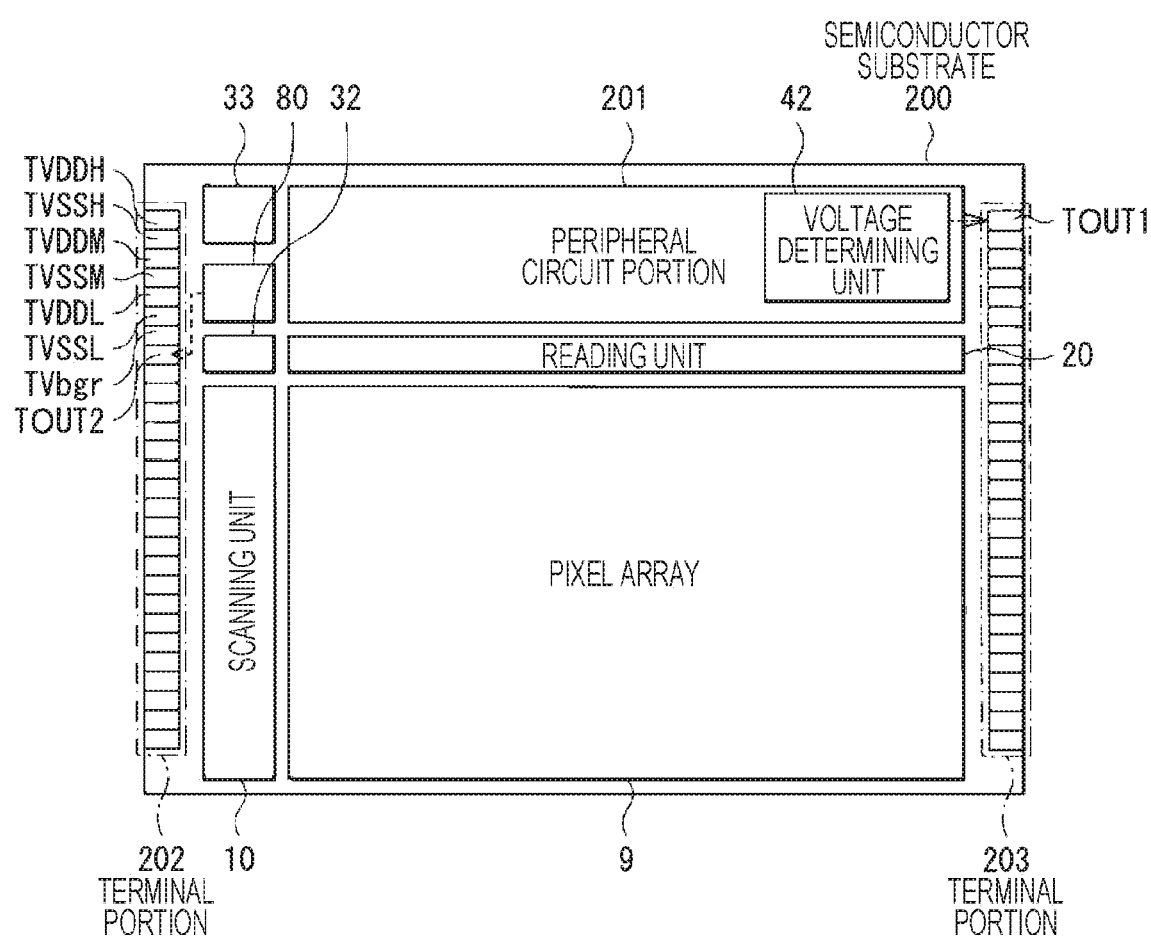
FIG. 13 is an explanatory diagram illustrating an example of a circuit arrangement of an imaging device illustrated in FIG. 1.

FIG. 13 illustrates an example of a circuit arrangement in a case in which the imaging device 1 is formed on a single semiconductor substrate 200. The pixel array 9 is formed on the semiconductor substrate 200. Further, in FIG. 13, the scanning unit 10 is formed on the left of the pixel array 9, and the reading unit 20 and a peripheral circuit portion 201 are formed on the pixel array 9 in the described order. The peripheral circuit portion 201 corresponds to circuits other than the standard voltage generating unit 32 and the voltage sensor 33 among a plurality of circuits included in the imaging control unit 30, and a circuit corresponding to the signal processing unit 40. The voltage determining unit 42 is formed on the right in the region in which the peripheral circuit portion 201 is formed. The standard voltage generating unit 32 is formed on the left of the reading unit 20, and the voltage sensor 33 and the power voltage comparing unit 80 are formed on the left of the peripheral circuit portion 201. Further, a terminal portion 202 in which a plurality of terminals (pad electrodes) are formed in parallel is disposed at the left end of the semiconductor substrate 200, and similarly, a terminal portion 203 in which a plurality of terminals are formed in parallel is disposed at the right end of the semiconductor substrate 200.

A power terminal TVDDH to which a power voltage VDDH is supplied, a ground terminal TVSSH to which the ground voltage VSSH is supplied, a power terminal TVDDM to which the power voltage VDDM is supplied, a ground terminal TVSSM to which the ground voltage VSSM is supplied, a power terminal TVDDL to which the power voltage VDDL is applied, a ground terminal TVSSL to which the ground voltage VSSL is supplied, and a terminal TVbgr from which the voltage Vbgr is output are arranged at a position close to the standard voltage generating unit 32, the voltage sensor 33, and the power voltage comparing unit 80 in the terminal portion 202, for example. Accordingly, in the imaging device 1, for example, it is possible to suppress a voltage drop in a wiring between the power terminals TVDDH, TVDDM, and TVDDL and the ground terminals TVSSH, TVSSM, and TVSSL and the voltage sensor 33, and it is possible to suppress a voltage drop in a wiring between the power terminals TVDDH and TVDDL and the ground terminal TVSSH and the power voltage comparing unit 80, and thus it is possible to improve the voltage detection accuracy. For example, a distance between the power terminal TVDDH and the power voltage comparing unit 80 is designed to be smaller than a distance between the power terminal TVDDH and the pixel array 9. Further, for example, a distance between the power terminal TVDDL and the power voltage comparing unit 80 is designed to be smaller than a distance between the power terminal TVDDL and the image processing unit 41 in the peripheral circuit portion 201.

Further, the output terminal TOUT1 from which the error flag signal XERR is output is arranged, for example, at a position close to the voltage determining unit 42 in the terminal portion 203. Accordingly, it is possible to decrease a signal path between the output terminal TOUT1 and the voltage determining unit 42. Further, the output terminal TOUT2 from which the error flag signal XERP is output is arranged, for example, at a position close to the power voltage comparing unit 80 in the terminal portion 202. Accordingly, it is possible to decrease a signal path between the output terminal TOUT2 and the power voltage comparing unit 80.

Figure 14:
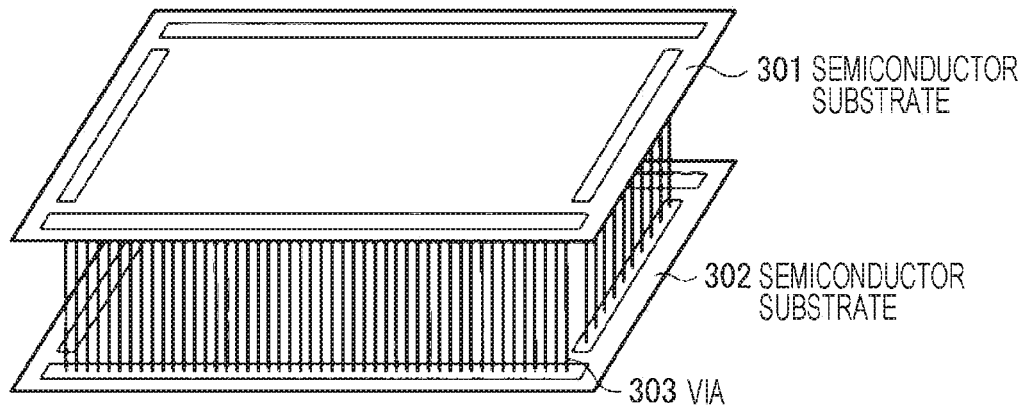
FIG. 14 is an explanatory diagram illustrating a configuration example of an imaging device illustrated in FIG. 1.

FIG. 14 illustrates a connection example of two semiconductor substrates 301 and 302 in a case in which the imaging device 1 is formed on the two semiconductor substrates 301 and 302. In this example, the semiconductor substrates 301 and 302 are overlapped and connected to each other via a plurality of vias 303. For example, the pixel array 9 can be formed on the semiconductor substrate 301. Further, the scanning unit 10, the reading unit 20, the imaging control unit 30, the signal processing unit 40, the storage unit 8, and the power voltage comparing unit 80 can be formed on the semiconductor substrate 302. For example, a plurality of control lines TGLL, FDGL, RSTL, FCGL, TGSL, and SELL in the semiconductor substrate 301 are connected to the scanning unit 10 in the semiconductor substrate 302 via a plurality of vias 303A. Further, for example, a plurality of signal lines SGL in the semiconductor substrate 301 are connected to the reading unit 20 in the semiconductor substrate 302 via a plurality of vias 303B. Further, the layout of each circuit is not limited to this example, and for example, the scanning unit 10 may be formed on the semiconductor substrate 301.

Figure 15:
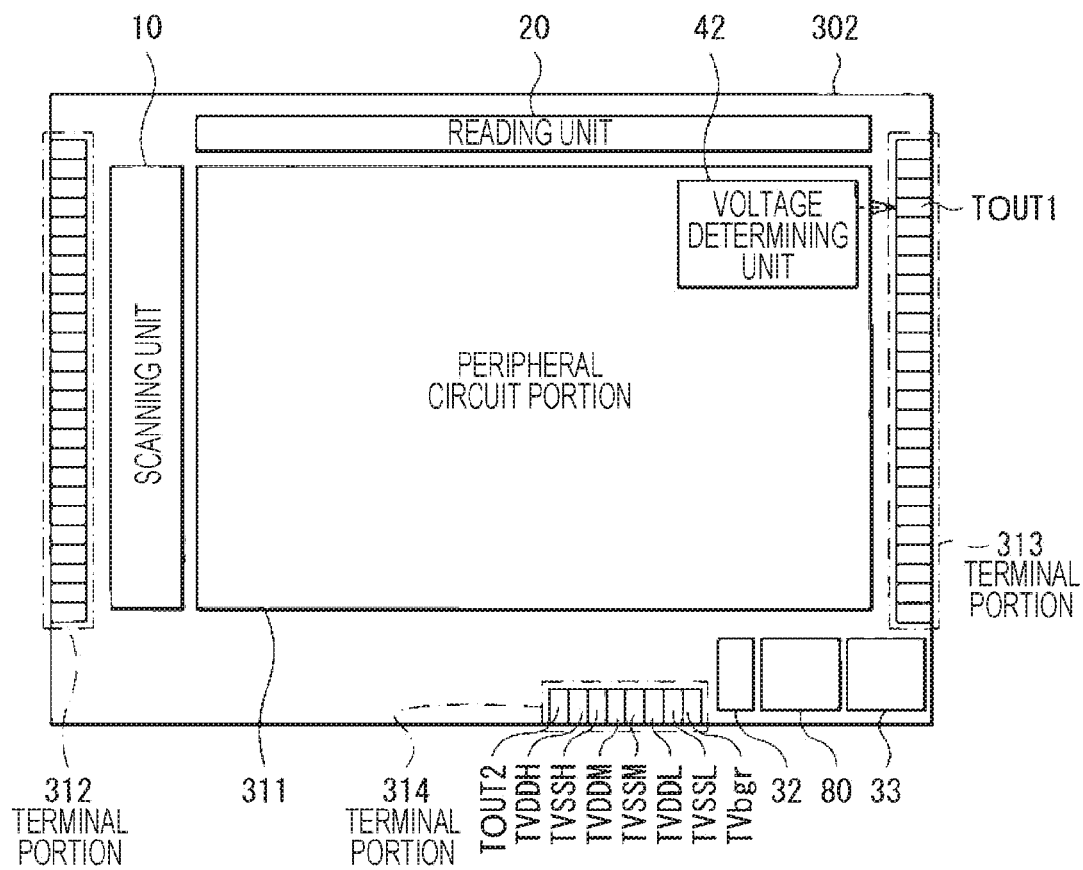
FIG. 15 is an explanatory diagram illustrating an example of another circuit arrangement of an imaging device illustrated in FIG. 1.

FIG. 15 illustrates an example of a circuit arrangement in the semiconductor substrate 302. A peripheral circuit portion 311 is formed near the center of the semiconductor substrate 302. The peripheral circuit portion 311 corresponds to circuits other than the standard voltage generating unit 32 and the voltage sensor 33 among a plurality of circuits included in the imaging control unit 30 and a circuit corresponding to the signal processing unit 40. The voltage determining unit 42 is formed at an upper right portion in the region in which this peripheral circuit portion 311 is formed. Further, in FIG. 14, the scanning unit 10 is formed on the left of the peripheral circuit portion 311, and the reading unit 20 is formed on the peripheral circuit portion 311. Further, the standard voltage generating unit 32, the power voltage comparing unit 80, and the voltage sensor 33 are formed at a lower right portion of the peripheral circuit portion 311. Further, a terminal portion 312 in which a plurality of terminals (pad electrodes) are formed in parallel is disposed at the left end of the semiconductor substrate 302, a terminal portion 313 in which a plurality of terminals are formed in parallel is similarly disposed at the right end of the semiconductor substrate 302, and a terminal portion 314 in which a plurality of terminals are formed in parallel is disposed on the right side of the lower end of the semiconductor substrate 302. The terminal portion 314 is arranged at a position close to the standard voltage generating unit 32, the power voltage comparing unit 80, and the voltage sensor 33.

The power terminals TVDDH, TVDDM, and TVDDL, the ground terminal TVSSH, TVSSM, and TVSSL, and the terminal TVbgr are arranged, for example, at a position close to the terminal portion 314. Accordingly, in the imaging device 1, for example, it is possible to suppress a voltage drop in a wiring between the power terminals TVDDH, TVDDM, and TVDDL and the ground terminals TVSSH, TVSSM, and TVSSL and the voltage sensor 33, and it is possible to suppress a voltage drop in a wiring between the power terminals TVDDH and TVDDL and the ground terminal TVSSH and the power voltage comparing unit 80, and thus it is possible to improve the voltage detection accuracy. For example, a distance between the power terminal TVDDH and the power voltage comparing unit 80 is designed to be smaller than a distance between the power terminal TVDDH and the pixel array 9. Further, for example, a distance between the power terminal TVDDL and the power voltage comparing unit 80 is designed to be smaller than a distance between the power terminal TVDDL and the image processing unit 41 in the peripheral circuit portion 311.

Further, the output terminal TOUT1 is arranged, for example, at a position close to the voltage determining unit 42 in the terminal portion 313. Accordingly, it is possible to decrease a signal path between the output terminal TOUT1 and the voltage determining unit 42. Further, the output terminal TOUT2 from which the error flag signal XERP is output is arranged, for example, in the terminal portion 314. Accordingly, it is possible to decrease a signal path between the output terminal TOUT2 and the power voltage comparing unit 80.

Here, the pixel array 9 corresponds to a specific example of an "imaging unit" in the present disclosure. The power voltage VDDH corresponds to a specific example of a "first power voltage" in the present disclosure. The image processing unit 41 corresponds to a specific example of an "image processing unit" in the present disclosure. The power voltage VDDL corresponds to a specific example of a "second power voltage" in the present disclosure. The resistive circuit portion 81 corresponds to a specific example of a "reference voltage generating unit" in the present disclosure. The comparing unit 82 corresponds to a specific example of a "first flag generating unit" in the present disclosure. The error flag signal XERP corresponds to a specific example of a "first flag signal" in the present disclosure. The threshold voltage VthL corresponds to a specific example of a "first reference voltage" in the present disclosure. The threshold voltage VthH corresponds to a specific example of a "second reference voltage" in the present disclosure. The standard voltage generating unit 32 corresponds to a specific example of a "standard voltage generating unit" in the present disclosure. The power terminal TVDDH corresponds to a specific example of a "first power terminal" in the present disclosure. The power terminal TVDDL corresponds to a specific example of a "second power terminal" in the present disclosure. The reading unit 20 and the calculating unit 43 correspond to a specific example of a "data generating unit" in the present disclosure. The reading unit 20 corresponds to a specific example of a "converting unit" in the present disclosure. The calculating unit 43 corresponds to a specific example of a "calculating unit" in the present disclosure. The determining unit 44 corresponds to a specific example of a "second flag generating unit" in the present disclosure. The error flag signal XERR corresponds to a specific example of a "second flag signal" in the present disclosure. The voltage code VCODEH corresponds to a specific example of "power voltage data" in the present disclosure. The threshold value THmax or the threshold value THmin corresponds to an example of "reference data" in the present disclosure.

[Operation and Action]

Next, an operation and action of the imaging device 1 of the present embodiment will be described.

(Overview of Overall Operation)

First, an overview of an overall operation of the imaging device 1 will be described with reference to FIGS. 1 and 4. The scanning unit 10 sequentially drives the imaging pixel P1 in the pixel array 9 in units of pixel lines L. The imaging pixel P1 sequentially outputs the eight pixel voltages VP1 to VP8 in the eight conversion periods T1 to T8. The AD converting unit ADC of the reading unit 20 performs AD conversion on the basis of the eight pixel voltages VP1 to VP8 and outputs the eight digital codes CODE (the digital codes CODE1 to CODE8). The image processing unit 41 of the signal processing unit 40 generates the four images PIC (the images PIC1 to PIC4) on the basis of the eight digital codes CODE1 to CODE8 included in the image signal DATA0. Further, the signal processing unit 40 synthesizes the four images PIC, generates one captured image PICA, and outputs the captured image PICA as the image signal DATA. Further, in the vertical blanking period, the AD converting unit ADC converts the voltage of the signal SIGV into the digital code CODE by performing AD conversion on the basis of the signal SIGV supplied from the voltage sensor 33 of the imaging control unit 30. The voltage determining unit 42 of the signal processing unit 40 generates the voltage code VCODEH corresponding to the power voltage VDDH, the voltage code VCODEM corresponding to the power voltage VDDM, the voltage code VCODEL corresponding to the power voltage VDDL, and the voltage code VCODER corresponding to the voltage Vbgr on the basis of the digital code CODE obtained on the basis of the signal SIGV in the vertical blanking period included in the image signal DATA0. Further, the voltage determining unit 42 checks whether or not the values (the voltage values) indicated by the four voltage codes VCODE (the voltage codes VCODEH, VCODEM, VCODEL, and VCODER) falls within predetermined ranges set corresponding to the four voltage codes VCODE. Then, in a case in which it is determined that a defect occurs in one or more of the power voltages VDDH, VDDM, and VDDL and the voltage Vbgr, the imaging device 1 sets the error flag signal XERR to the low level (active). Further, the power voltage comparing unit 80 detects whether or not the power voltage VDDL falls within a predetermined voltage range over a period in which the power voltage VDD is supplied to the imaging device 1. Then, the imaging device 1 sets the error flag signal XERP to the low level (active) in a case in which it is determined that a defect occurs in the power voltage VDDL.

(Detailed Operation)

In the imaging device 1, each of the imaging pixels P1 in the pixel array 9 accumulates electric charges in accordance with the amount of received light and outputs the pixel voltage VP as the signal SIG. This operation will be described below in detail.

Figure 16:
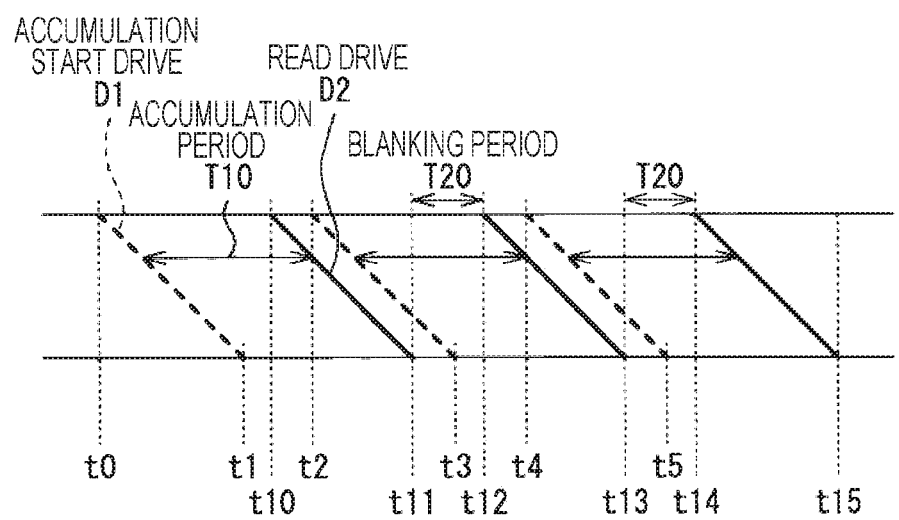
FIG. 16 is a timing diagram illustrating an operation example of an imaging device illustrated in FIG. 1.

FIG. 16 illustrates an example of an operation of scanning a plurality of imaging pixels P1 in the pixel array 9.

The imaging device 1 performs an accumulation start drive D1 on a plurality of imaging pixels P1 in the pixel array 9 in order from the top in the vertical direction in a period of timings t0 to t1. Specifically, for example, the scanning unit 10 sets the transistors TGL, RST, FDG, TGS, and FCG to the ON state in a predetermined period within the horizontal period H in units of pixel lines L in order from the top in the vertical direction, and then sets these transistors to the OFF state. Accordingly, electric charges are accumulated in each of a plurality of imaging pixels P1 in an accumulation period T10 before a read drive D2 is performed.

Further, the imaging device 1 performs the read drive D2 on a plurality of imaging pixels P1 in order from the top in the vertical direction in a period of timings t10 to tn. Accordingly, each of a plurality of imaging pixels P1 sequentially outputs the eight pixel voltages VP1 to VP8. The reading unit 20 performs the AD conversion on the basis of the eight pixel voltages VP1 to VP8, and outputs the eight digital codes CODE (the digital codes CODE1 to CODE8).

Then, the signal processing unit 40 generates the four images PIC (the images PIC1, PIC2, PIC3, and PIC4) on the basis of the eight digital codes CODE1 to CODE8 supplied from the reading unit 20, synthesizes the four images PIC, and generates one captured image PICA.

The imaging device 1 repeats the accumulation start drive D1 and the read drive D2. Specifically, as illustrated in FIG. 16, the imaging device 1 performs the accumulation start drive D1 in a period of timings t2 to t3 and performs the read drive D2 in a period of timings t12 to t13. Further, the imaging device 1 performs the accumulation start drive D1 in a period of timings t4 to t5 and performs the read drive D2 in a period of timings t14 to t15.

(Read Drive D2)

Next, the read drive D2 will be described in detail. An operation of an imaging pixel P1A will be described below in detail focusing on the imaging pixel P1A among a plurality of imaging pixels P1.

FIGS. 17, 18A, and 18B illustrate an operation example of the imaging device 1. In FIG. 17, (A) illustrates a waveform of a horizontal synchronization signal XHS, (B) illustrates a waveform of the signal SSEL supplied to the imaging pixel P1A, (C) illustrates a waveform of the signal SRST supplied to the imaging pixel P1A, (D) illustrates a waveform of the signal SFDG supplied to the imaging pixel P1A, (E) illustrates a waveform of the signal STGL supplied to the imaging pixel P1A, (F) illustrates a waveform of the signal SFCG supplied to the imaging pixel P1A, (G) illustrates a waveform of the signal STGS supplied to the imaging pixel P1A, (H) illustrates a waveform of the reference signal REF, (I) illustrates a waveform of the signal SIG output from the imaging pixel P1A, and (J) illustrates an operation of the counter 25 in the AD converting unit ADC connected to imaging pixel P1A. FIG. 18A illustrates an operation of a first half in the operation illustrated in FIG. 17, and FIG. 18B illustrates an operation of a second half in the operation illustrated in FIG. 17. In (H) and (I) of FIG. 17, (H) and (I) of FIG. 18A, and (H) and (I) of FIG. 18B, the waveform of each signal is indicated by the same voltage axis. The reference signal REF in (H) of FIG. 17, (H) of FIG. 18A, and (H) of FIG. 18B indicates the waveform at the positive input terminal of the comparator 24, and the signal SIG in (I) of FIG. 17, (I) of FIG. 18A, and (I) of FIG. 18B indicates the waveform at the negative input terminal of the comparator 24. Further, in (J) of FIG. 17, (J) of FIG. 18A, and (J) of FIG. 18B, hatching indicates that the counter 25 is performing the count operation.

Figure 19A:
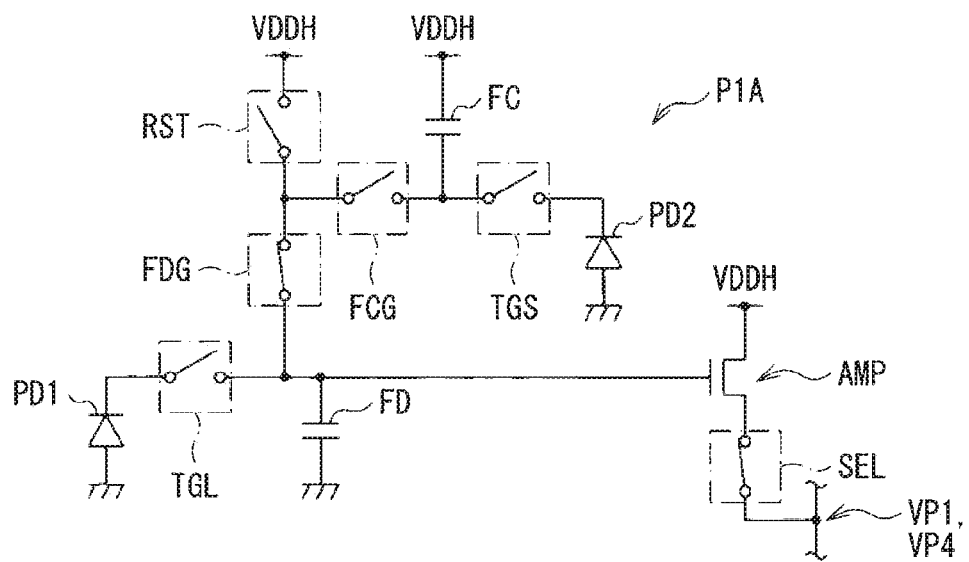
FIG. 19A is an explanatory view illustrating an operation state of an imaging device illustrated in FIG. 1.
Figure 19B:
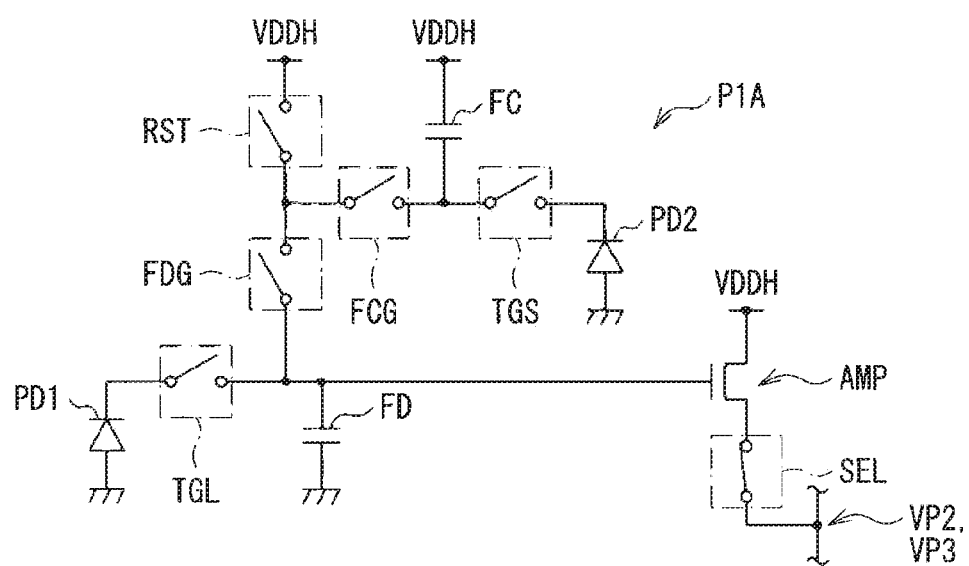
FIG. 19B is an explanatory view illustrating another operation state of an imaging device illustrated in FIG. 1.
Figure 19C:
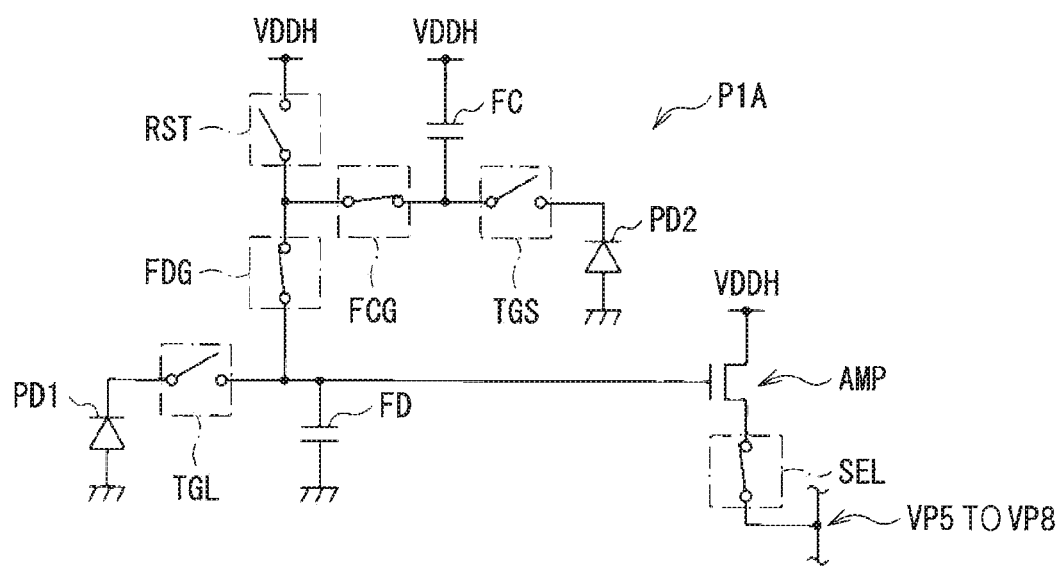
FIG. 19C is an explanatory view illustrating another operation state of an imaging device illustrated in FIG. 1.

FIGS. 19A, 19B, and 19C illustrate the state of the imaging pixel P1A. In FIGS. 19A, 19B, and 19C, the transistors TGL, RST, FDG, TGS, FCG, and SEL are indicated using the switches corresponding to the operation states of the transistors.

In the read drive D2, the imaging control unit 30 sets the control signal SSELV (FIG. 4) to the low level. Accordingly, in the reading unit 20, the transistor 29 becomes the OFF state in each of a plurality of AD converting units ADC. Accordingly, the AD converting unit ADC performs the AD conversion on the basis of the signal SIG supplied via the signal line SGL.

In the imaging device 1, in a certain horizontal period H, the scanning unit 10 first selects the pixel line L including the imaging pixel P1A using the signal SSEL, and causes the imaging pixel P1A to be electrically connected to the signal line SGL corresponding to the imaging pixel P1A. Then, the scanning unit 10 controls the operation of the imaging pixel P1A using the signals SRST, SFDG, STGL, SFCG, and STGS, and the imaging pixel P1A sequentially outputs the eight pixel voltages VP1 to VP8 in the eight conversion periods T1 to T8. Further, the AD converting unit ADC of the reading unit 20 performs the AD conversion on the basis of the eight pixel voltages VP1 to VP8, and outputs the eight digital codes CODE1 to CODER. This operation will be described below in detail.

First, if the horizontal period H starts at a timing t1, the scanning unit 10 causes the voltage of the signal SSEL to be changed from the low level to the high level at a timing t2 ((B) of FIG. 18A). Accordingly, in the imaging pixel P1A, the transistor SEL enters the ON state, and the imaging pixel P1A is electrically connected to the signal line SGL.

In a period before a timing t11, the scanning unit 10 sets the signals SRST and SFDG to the high level ((C) and (D) of FIG. 18A). Accordingly, in the imaging pixel P1A, both the transistors RST and FDG enter the ON state, the voltage of the floating diffusion FD is set to the power voltage VDD, and the floating diffusion FD is reset.

(Operation of Timings t11 to t21)

Then, at the timing t11, the scanning unit 10 causes the voltage of the signal SFDG to be changed from the high level to the low level ((D) of FIG. 18A). Accordingly, in the imaging pixel P1A, the transistor FDG enters the OFF state. Then, at a timing t12, the scanning unit 10 causes the voltage of the signal SRST to be changed from the high level to the low level ((C) of FIG. 18A). Accordingly, in the imaging pixel P1A, the transistor RST enters the OFF state. Then, at a timing t13, the scanning unit 10 causes the voltage of the signal SFDG to be changed from the low level to the high level (FIG. 18A (D)). Accordingly, in the imaging pixel P1A, the transistor FDG enters the ON state. Further, the comparator 24 performs the zero adjustment for electrically connecting the positive input terminal with the negative input terminal in a period of the timing t13 to a timing t14.

Then, at the timing t14, the comparator 24 ends the zero adjustment and electrically disconnects the positive input terminal from the negative input terminal. Then, at the timing t14, the reference signal generating unit 31 causes the voltage of the reference signal REF to be changed to a voltage V1 ((H) of FIG. 18A).

Accordingly, in the imaging pixel P1A, as illustrated in FIG. 19A, the transistors FDG and SEL enter the ON state, and all the other transistors enter the OFF state. Since the transistor FDG is in the ON state, the floating diffusion FD and the transistor FDG constitute a synthesis capacitor.

The synthesis capacitor functions as a conversion capacitor of converting electric charges to a voltage in the imaging pixel P1A. In the imaging pixel P1A, since the transistor FDG is in the ON state, a capacitance value of the conversion capacitor of the imaging pixel P1A is large, and thus the conversion efficiency from the electric charges to the voltage is low. The conversion capacitor holds the electric charge when the floating diffusion FD is reset in a period before the timing t12. The imaging pixel P1A outputs the pixel voltage VP (the pixel voltage VP1) corresponding to the voltage at the floating diffusion FD at this time.

Then, in a period (the conversion period T1) of timings t15 to t17, the AD converting unit ADC performs the AD conversion on the basis of this pixel voltage VP1. Specifically, at the timing t15, the imaging control unit 30 starts to generate the clock signal CLK, and at the same time, the reference signal generating unit 31 starts to lower the voltage of the reference signal REF by a predetermined change degree from the voltage V1 ((H) of FIG. 18A). In response to this, the counter 25 of the AD converting unit ADC starts the count operation ((J) of FIG. 18A).

Then, at a timing t16, the voltage of the reference signal REF is lower than the voltage of the signal SIG (the pixel voltage VP1) ((H) and (I) of FIG. 18A). In response to this, the comparator 24 of the AD converting unit ADC causes the voltage of the signal CMP to be changed, and the counter 25 stops the count operation accordingly ((J) of FIG. 18A). The count value CNT of the counter 25 when the count operation is stopped corresponds to the pixel voltage VP1. As described above, the AD converting unit ADC performs the AD conversion on the basis of the pixel voltage VP1, and the latch 26 of the AD converting unit ADC outputs the count value CNT of the counter 25 as the digital code CODE1 ((J) of FIG. 18A).

Then, at a timing t17, the imaging control unit 30 stops the generation of the clock signal CLK with the end of the conversion period T1, the reference signal generating unit 31 stops the change of the voltage of the reference signal REF ((H) of FIG. 18A), and the counter 25 resets the count value CNT.

(Operation of Timings t21 to t31)

Then, at a timing t21, the scanning unit 10 causes the voltage of the signal SFDG to be changed from the high level to the low level ((D) of FIG. 18A). Accordingly, in the imaging pixel P1A, the transistor FDG enters the OFF state. Further, the comparator 24 performs the zero adjustment for electrically connecting the positive input terminal with the negative input terminal in a period of the timing t21 to a timing t22.

Then, at the timing t22, the comparator 24 finishes the zero adjustment and electrically disconnects the positive input terminal from the negative input terminal. Further, at this timing t22, the reference signal generating unit 31 causes the voltage of the reference signal REF to be changed to the voltage V1 ((H) of FIG. 18A).

Accordingly, in the imaging pixel P1A, as illustrated in FIG. 19B, the transistor SEL enters the ON state, and all the other transistors enter the OFF state. In the imaging pixel P1A, since the transistor FDG is in the OFF state as described above, the capacitance value of the conversion capacitor of the imaging pixel P1A is small, and thus the conversion efficiency from the electric charges to the voltage is high. This conversion capacitor holds the electric charges when the floating diffusion FD is reset in a period before the timing t12. The imaging pixel P1A outputs the pixel voltage VP (a pixel voltage VP2) corresponding to the voltage at the floating diffusion FD at this time.

Then, in a period (a conversion period T2) of timings t23 to t25, the AD converting unit ADC performs the AD conversion on the basis of the pixel voltage VP2. This operation is similar to the operation in the conversion period T1. The AD converting unit ADC performs the AD conversion on the basis of the pixel voltage VP2, and the latch 26 of the AD converting unit ADC outputs the count value CNT of the counter 25 as the digital code CODE2 ((J) of FIG. 18A).

(Operation of Timings t31 to t41)

Then, at a timing t31, the scanning unit 10 causes the voltage of the signal STGL to be changed from the low level to the high level ((E) of FIG. 18A). Accordingly, in the imaging pixel HA, the transistor TGL enters the ON state. Accordingly, the electric charges generated in the photodiode PD1 are transferred to the floating diffusion FD. Further, at this timing t31, the reference signal generating unit 31 causes the voltage of the reference signal REF to be changed to the voltage V1 ((H) of FIG. 18A).

Then, at the timing t32, the scanning unit 10 causes the voltage of the signal STGL to be changed from the high level to the low level ((E) of FIG. 18A). Accordingly, in the imaging pixel P1A, the transistor TGL enters the OFF state.

Accordingly, in the imaging pixel HA, since the transistor FDG is in the OFF state as illustrated in FIG. 19B, and the capacitance value of the conversion capacitor in the imaging pixel P1A is small, and thus the conversion efficiency from the electric charges to the voltage is high. The conversion capacitor holds the electric charges transferred from the photodiode PD1 in the timings t31 to t32. The imaging pixel P1A outputs a pixel voltage VP (a pixel voltage VP3) corresponding to the voltage at the floating diffusion FD at this time.

Then, in a period (a conversion period T3) of timings t33 to t35, the AD converting unit ADC performs the AD conversion on the basis of the pixel voltage VP3. The operation is similar to an operation in the conversion period T1. The AD converting unit ADC performs the AD conversion on the basis of the pixel voltage VP3, and the latch 26 of the AD converting unit ADC outputs the count value CNT of the counter 25 as the digital code CODE3 ((J) of FIG. 18A). The digital code CODE3 similarly corresponds to the digital code CODE2 obtained when the conversion efficiency is high (the conversion period T2).

(Operation of Timings t41 to t51)

Then, at timing t41, the scanning unit 10 causes the voltage of the signal SFDG to be changed from the low level to the high level and causes the voltage of the signal STGL to be changed from the low level to the high level ((D) and (E) of FIG. 18A). Accordingly, in the imaging pixel P1A, both the transistors FDG and TGL enter the ON state. Further, at the timing t41, the reference signal generating unit 31 causes the voltage of the reference signal REF to be changed to the voltage V1 ((H) of FIG. 18A). Then, the scanning unit 10 causes the voltage of the signal STGL to be changed from the high level to the low level at the timing t42 ((E) of FIG. 18A). Accordingly, in the imaging pixel P1A, the transistor TGL enters the OFF state.

Accordingly, in the imaging pixel P1A, as illustrated in FIG. 19A, since the transistor FDG is in an ON state, the floating diffusion FD and the transistor FDG constitute the synthesis capacitor (the conversion capacitor). Therefore, since the capacitance value of conversion capacitor in the imaging pixel P1A is large, the conversion efficiency from the electric charges to the voltage is low. The conversion capacitor holds the electric charges transferred from the photodiode PD1 in the timings t31 to t32 and the timings t41 to t42. The imaging pixel P1A outputs a pixel voltage VP (a pixel voltage VP4) corresponding to the voltage at the floating diffusion FD at the time.

Then, in a period (a conversion period T4) of timings t43 to t45, the AD converting unit ADC performs the AD conversion on the basis of the pixel voltage VP4. The operation is similar to the operation in the conversion period T1. The AD converting unit ADC performs the AD conversion on the basis of the pixel voltage VP4, and the latch 26 of the AD converting unit ADC outputs the count value CNT of the counter 25 as the digital code CODE4 ((J) of FIG. 18A). The digital code CODE4 similarly corresponds to the digital code CODE1 obtained when the conversion efficiency is low (the conversion period T1).

(Operation of Timings t51 to t61)

Then, at a timing t51, the scanning unit 10 causes the voltage of the signal SRST to be changed from the low level to the high level ((C) of FIG. 18B). Accordingly, in the imaging pixel P1A, the transistor RST enters the ON state. Since the transistor FDG is in the ON state, the voltage of the floating diffusion FD is set to the power voltage VDD and the floating diffusion FD is reset. Then, at a timing t52, the scanning unit 10 causes the voltage of the signal SRST to be changed from the high level to the low level ((C) of FIG. 18B). Accordingly, in the imaging pixel P1A, the transistor RST enters the OFF state. Further, at the timing t52, the reference signal generating unit 31 causes the voltage of the reference signal REF to be changed to the voltage V1 ((H) of FIG. 18B).

Then, at a timing t53, the scanning unit 10 causes the voltage of the signal SFCG to be changed from the low level to the high level ((F) of FIG. 18B). Accordingly, in the imaging pixel HA, the transistor FCG enters the ON state. Further, the comparator 24 performs the zero adjustment for electrically connecting the positive input terminal with the negative input terminal in a period of the timing t53 to a timing t54.

Then, at the timing t54, the comparator 24 finishes the zero adjustment and electrically disconnects the positive input terminal from the negative input terminal. Further, at the timing t54, the reference signal generating unit 31 causes the voltage of the reference signal REF to be changed to the voltage V1 (FIG. 18A (H)).

Accordingly, in the imaging pixel P1A, as illustrated in FIG. 19C, the transistors FDG, FCG, and SEL enter the ON state, and all the other transistors enter the OFF state. Since both transistors FDG and FCG are in the ON state, the floating diffusion FD, the transistors FDG and FCG, the capacitive element FC constitute the synthesis capacitor (the conversion capacitor). The conversion capacitor holds the electric charges which are generated in the photodiode PD2 before the timing t53 and then supplied to and accumulated in the capacitive element FC via the transistor TGS. The imaging pixel P1A outputs a pixel voltage VP (a pixel voltage VP5) corresponding to the voltage at the floating diffusion FD at the time.

Then, in the period (conversion period T5) of timings t55 to t57, the AD converting unit ADC performs the AD conversion on the basis of the pixel voltage VP5. The operation is similar to the operation in the conversion period T1. The AD converting unit ADC performs the AD conversion on the basis of the pixel voltage VP5, and the latch 26 of the AD converting unit ADC outputs the count value CNT of the counter 25 as the digital code CODE5 ((J) of FIG. 18B).

(Operation of Timings t61 to t71)

Then, at a timing t61, the scanning unit 10 causes the voltage of the signal STGS to be changed from the low level to the high level ((G) of FIG. 18B). Accordingly, in the imaging pixel P1A, the transistor TGS enters the ON state. Accordingly, the electric charges generated in the photodiode PD2 are transferred to the floating diffusion FD and the capacitive element FC. Further, at the timing t61, the reference signal generating unit 31 causes the voltage of the reference signal REF to be changed to the voltage V1 ((H) of FIG. 18B).

Then, at the timing t62, the scanning unit 10 causes the voltage of the signal STGS to be changed from the high level to the low level ((G) of FIG. 18B). Accordingly, in the imaging pixel P1A, the transistor TGS enters the OFF state.

Accordingly, in the imaging pixel P1A, as illustrated in FIG. 19C, since both the transistors FDG and FCG are in the ON state, the floating diffusion FD, the transistor FDG, the FCG, and the capacitive element FC constitute the synthesis capacitor (the conversion capacitor). The conversion capacitor holds the electric charges transferred from the photodiode PD2 in the timings t61 to t62 in addition to the electric charges which are generated in the photodiode PD2 before the timing t53 and then supplied to and accumulated in the capacitive element FC via the transistor TGS. The imaging pixel P1A outputs a pixel voltage VP (a pixel voltage VP6) corresponding to the voltage at the floating diffusion FD at the time.

Then, in a period of timings t63 to t65 (a conversion period T6), the AD converting unit ADC performs the AD conversion on the basis of the pixel voltage VP6. The operation is similar to the operation in the conversion period T1. The AD converting unit ADC performs the AD conversion on the basis of the pixel voltage VP6, and the latch 26 of the AD converting unit ADC outputs the count value CNT of the counter 25 as the digital code CODE6 ((J) of FIG. 18B). The digital code CODE6 corresponds to the digital code CODE5 obtained when the floating diffusion FD, the transistors FDG and FCG, and the capacitive element FC constitute the synthesis capacitor.

(Operation of Timings t71 to t81)

Then, the comparator 24 performs the zero adjustment for electrically connecting the positive input terminal with the negative input terminal in a period of timings t71 to t72.

Then, at the timing t72, the comparator 24 finishes the zero adjustment and electrically disconnects the positive input terminal from the negative input terminal. Further, at the timing t72, the reference signal generating unit 31 causes the voltage of the reference signal REF to be changed to the voltage V1 ((H) of FIG. 18B).

Accordingly, in the imaging pixel P1A, as illustrated in FIG. 19C, since both the transistors FDG and FCG are in the ON state, the floating diffusion FD, the transistor FDG, the FCG, and the capacitive element FC constitute the synthesis capacitor (the conversion capacitor). The conversion capacitor holds the electric charges transferred from the photodiode PD2 in the timings t61 to t62 in addition to the electric charges which are generated in the photodiode PD2 before the timing t53 and then supplied to and accumulated in the capacitive element FC via the transistor TGS. The imaging pixel P1A outputs a pixel voltage VP (a pixel voltage VP7) corresponding to the voltage in the floating diffusion FD at the time.

Then, in a period (a conversion period T7) of timings t73 to t75, the AD converting unit ADC performs the AD conversion on the basis of the pixel voltage VP7. The operation is similar to the operation in the conversion period T1. The AD converting unit ADC performs the AD conversion on the basis of the pixel voltage VP7, and the latch 26 of the AD converting unit ADC outputs the count value CNT of the counter 25 as the digital code CODE7 ((J) of FIG. 18B).

(Operation of Timings t81 to t7)

Then, at a timing t81, the scanning unit 10 causes the voltage of the signal SRST to be changed from the low level to the high level ((C) of FIG. 18B). Accordingly, in the imaging pixel P1A, the transistor RST enters the ON state. Since the transistors FDG and FCG are in the ON state, the voltage of the floating diffusion FD and the voltage of the capacitive element FC are set to the power voltage VDD, and the floating diffusion FD and the capacitive element FC are reset.

Then, at a timing t82, the scanning unit 10 causes the voltage of the signal SFCG to be changed from the high level to the low level ((F) of FIG. 18B). Accordingly, in the imaging pixel P1A, the transistor FCG enters the OFF state.

Then, at a timing t83, the scanning unit 10 causes the voltage of the signal SRST to be changed from the high level to the low level ((C) of FIG. 18B). Accordingly, in the imaging pixel P1A, the transistor RST enters the OFF state.

Then, at a timing t84, the scanning unit 10 causes the voltage of the signal SFCG to be changed from the low level to the high level ((F) of FIG. 18B). Accordingly, in the imaging pixel P1A, the transistor FCG enters the ON state. Further, at the timing t84, the reference signal generating unit 31 causes the voltage of the reference signal REF to be changed to the voltage V1 ((H) of FIG. 18B).

Accordingly, in the imaging pixel P1A, as illustrated in FIG. 19C, since both the transistors FDG and FCG are in the ON state, the floating diffusion FD, the transistor FDG, the FCG, and the capacitive element FC constitute the synthesis capacitor (the conversion capacitor). The conversion capacitor holds the electric charges when the floating diffusion FD and the capacitive element FC are reset in the timings t81 to t82. The imaging pixel P1A outputs a pixel voltage VP (pixel voltage VP8) corresponding to the voltage at the floating diffusion FD at the time.

Then, in a period (a conversion period T8) of timings t85 to t87, the AD converting unit ADC performs the AD conversion on the basis of the pixel voltage VP8. The operation is similar to the operation in the conversion period T1. The AD converting unit ADC performs the AD conversion on the basis of the pixel voltage VP8, and the latch 26 of the AD converting unit ADC outputs the count value CNT of the counter 25 as the digital code CODE8 ((J) of FIG. 18B). The digital code CODE8 corresponds to the digital code CODE7 obtained when the floating diffusion FD, the transistors FDG and FCG, and the capacitive element FC constitute the synthesis capacitor.

Then, at a timing t7, the scanning unit 10 causes the voltage of the signal SFDG to be changed from the high level to the low level and causes the voltage of the signal SFCG to be changed from the high level to the low level ((D) and (F) of FIG. 18B). Accordingly, in the imaging pixel P1A, the transistors FDG and FCG enter the OFF state.

Then, at a timing t8, the scanning unit 10 causes the voltage of the signal SSEL to be changed from the high level to the low level ((B) of FIG. 18B). Accordingly, in the imaging pixel P1A, the transistor SEL enters the OFF state and the imaging pixel P1A is electrically disconnected from the signal line SGL.

Next, the image synthesis process in the image processing unit 41 of the signal processing unit 40 will be described. The image processing unit 41 generates the four images PIC (the images PIC1 to PIC4) on the basis of the digital code CODE supplied from the reading unit 20. Then, the image processing unit 41 synthesizes the four images PIC and generates one captured image PICA.

FIG. 20 schematically illustrates the image synthesis process. The waveforms illustrated in Figs. (A) to (G) of FIG. 20 are similar to the waveforms illustrated in (A) to (G) of FIG. 17. As described above with reference to FIGS. 17, 18A, and 18B, the reading unit 20 generates the digital code CODE1 on the basis of the operation in the period from the timing t11 to the timing t21, generates the digital code CODE2 on the basis of the operation in the period of the timing t21 to the timing t31, generates the digital code CODE3 on the basis of the operation in the period of the timing t31 to the timing t41, generates the digital code CODE4 on the basis of the operation in the period of the timing t41 to the timing t51, generates the digital code CODE5 on the basis of the operation in the period of the timing t51 to the timing t61, generates the digital code CODE6 on the basis of the operation in the period of the timing t61 to the timing t71, generates the digital code CODE7 on the basis of the operation in the period of the timing t71 to the timing t81, and generates the digital code CODE8 on the basis of the operation in the period of the timing t81 to the timing t7.

The image processing unit 41 generates a pixel value VAL1 on the basis of the digital code CODE2 and the digital code CODE3. Specifically, the image processing unit 41 calculates the pixel value VAL1 by subtracting the digital code CODE2 from the digital code CODE3 (CODE3−CODE2). In other words, the imaging device 1 calculates the pixel value VAL1 using the digital code CODE2 corresponding to P phase (pre-charge phase) data and the digital code CODE3 corresponding to D phase (data phase) data on the basis of a principle of a so-called correlated double sampling (CDS). Since such correlated double sampling is performed in the imaging device 1, it is possible to remove a noise component included in the pixel value VAL1, and it is possible to improve the image quality of the captured image accordingly.

Similarly, the image processing unit 41 generates a pixel value VAL2 on the basis of the digital code CODE1 and the digital code CODE4. Specifically, the image processing unit 41 calculates the pixel value VAL2 by subtracting the digital code CODE1 from the digital code CODE4 (CODE4−CODE1). In other words, the imaging device 1 calculates the pixel value VAL2 using the digital code CODE1 corresponding to the P phase data and the digital code CODE4 corresponding to the D phase data on the basis of the principle of the correlated double sampling.

Similarly, the image processing unit 41 generates a pixel value VAL3 on the basis of the digital code CODE5 and the digital code CODE6. Specifically, the image processing unit 41 calculates the pixel value VAL3 by subtracting the digital code CODE5 from the digital code CODE6 (CODE6−CODE5). In other words, the imaging device 1 calculates the pixel value VAL3 using the digital code CODE5 corresponding to the P phase data and the digital code CODE6 corresponding to the D phase data on the basis of the principle of the correlation double sampling.

Then, the image processing unit 41 generates a pixel value VAL4 on the basis of the digital code CODE7 and the digital code CODE8. Specifically, the image processing unit 41 calculates the pixel value VAL4 by subtracting the digital code CODE8 from the digital code CODE7 (CODE7−CODE8). In other words, the imaging device 1 calculates the pixel value VAL4 using the digital code CODE7 before the floating diffusion FD and the capacitive element FC are reset and the digital code CODE8 after the floating diffusion FD and the capacitive element FC are reset on the basis of the principle of the double data sampling (DDS).

Further, the image processing unit 41 generates the image PIC1 on the basis of the pixel value VAL1 in all the imaging pixels P1 in the pixel array 9, generates the image PIC2 on the basis of the pixel value VAL2 in all the imaging pixels P1 in the pixel array 9, generates the image PIC3 on the basis of the pixel value VAL3 in all the imaging pixels P1 in the pixel array 9, and generates the image PIC4 on the basis of the pixel value VAL4 in all the imaging pixels P1 in the pixel array 9. Then, the image processing unit 41 synthesizes the images PIC1 to PIC4 and generates the captured image PICA.

(Voltage Detection Operation by Voltage Determining Unit 42)

In FIG. 16, for example, the blanking period T20 of the timings t11 to t12 is a so-called vertical blanking period, and the imaging device 1 does not perform the read drive D2. In other words, in this the period, the signal line SGL does not convey the pixel voltage VP related to the imaging pixel P1. The imaging device 1 performs the voltage detection operation by the voltage determining unit 42 using the blanking period T20. Hereinafter, the voltage detection operation will be described in detail.

The AD converting unit ADC of the reading unit 20 performs the AD conversion on the basis of the signal SIGV in a detection period M having the same length as the horizontal period H (FIG. 14) in the blanking period T20. In the detection period M, the reference signal generating unit 31 and the reading unit 20 perform a similar operation as that in the horizontal period H (FIG. 17). In the detection period M, the imaging control unit 30 sets the control signal SSELV (FIG. 4) to the high level. Accordingly, in the reading unit 20, in each of a plurality of AD converting units ADC, the transistor 29 enters the ON state, and a signal corresponding to the signal SIGV generated by the voltage sensor 33 is input to the negative input terminal of the comparator 24 via the transistor 29 and the capacitive element 22. As described above, the AD converting unit ADC performs the AD conversion on the basis of the signal SIGV. In the example, the imaging device 1 performs the voltage detection operation in the period corresponding to the period of the timings t21 to t41 of the horizontal period H (FIG. 17). The detection operation of the power voltage VDDH will be described below in detail as an example. Further, the same applies to the detection operation of the power voltages VDDM and VDDL and the voltage Vbgr.

FIG. 21 illustrates an example of the voltage detection operation in the imaging device 1. FIG. 21 corresponds to FIG. 18A illustrating an operation of a first half of the horizontal period H. In FIG. 21, (A) illustrates the waveform of the reference signal REF, (B) illustrates the waveform of the signal SIGV, and (C) illustrates the operation of the counter 25 in the AD converting unit ADC. A timing t111 corresponds to the timing t11 in FIG. 18A, a timing t121 corresponds to the timing t12 in FIG. 18A, a timing t131 corresponds to the timing t13 in FIG. 18A, a timing t141 corresponds to the timing t41 in FIG. 18A, and a timing t151 corresponds to timing t51 in FIG. 18A.

Figure 22A:
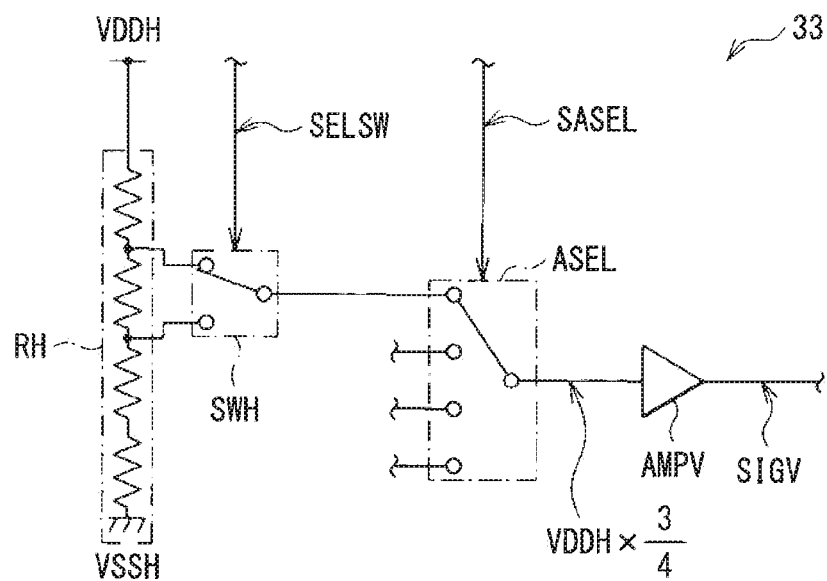
FIG. 22A is an explanatory diagram illustrating an operation example of a voltage sensor in a voltage detection operation illustrated in FIG. 21.
Figure 22B:
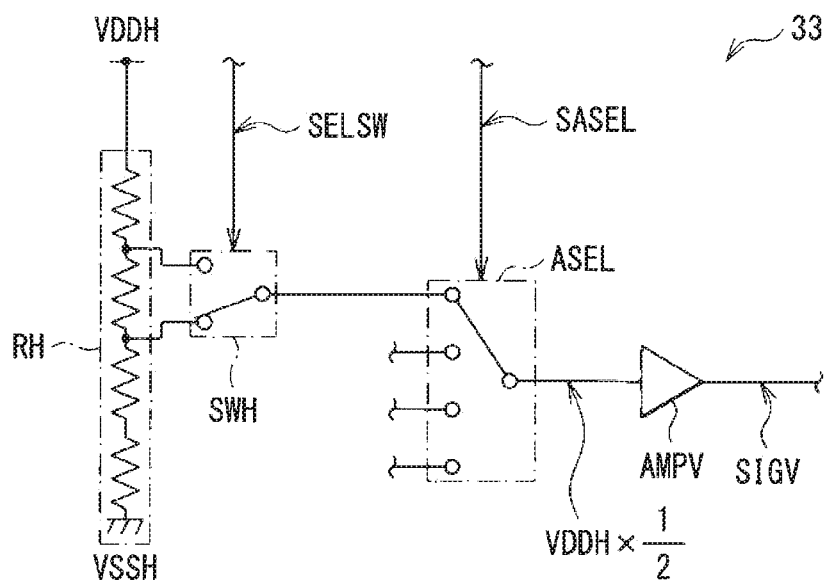
FIG. 22B is another explanatory diagram illustrating an operation example of a voltage sensor in a voltage detection operation illustrated in FIG. 21.

FIGS. 22A and 22B illustrate an operation example of the voltage sensor 33 in the voltage detection operation. In FIGS. 22A and 22B, the selector ASEL is indicated using a switch indicating a connected state. In the example, the selector ASEL selects the voltage supplied from the switch SWH on the basis of the control signal SASEL. Further, the selector ASEL switches a selection target in a time division manner on the basis of the control signal SASEL, and thus the imaging device 1 performs the detection operation of the power voltages VDDH, VDDM, and VDDL and the voltage Vbgr in a time division manner.

(Operation of Timings t121 to t131)

In a period of the timing t121 to the timing t131, the switch SWH of the voltage sensor 33 selects a voltage obtained by dividing the power voltage VDDH into "3/4" on the basis of the control signal SELSW as illustrated in FIG. 22A. The amplifier AMPV amplifies the voltage supplied from the switch SWH via the selector ASEL and outputs an amplified voltage as the signal SIGV. Accordingly, a voltage VDDH34 corresponding to the voltage obtained by dividing the power voltage VDDH into "3/4" is supplied to the negative input terminal of the comparator 24 of the AD converting unit ADC ((B) of FIG. 21).

The comparator 24 performs the zero adjustment for electrically connecting the positive input terminal with the negative input terminal in the period of the timing t121 to the timing t122.

Then, at the timing t122, the comparator 24 finishes the zero adjustment and electrically disconnects the positive input terminal from the negative input terminal. Then, at the timing t122, the reference signal generating unit 31 causes the voltage of the reference signal REF to be changed to the voltage V1 ((A) of FIG. 21).

Then, in a period (a conversion period TA) of the timing t123 to the t125, the AD converting unit ADC performs the AD conversion on the basis of the voltage VDDH34. The operation is similar to the operation in the conversion period T2 of the horizontal period H (FIG. 18A). The AD converting unit ADC performs the AD conversion on the basis of the voltage VDDH34, and the latch 26 of the AD converting unit ADC outputs the count value CNT of the counter 25 as a digital code CODEA ((C) of FIG. 21).

(Operation of Timings t131 to t141)

In a period of the timing t131 to the timing t141, the switch SWH of the voltage sensor 33 selects the voltage obtained by dividing the power voltage VDDH into "1/2" on the basis of the control signal SELSW as illustrated in FIG. 22B. The amplifier AMPV amplifies the voltage supplied from the switch SWH via the selector ASEL and outputs the amplified voltage as the signal SIGV. Accordingly, a voltage VDDH12 corresponding to the voltage obtained by dividing the power voltage VDDH into "1/2" is supplied to the negative input terminal of the comparator 24 of the AD converting unit ADC ((B) of FIG. 21).

Further, in a period (a conversion period TB) of the timing t132 to the timing t134, the AD converting unit ADC performs the AD conversion on the basis of the voltage VDDH12. The operation is similar to the operation in the conversion period T3 of the horizontal period H (FIG. 18A). The AD converting unit ADC performs the AD conversion on the basis of the voltage VDDH12, and the latch 26 of the AD converting unit ADC outputs the count value CNT of the counter 25 as a digital code CODEB ((C) of FIG. 21).

Next, a process in the voltage determining unit 42 of the signal processing unit will be described.

First, the calculating unit 43 of the voltage determining unit 42 calculates the digital value VALV on the basis of the digital codes CODEA and CODEB supplied from the reading unit 20. Specifically, the voltage determining unit 42 calculates the digital value VALV by subtracting the digital code CODEA from the digital code CODEB (CODEB-CODEA). In other words, the imaging device 1 calculates the digital value VALV using the digital code CODEA corresponding to the P phase (pre-charge phase) data and the digital code CODEB corresponding to the D phase (data phase) data on the basis of the principle of the correlated double sampling. Since the correlated double sampling is performed in the imaging device 1, it is possible to remove the noise component included in the digital value VALV. As described above, the voltage determining unit 42 calculates a plurality of digital value VALVs on the basis of the digital codes CODEA and CODEB obtained from a plurality of AD converting units ADC.

Then, the calculating unit 43 performs the calculation process using the calibration parameter PCAL stored in the storage unit 8 on the basis of the digital value VALV and generates the voltage code VCODE1 having a predetermined code system. As described above, the calculating unit 43 generates a plurality of voltage codes VCODE1 on the basis of a plurality of digital value VALVs obtained from a plurality of AD converting units ADC.

Then, the calculating unit 43 generates one voltage code VCODE by obtaining an average value of the values indicated by a plurality of voltage codes VCODE1. For example, in a case in which a value of a certain voltage code VCODE1 (voltage code VCODE1A) significantly deviates from values of a plurality of voltage codes VCODE1 other than the voltage code VCODE1A, the voltage code VCODE1A is corrected, for example, by performing an interpolation calculation using the voltage code VCODE1 related to the AD converting unit ADC adjacent to the AD converting unit ADCA related to the voltage code VCODE1A as illustrated in FIG. 8A. Then, the calculating unit 43 generates one voltage code VCODE by obtaining an average value of the values indicated by all the voltage codes VCODE1 including the corrected voltage code VCODE1A. Then, the calculating unit 43 outputs the voltage code VCODE generated as described above as the voltage code VCODEH corresponding to the power voltage VDDH.

Then, the determining unit 44 of the voltage determining unit 42 checks whether or not the value (voltage value) indicated by the voltage code VCODEH obtained as described above falls within a predetermined range, and in a case in which the value does not fall within the predetermined range, the imaging device 1 sets the error flag signal XERR to the active (the low level).

(Calibration)

Each voltage in the signal SIGV generated by the voltage sensor 33 may deviate from a desired voltage due to the manufacturing variation, the impedance of the power supply wiring in the imaging device 1, or the like. In this case, as illustrated in FIG. 7, the voltage code VCODE1 also varies. In this regard, in the imaging device 1, for example, the calibration is performed in the inspection process before shipping. Accordingly, it is possible to increase the voltage detection accuracy in the imaging device 1. The calibration process in the inspection process will be described below in detail.

Figure 23:
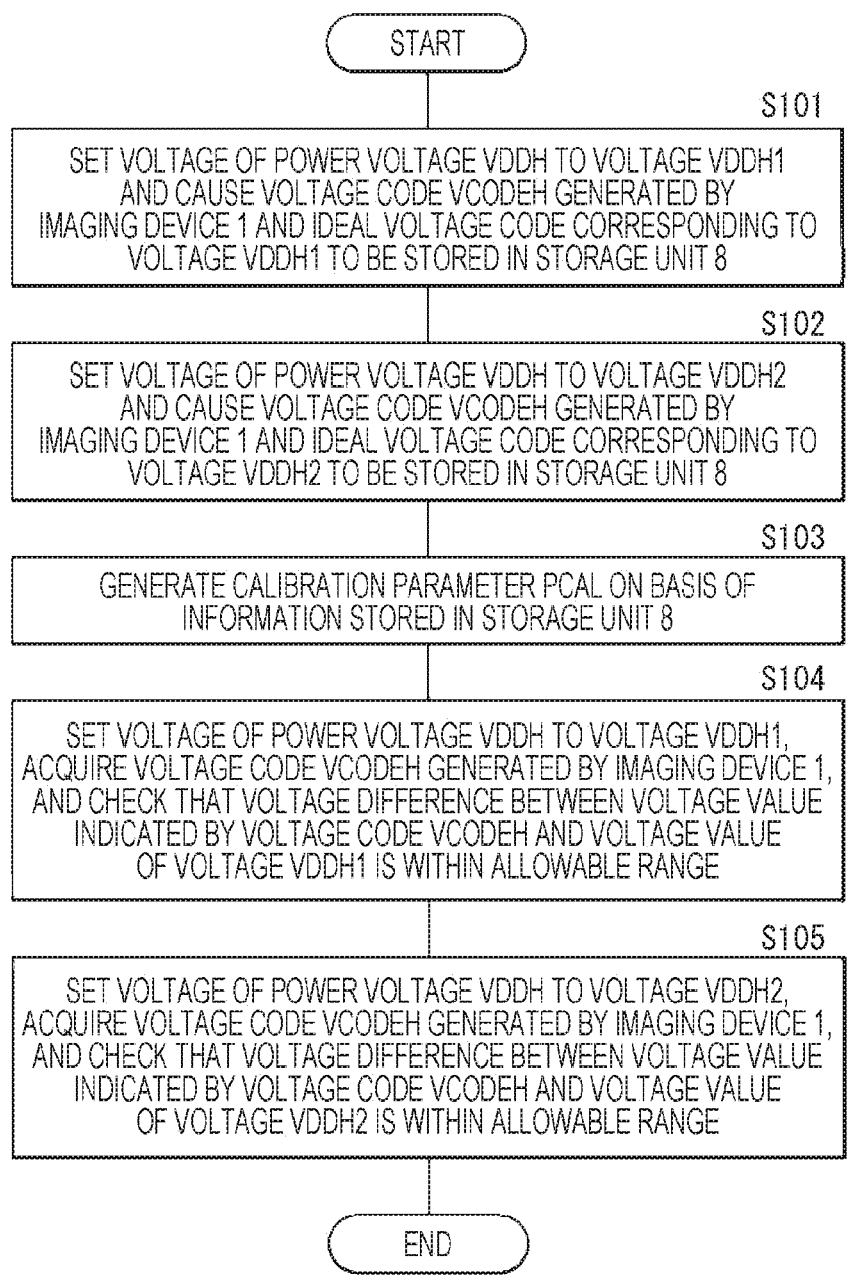
FIG. 23 is a flowchart illustrating an example of a calibration process.

FIG. 23 illustrates an example of the calibration process in the inspection process. FIG. 23 illustrates the calibration process of the power voltage VDDH. The same applies to the power voltages VDDM and VDDL and the voltage Vbgr.

First, the inspecting device sets the voltage of the power voltage VDDH to the voltage VDDH1 (for example 3.1 V), and causes the voltage code VCODEH generated by the imaging device 1 and the ideal voltage code corresponding to the voltage VDDH1 to be stored in the storage unit 8 (step S101).

Then, the inspecting device sets the voltage of the power voltage VDDH to the voltage VDDH2 (for example, 3.5 V), and causes the voltage code VCODEH generated by the imaging device 1 and the ideal voltage code corresponding to the voltage VDDH2 to be stored in the storage unit 8 (step S102).

Then, the calculating unit 43 of the voltage determining unit 42 of the imaging device 1 generates the calibration parameter PCAL on the basis of the information stored in the storage unit 8 in steps S101 and S102 (step S103).

Accordingly, thereafter, the calculating unit 43 can obtain the voltage code VCODE1 using the calibration parameter PCAL generated in step S103, and obtains the voltage code VCODE1, for example, using a more desirable conversion characteristic indicated by a bold line in FIG. 7. Further, the calculating unit 43 obtains the average value of the values indicated by a plurality of voltage codes VCODE1 related to a plurality of AD converting units ADC, and generates the voltage code VCODE.

Then, the inspecting device sets the voltage of the power voltage VDDH to the voltage VDDH1 (for example, 3.1 V), acquires the voltage code VCODEH generated by the imaging device 1, and checks that a voltage difference between the voltage value indicated by the voltage code VCODEH and the voltage value of the voltage VDDH1 is within an allowable range (step S104).

Then, the inspecting device sets the voltage of the power voltage VDDH to the voltage VDDH2 (for example, 3.5 V), acquires the voltage code VCODEH generated by the imaging device 1, and checks that a voltage difference between the voltage value indicated by the voltage code VCODEH and the voltage value of the voltage VDDH2 is within an allowable range (step S105).

As described above, the flow ends.

As described above, the imaging device 1 detects the supplied three power voltages VDD (the power voltages VDDH, VDDM, and VDDL), checks whether or not the power voltages VDD fall within the predetermined range, and generates the error flag signal XERR on the basis of the checking result. Accordingly, in the imaging device 1, in a case in which the power voltage VDD is out of the predetermined range, it is possible to notify the external device of the defect. Accordingly, for example, in a case in which the defect occurs in the imaging operation in the imaging device 1, the device can detect that the defect is caused by the power voltage VDD. Further, in a case in which there is no defect in the imaging operation in the imaging device 1, the device can adjust the voltage value of the power voltage VDD, for example, on the basis of the error flag signal XERR or change the operation of the imaging device 1, and thus it is possible to prevent a malfunction of the imaging device 1 caused by the power voltage VDD in advance.

Further, in the imaging device 1, the voltage Vbgr generated by the standard voltage generating unit 32 is detected, it is checked whether or not the voltage Vbgr is within a predetermined range, and the error flag signal XERR is generated on the basis of the checking result. Accordingly, in the imaging device 1, in a case in which the voltage Vbgr is out of the predetermined range, it is possible to notify the external device of the defect. Accordingly, for example, since the device can stop the operation of the imaging device 1 on the basis of the error flag signal XERR, it is possible to prevent the malfunction of the imaging device 1 caused by the power voltage VDD in advance.

Further, in the imaging device 1, since the voltage detection operation is performed in the blanking period T20 (the vertical blanking period), the voltage detection operation can be performed while performing the imaging operation. Accordingly, in the imaging device 1, for example, in a case in which a defect occurs in the supply of the power voltage VDD, it is possible to timely detect and notify of the defect.

Further, in the imaging device 1, the AD converting unit ADC generates the digital code CODE by performing the AD conversion on the basis of the signal SIGV generated by the voltage sensor 33, and the voltage determining unit 42 generates the voltage code VCODE on the basis of the digital code CODE. Then, the voltage determining unit 42 determines whether or not the power voltages VDDH, VDDM, and VDDL and the voltage Vbgr fall within predetermined ranges on the basis of the voltage code VCODE. Accordingly, since the imaging device 1 can perform determination using a digital value, it is possible to improve, for example, the determination accuracy and reduce the circuit size.

Further, in the imaging device 1, since the AD converting unit ADC performing the AD conversion on the basis of the pixel voltage VP performs the AD conversion on the basis of the signal SIGV generated by the voltage sensor 33, and it is not necessary to dispose a dedicated AD converting unit for performing the voltage detection operation, it is possible to simplify the circuit configuration.

Further, in the imaging device 1, the voltage determining unit 42 obtains one voltage code VCODE by obtaining the average value of the values indicated by a plurality of voltage codes VCODE1 on the basis of a plurality of voltage codes VCODE1 related to a plurality of AD converting units ADC. Accordingly, in the imaging device 1, for example, it is possible to suppress the influence of the characteristic variation of a plurality of AD converting units ADC on the voltage code VCODE caused by the so-called manufacturing variation. Accordingly, in the imaging device 1, it is possible to increase the voltage detection accuracy.

Further, in the imaging device 1, for example, in a case in which a value of a certain voltage code VCODE1 (the voltage code VCODE1A) significantly deviates from the values of a plurality of voltage codes VCODE1 other than the voltage code VCODE1A, the voltage code VCODE1A is corrected, for example, by performing an interpolation calculation using the voltage code VCODE1 related to the AD converting unit ADC adjacent to the AD converting unit ADCA related to the voltage code VCODE1A as illustrated in FIG. 8A. Accordingly, in the imaging device 1, for example, even in a case in which one of a plurality of AD converting units ADC has a failure, it is possible to improve the voltage detection accuracy.

Further, in the imaging device 1, the reading unit 20 operates on the basis of the power voltage VDDH and the power voltage VDDL, and the voltage determining unit 42 operates on the basis of the power voltage VDDL. Accordingly, in the imaging device 1, for example, in a case in which the voltage of the power voltage VDDM is detected, since the circuits do not operate on the basis of the power voltage VDDM, it is possible to detect the defect of the power voltage VDDM more accurately.

Further, in the imaging device 1, the signal XERR1 is a so-called negative logical signal. Accordingly, in the imaging device 1, for example, even in a case in which there occurs a defect in which the power voltage VDDL is not supplied to the signal processing unit 40 which generates the signal XERR1, the signal XERR1 becomes the low level (the ground voltage VSSL), and thus the error flag signal XERR becomes the low level, and thus it is possible to notify of the defect.

(Voltage Detection Operation by Power Voltage Comparing Unit 80)

As illustrated in FIGS. 1 and 10, the power voltage comparing unit 80 of the imaging device 1 performs the voltage detection operation by comparing the supplied power voltage VDDL with the two threshold voltages VthL and VthH. In other words, the power voltage comparing unit 80 performs the voltage detection operation without using the AD converting unit ADC, the signal processing unit 40, or the like unlike the voltage detection operation by the voltage sensor 33 and the voltage determining unit 42. With this configuration, the power voltage comparing unit 80 detects whether or not the power voltage VDDL is within a predetermined voltage range over the period in which the power voltage VDD is being supplied to the imaging device 1. Hereinafter, the voltage detection operation will be described in detail.

As illustrated in FIG. 10, the resistive circuit portion 81 generates the threshold voltage VthL (0.8 V in the example) and the threshold voltage VthH (1.4 V in the example) by dividing the power voltage VDDH. The comparison circuit 83L compares the power voltage VDDL with the threshold voltage VthL and generates the signal CMPL. Specifically, the comparison circuit 83L sets the signal CMPL to the high level in a case in which the power voltage VDDL is higher than the threshold voltage VthL and sets the signal CMPL to the low level in a case in which the power voltage VDDL is lower than the threshold voltage VthL. The comparison circuit 83H compares the power voltage VDDL with the threshold voltage VthH and generates the signal CMPH. Specifically, the comparison circuit 83H sets the signal CMPH to the high level in a case in which the power voltage VDDL is lower than the threshold voltage VthH, and sets the signal CMPH to the low level in a case in which the power voltage VDDL is higher than the threshold voltage VthH. The AND circuit 84 obtains a logical product (AND) of the signal CMPL and the signal CMPH, and outputs the result as the signal XERP1. Then, the output buffer BFOUT2 (FIG. 12) generates the error flag signal XERP on the basis of the signal XERP1. Accordingly, the imaging device 1 sets the error flag signal XERP to "1" in a case in which the power voltage VDDL is the threshold voltage VthL or more and the threshold voltage VthH or less, and sets the error flag signal XERP to "0" in a case in which the power voltage VDDL is lower than the threshold voltage VthL or in a case in which the power voltage VDDL is higher than the threshold voltage VthH.

As described above, in the imaging device 1, it is detected whether or not a defect occurs in the power voltage VDDL by comparing the power voltage VDDL with the threshold voltages VthL and VthH without using the AD converting unit ADC, the signal processing unit 40, or the like, and the detection result is output as the error flag signal XERP. Accordingly, in the imaging device 1, it is possible to give a notification indicating that the defect occurs in the power voltage VDDL to the external device more reliably. In other words, in the voltage detection operation by the voltage determining unit 42 described above, the voltage detection operation is performed using the AD converting unit ADC and the signal processing unit 40, and thus, for example, in a case in which the power voltage VDDH is so low that the AD converting unit ADC is unable to operate or in a case in which the power voltage VDDL is so low that the processing unit 40 is unable to operate, the voltage detection operation is unable to be performed. Particularly, since the power voltage VDDL has the lowest voltage among the three power voltages VDD supplied to the imaging device 1, there is a high possibility that the imaging device 1 is unable to operate if the power voltage VDDL decreases. Therefore, in the imaging device 1, the power voltage comparing unit 80 which is an analog circuit is disposed, and it is detected whether or not the defect occurs in the power voltage VDDL by comparing the power voltage VDDL with the threshold voltages VthL and VthH without using the AD converting unit ADC or the signal processing unit 40, and the detection result is output as the error flag signal XERP. Accordingly, the imaging device 1 can more reliably notify of the defect of the power voltage VDDL.

Further, in the imaging device 1, since the power voltage comparing unit 80 and the output buffer BFOUT2 operate on the basis of the power voltage VDDH, and the power voltage VDDL is not used as the power voltage, it is possible to more reliably notify of the defect of the power voltage VDDL.

Further, in the imaging device 1, since the voltage detection operation is performed without using the AD converting unit ADC in the manner as described above, it is possible to detect whether or not a defect occurs in the power voltage VDDL over the period in which the power voltage VDD is being supplied to the imaging device 1 in addition to the vertical blanking period (the blanking period T20). Accordingly, in the imaging device 1, for example, when a defect occurs in the supply of the power voltage VDDL, it is possible to detect the defect timely and notify of the detect.

[Effects]

As described above, in the present embodiment, it is detected whether or not a defect occurs in the power voltage VDDL by comparing the power voltage VDDL with the threshold voltages VthL and VthH without using the AD converting unit, the signal processing unit, or the like, and the detection result is output as the error flag signal XERP, and thus it is possible to more reliably notify of the defect of the power voltage VDDL.

In the present embodiment, since the power voltage comparing unit and the output buffer operate on the basis of the power voltage VDDH, and the power voltage VDDL is not used as the power voltage, it is possible to more reliably notify of the defect of the power voltage VDDL.

In the present embodiment, since the voltage detection operation is performed without using the AD converting unit ADC, it is possible to detect whether or not the defect occurs in the power voltage VDDL over the period in which the power voltage is being supplied to the imaging device in addition to the vertical blanking period. Accordingly, for example, when the defect occurs in the supply of the power voltage VDDL, it is possible to detect the defect timely and notify of the defect.

First Modified Example

In the above embodiment, as illustrated in FIGS. 4 and 5, the voltage sensor 33 supplies the signal SIGV directly to the AD converting unit ADC of the reading unit 20, but the present disclosure is not limited thereto, and for example, the signal SIGV may be supplied to the AD converting unit of the reading unit via the pixel array. The present modified example will be described in detail using several examples.

Figure 24:
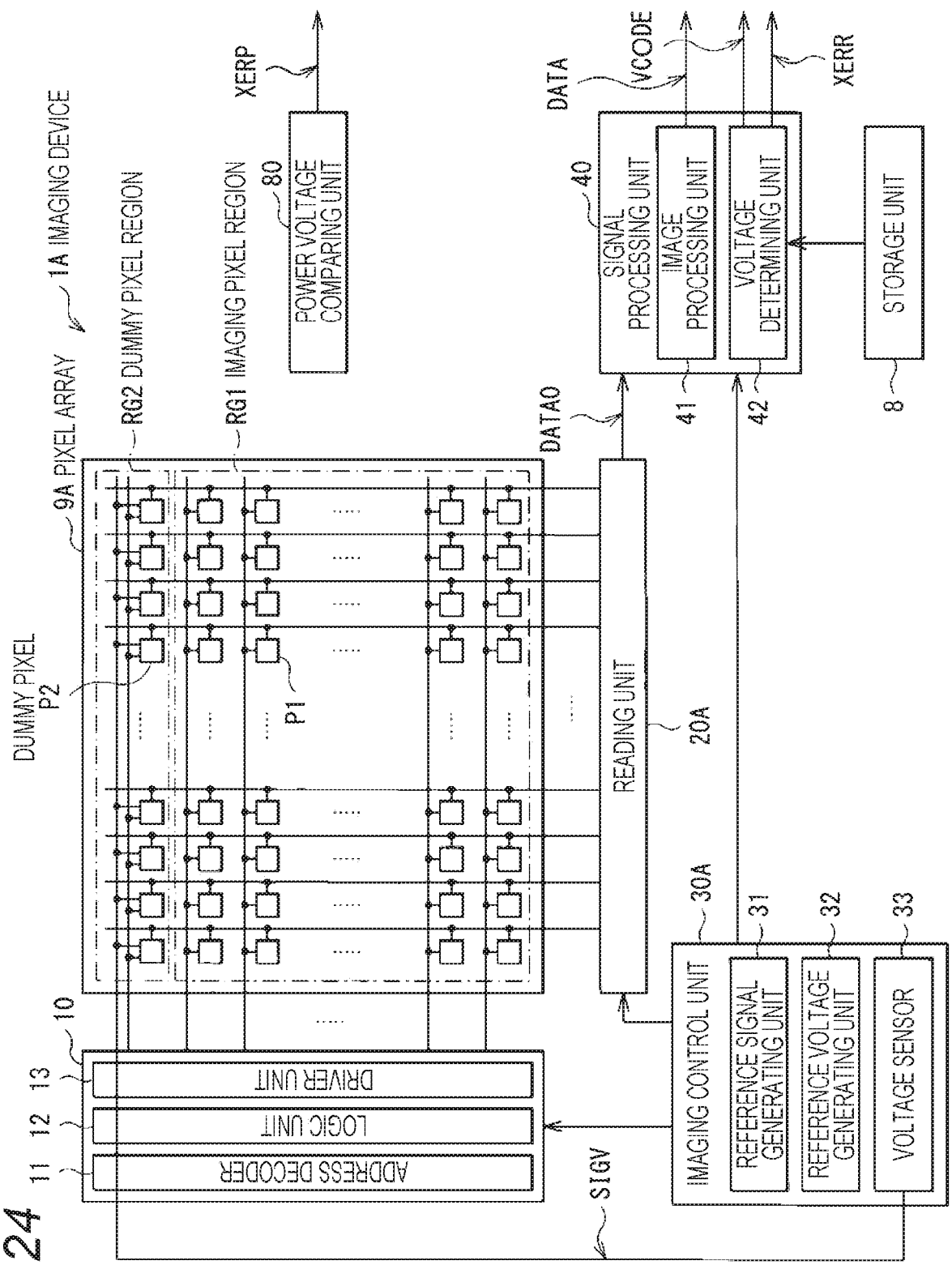
FIG. 24 is a block diagram illustrating a configuration example of an imaging device according to a modified example.

FIG. 24 illustrates a configuration example of an imaging device 1A according to the present modified example. The imaging device 1A includes a pixel array 9A, a reading unit 20A, and an imaging control unit 30A.

In the pixel array 9A, an imaging pixel region RG1 and a dummy pixel region RG2 are provided. A plurality of imaging pixels P1 are arranged in the imaging pixel region RG1, and a plurality of dummy pixels P2 corresponding to one row are arranged in the dummy pixel region RG2. In this example, the dummy pixel region RG2 is arranged above the imaging pixel region RG1 in the vertical direction (the vertical direction in FIG. 24).

Figure 25:
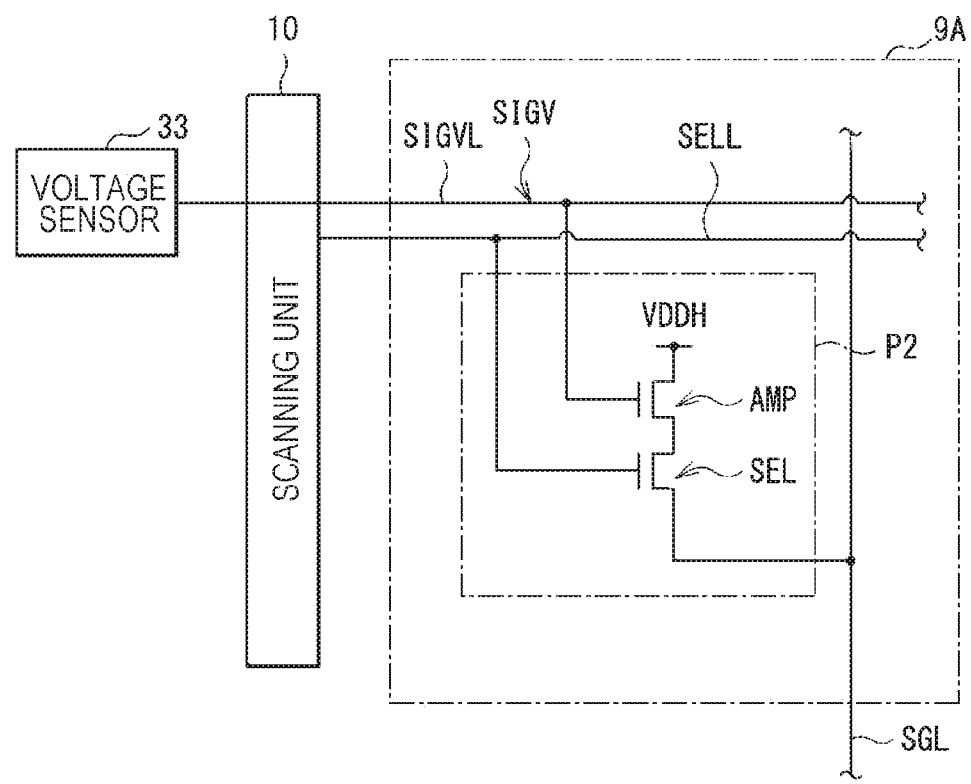
FIG. 25 is a circuit diagram illustrating a configuration example of a dummy pixel illustrated in FIG. 24.

FIG. 25 illustrates a configuration example of the dummy pixel P2 in the dummy pixel region RG2. In the dummy pixel region RG2, the pixel array 9A includes a control line SIGVL and a control line SELL. The control line SIGVL extends in the horizontal direction (in the traverse direction in FIG. 25), and the signal SIGV is supplied to the control line SIGVL by the voltage sensor 33 of the imaging control unit 30A. The control line SELL extends in the horizontal direction, and the signal SSEL is applied to the control line SELL by the scanning unit 10.

The dummy pixel P2 includes transistors AMP and SEL. A gate of the transistor AMP is connected to the control line SIGVL, a drain is supplied with the power voltage VDDH, and a source is connected to a drain of the transistor SEL. A gate of transistor SEL is connected to the control line SELL, the drain is connected to the source of the transistor AMP, and a source is connected to the signal line SGL. With this configuration, in the dummy pixel P2, when the transistor SEL enters ON state, the transistor AMP outputs the signal SIG corresponding to the voltage of the signal SIGV to the signal line SGL via the transistor SEL.

Figure 26:
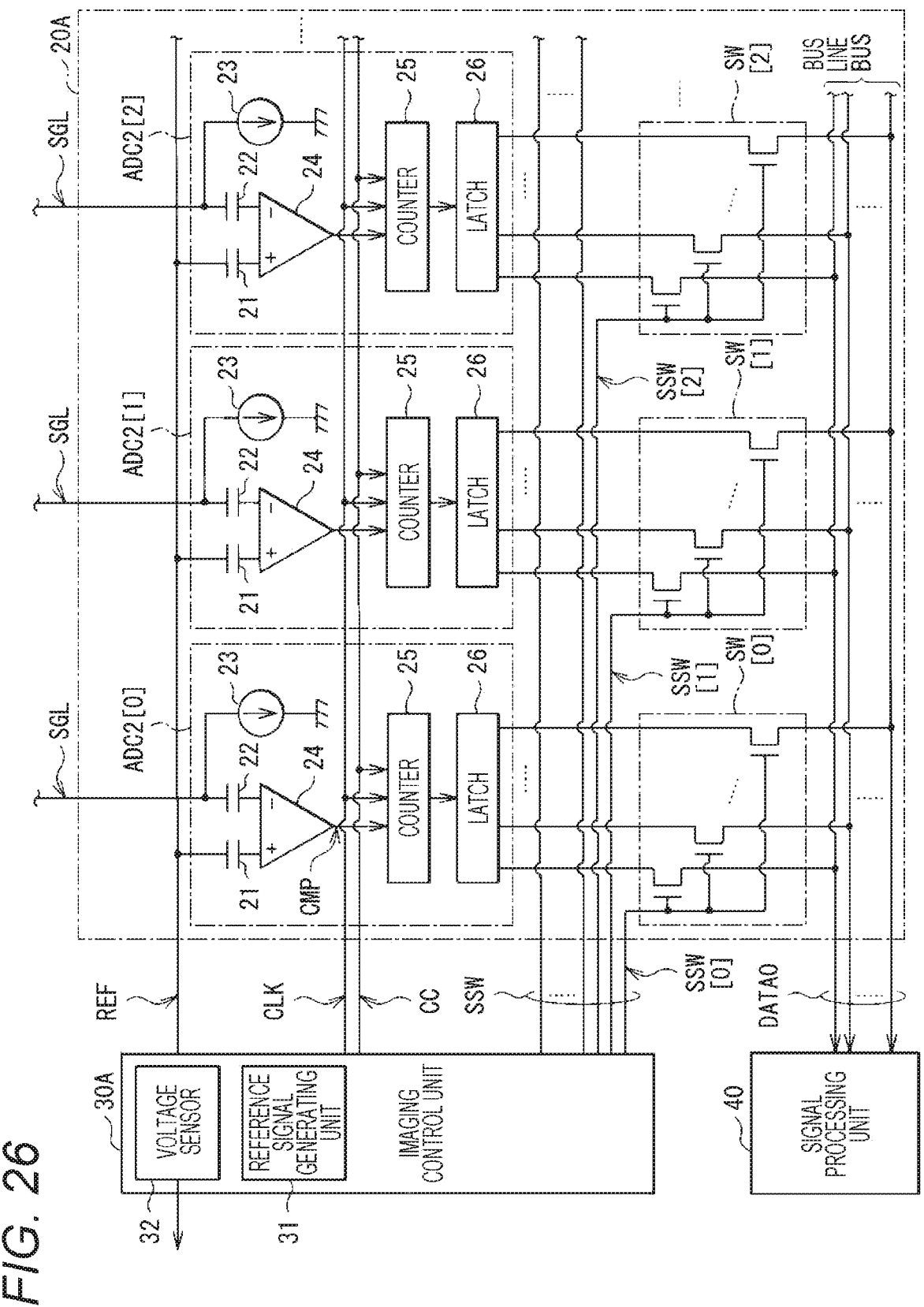
FIG. 26 is a circuit diagram illustrating a configuration example of a reading unit illustrated in FIG. 24.

FIG. 26 illustrates a configuration example of the reading unit 20A. The reading unit 20A includes a plurality of AD converting units ADC2 (AD converting unit ADC2[0], ADC2[1], ADC2[2], . . . ). The AD converting unit ADC2 is obtained by omitting the transistors 28 and 29 from the AD converting unit ADC (FIG. 4) according to the above embodiment. The transistor 28 corresponds to the transistor AMP in the dummy pixel P2 (FIG. 25), and the transistor 29 corresponds to the transistor SEL in the dummy pixel P2.

The imaging control unit 30A (FIG. 24) supplies the control signals to the scanning unit 10, the reading unit 20A, and the signal processing unit 40, and controls the operation of the imaging device 1A by controlling the operations of the circuits. The voltage sensor 33 of the imaging control unit 30A supplies the signal SIGV to a plurality of dummy pixels P2 by supplying the generated signal SIGV to the control line SIGVL in the dummy pixel region RG2 of the pixel array 9A.

With this configuration, in the imaging device 1A, the voltage detection operation can be performed by causing the dummy pixel P2 to be operated using the blanking period T20, similarly to the imaging device 1 according to the above embodiment.

Figure 27:
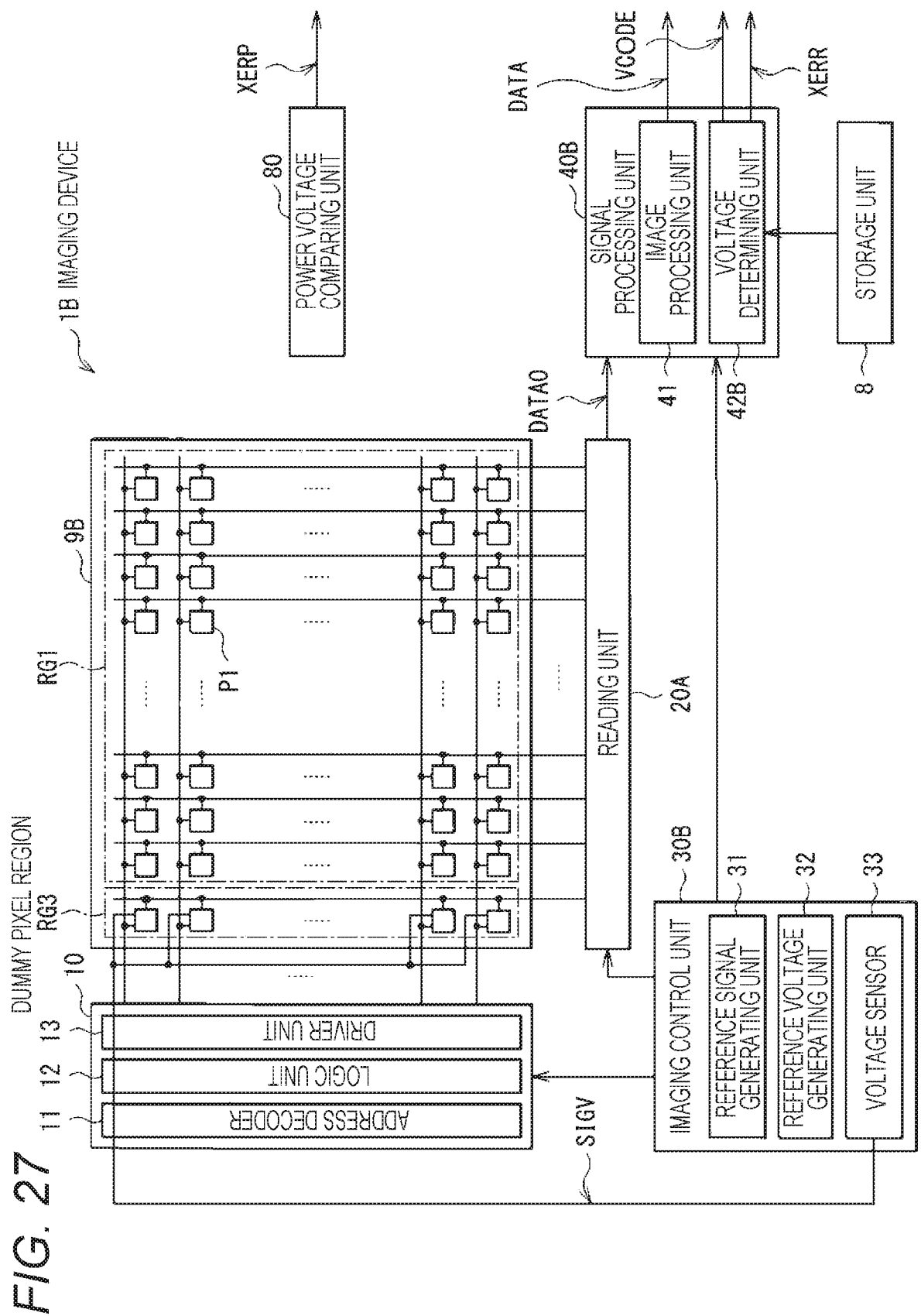
FIG. 27 is a block diagram illustrating a configuration example of an imaging device according to another modified example.

FIG. 27 illustrates a configuration example of another imaging device 1B according to the present modified example. The imaging device 1B includes a pixel array 9B, a reading unit 20A, an imaging control unit 30B, and a signal processing unit 40B.

In the pixel array 9B, an imaging pixel region RG1 and a dummy pixel region RG3 are disposed. In the dummy pixel region RG3, a plurality of dummy pixels P2 corresponding to one column are arranged. In this example, the dummy pixel region RG3 is arranged on the left of the imaging pixel region RG1 in the horizontal direction (the traverse direction in FIG. 27).

The imaging control unit 30B supplies the control signals to the scanning unit 10, the reading unit 20A, and the signal processing unit 40B, and controls the operation of the imaging device 1B by controlling the operations of the circuits. The voltage sensor 33 of the imaging control unit 30B supplies the generated signal SIGV to a plurality of dummy pixels P2 in the dummy pixel region RG3 of the pixel array 9B.

The signal processing unit 40B includes a voltage determining unit 42B. The voltage determining unit 42B generates the voltage code VCODE on the basis of the digital code CODE obtained on the basis of the signal SIGV included in the image signal DATA0.

With this configuration, in the imaging device 1B, since the voltage detection operation can be performed while performing the imaging operation in a period other than the blanking period T20, for example, when a defect occurs in the supply of the power voltage VDD, it is possible to detect the defect and notify of the defect.

Second Modified Example

In the above embodiment, the power voltage comparing unit 80 and the output buffer BFOUT2 operate on the basis of the power voltage VDDH, but the present disclosure is not limited thereto. The present modified example will be described below in detail using several examples.

Figure 28:
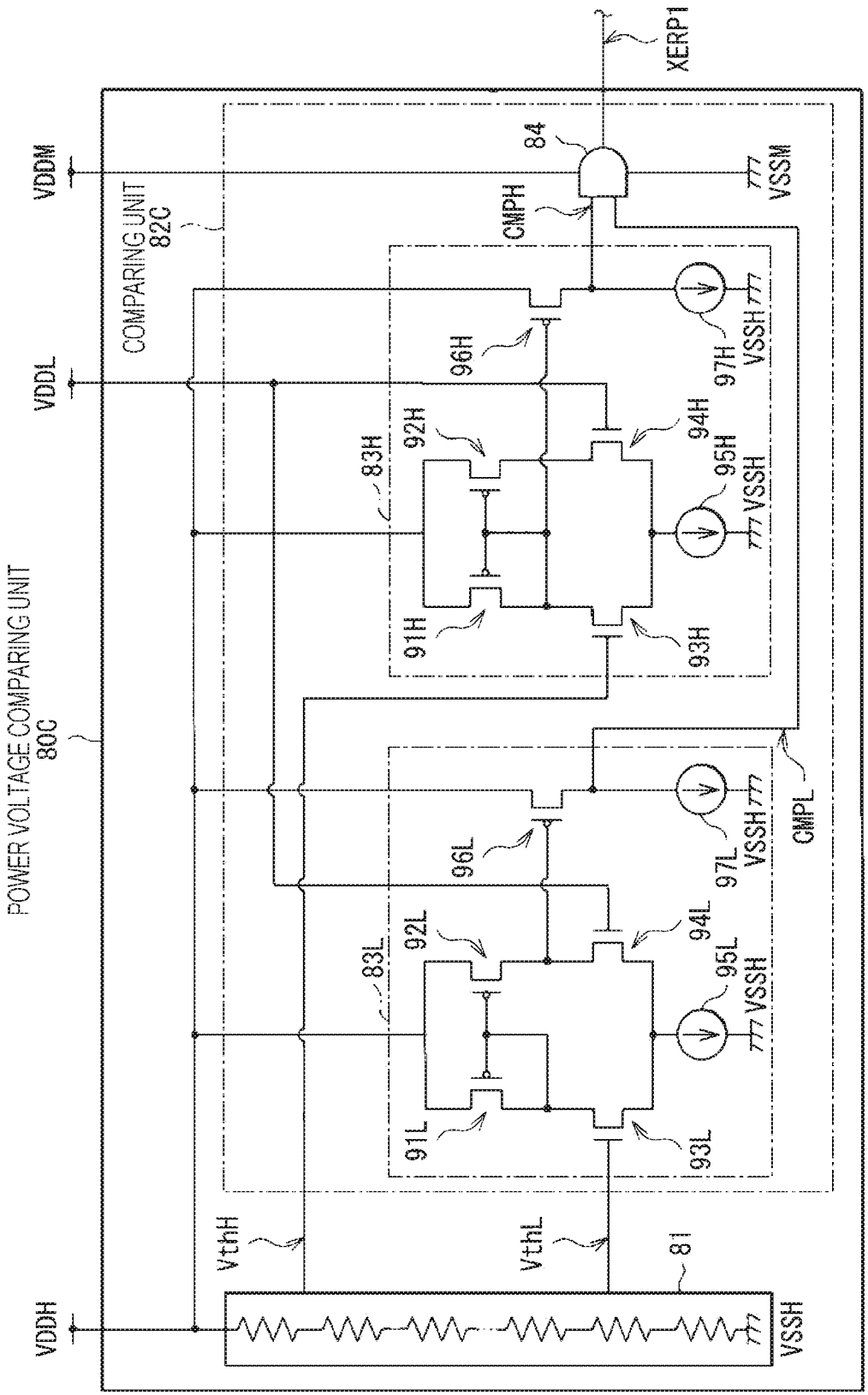
FIG. 28 is a circuit diagram illustrating a configuration example of a power voltage comparing unit according to another modified example.

FIG. 28 illustrates a configuration example of a power voltage comparing unit 80C in the imaging device 1C according to the present modified example. The power voltage comparing unit 80C includes a comparing unit 82C. The comparing unit 82C includes comparison circuits 83L and 83H and an AND circuit 84. The AND circuit 84 operates on the basis of the power voltage VDDM.

Figure 29:
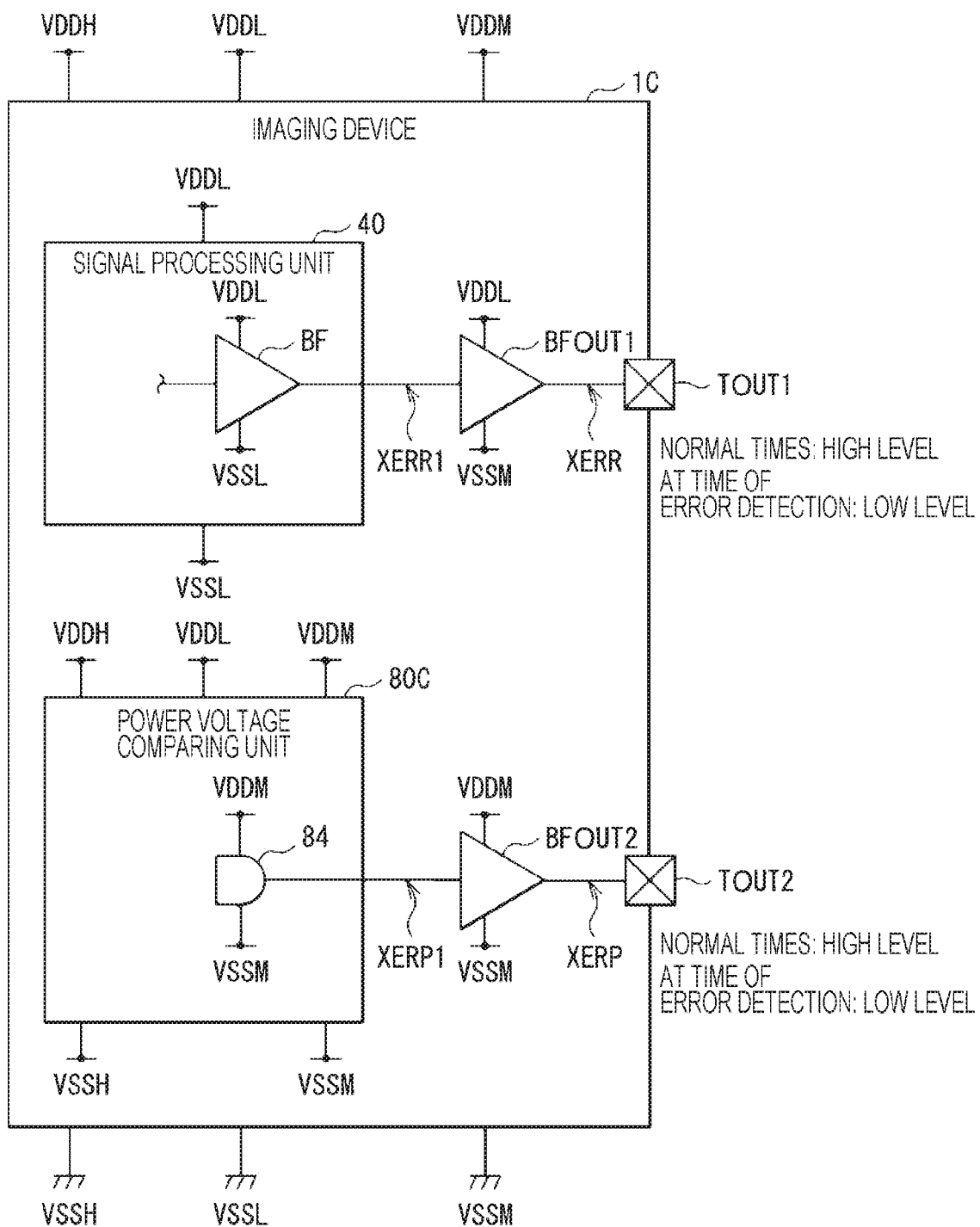
FIG. 29 is an explanatory diagram illustrating a configuration example of a circuit that outputs an error flag signal according to another modified example.

FIG. 29 illustrates a configuration example of a circuit that outputs the error flag signal XERP in the imaging device 1C. The AND circuit 84 sets the signal XERP1 to the high level (the power voltage VDDM) in a case in which the defect is not confirmed in the power voltage comparing unit 80C, and sets the signal XERP1 to the low level (the ground voltage VSSM) in a case in which the defect is confirmed.

The output buffer BFOUT2 operates on the basis of the power voltage VDDM and the ground voltage VSSM in this example. Therefore, the imaging device 1C sets the error flag signal XERP to the high level (the power voltage VDDM) in a case in which the defect is not confirmed in the power voltage comparing unit 80C, and sets the error flag signal XERP to the low level (the ground voltage VSSM) in a case in which the defect is confirmed.

Figure 30:
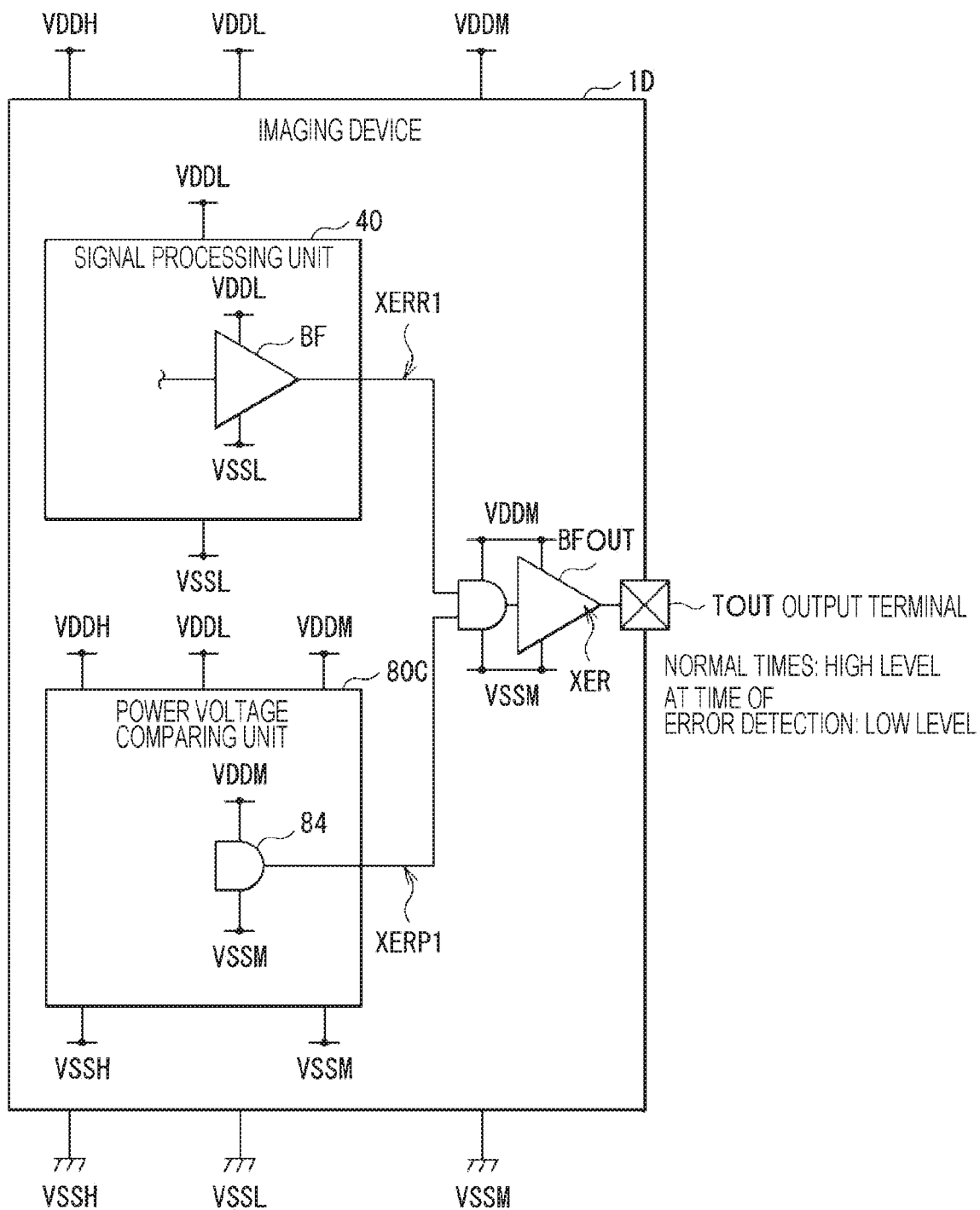
FIG. 30 is an explanatory diagram illustrating a configuration example of a circuit that outputs an error flag signal according to another modified example.

FIG. 30 illustrates a configuration example of a circuit that outputs the error flag signal XERP in another imaging device 1D according to the present modified example. The imaging device 1D includes a power voltage comparing unit 80C, an AND circuit 89, and an output buffer BFOUT. The AND circuit 89 operates on the basis of the power voltage VDDM and obtains a logical product (AND) of the signal XERR1 and the signal XERP1. The output buffer BFOUT operates on the basis of the power voltage VDDM, and generates an error flag signal XER on the basis of the output signal of the AND circuit 89.

The signal XERR1 is a so-called negative logical signal which becomes the high level (the power voltage VDDL) in a case in which a defect is not confirmed in the voltage determining unit 42 of the signal processing unit 40 and becomes the low level (the ground voltage VSSL) in a case in which a defect is confirmed. Further, the signal XERP1 is a so-called negative logical signal which becomes the high level (the power voltage VDDM) in a case in which the defect is not confirmed in the power voltage VDDL in the power voltage comparing unit 80C and becomes the low level (the ground voltage VSSM) in a case in which a defect is confirmed. Therefore, the imaging device 1D sets the error flag signal XER to the high level (the power voltage VDDM) in a case in which the defect is not confirmed, and sets the error flag signal XER to the low level (the ground voltage VSSM) in a case in which the defect is confirmed.

Third Modified Example

In the above embodiment, the resistive circuit portion 81 of the power voltage comparing unit 80 divides the power voltage VDDH, but the present disclosure is not limited thereto. A power voltage comparing unit 80E of the imaging device 1E according to the present modified example will be described below in detail.

Figure 31:
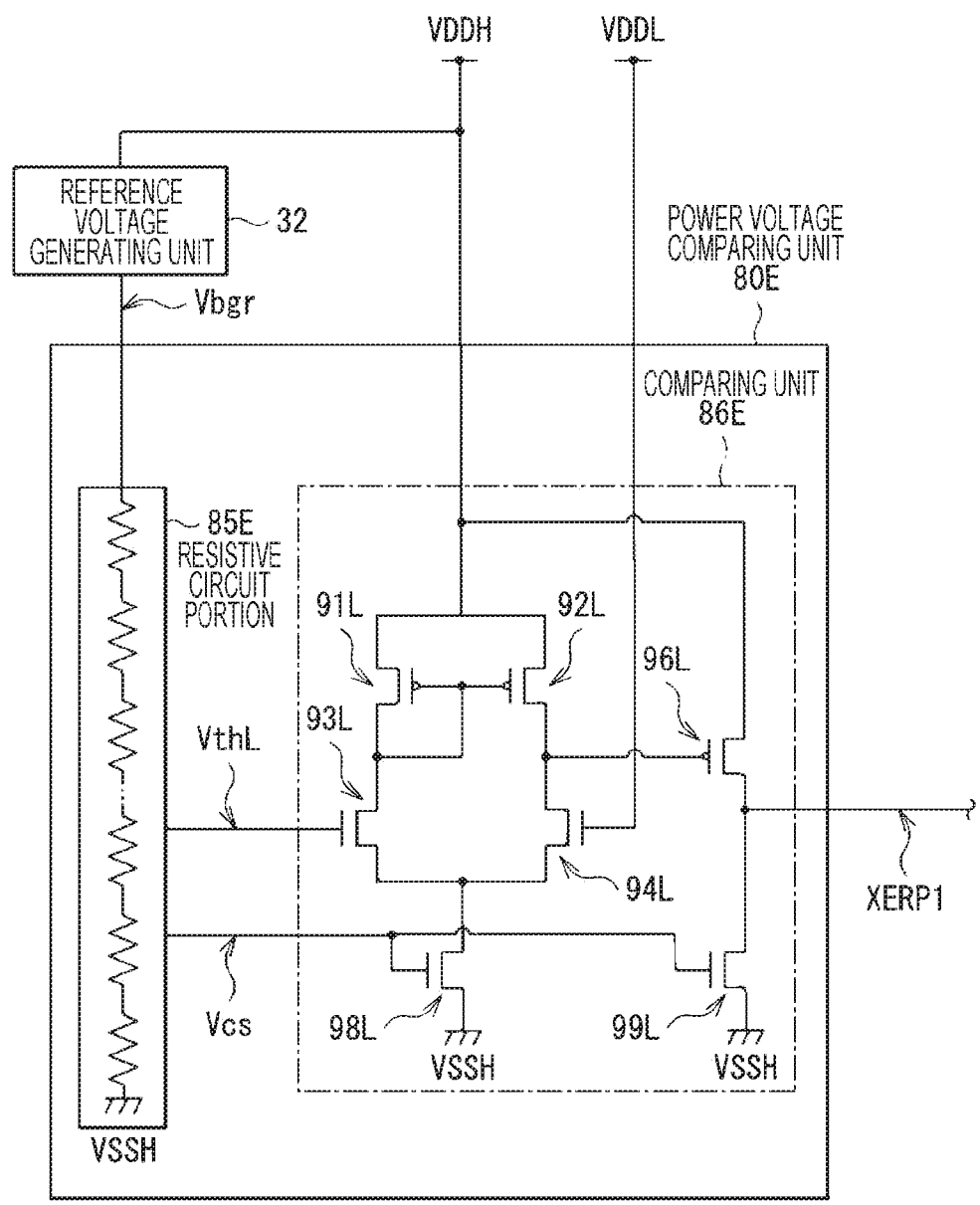
FIG. 31 is a circuit diagram illustrating a configuration example of a power voltage comparing unit according to another modified example.

FIG. 31 illustrates a configuration example of the power voltage comparing unit 80E. The power voltage comparing unit 80E includes a resistive circuit portion 85E and a comparing unit 86E.

The resistive circuit portion 85E includes a plurality of resistive elements which are connected in series. The voltage Vbgr generated by the standard voltage generating unit 32 is supplied to one end of the resistive circuit portion 85E, and the ground voltage VSSH is supplied to the other end. Further, the resistive circuit portion 85E generates the threshold voltage VthL (0.8 V in the example) and a current source voltage Vcs by dividing the voltage Vbgr.

The comparing unit 86E compares the power voltage VDDL with the threshold voltage VthL, similarly to the comparison circuit 83L (FIG. 10) according to the above embodiment. Further, the comparing unit 86E generates the signal XERP1 which becomes the high level in a case in which the power voltage VDDL is higher than the threshold voltage VthL and becomes the low level in a case in which the power voltage VDDL is lower than the threshold voltage VthL.

The comparing unit 86E has a similar configuration to that of the comparison circuit 83L (FIG. 10) and includes transistors 91L, 92L, 93L, 94L, 96L, 98L, and 99L. The transistors 98L and 99L are N-type MOS transistors. The transistor 98L corresponds to the current source 95L in the comparison circuit 83L, and the transistor 99L corresponds to the current source 97L in the comparison circuit 83L. A drain of the transistor 98L is connected to sources of the transistors 93L and 94L, a gate is supplied with the voltage Vcs, and a source is supplied with the ground voltage VSSH. A drain of the transistor 99L is connected to a drain of the transistor 96L, a gate is supplied with the voltage Vcs, and a source is supplied with the ground voltage VSSH. With this configuration, the comparing unit 86E compares the power voltage VDDL with the threshold voltage VthL, and outputs the signal XERP1 corresponding to the comparison result from the drain of the transistor 96L.

Since the threshold voltage VthL is generated on the basis of the voltage Vbgr in the power voltage comparing unit 80E as described above, and the threshold voltage VthL hardly changes in accordance with the power voltage VDDH, it is possible to increase the detection accuracy of detecting whether or not the power voltage VDDL is a predetermined voltage or higher.

Further, in this example, the power voltage VDDL is compared with one threshold voltage VthL, but the present disclosure is not limited thereto, and similarly to the power voltage comparing unit 80 (FIG. 10) according to the above embodiment, the power voltage VDDL may be compared with the two threshold voltages VthL and VthH. In this case, the resistive circuit portion 85E can be configured to generate the two threshold voltages VthL and VthH and the current source voltage Vcs. Accordingly, the power voltage comparing unit 80E can detect whether or not the power voltage VDDL is within a predetermined voltage range with a higher degree of detection accuracy.

Fourth Modified Example

In the above embodiment, the two photodiodes PD1 and PD2 are disposed in each of a plurality of imaging pixels P1, but the present disclosure is not limited thereto. An imaging device 2 according to the present modified example will be described below in detail.

Figure 32:
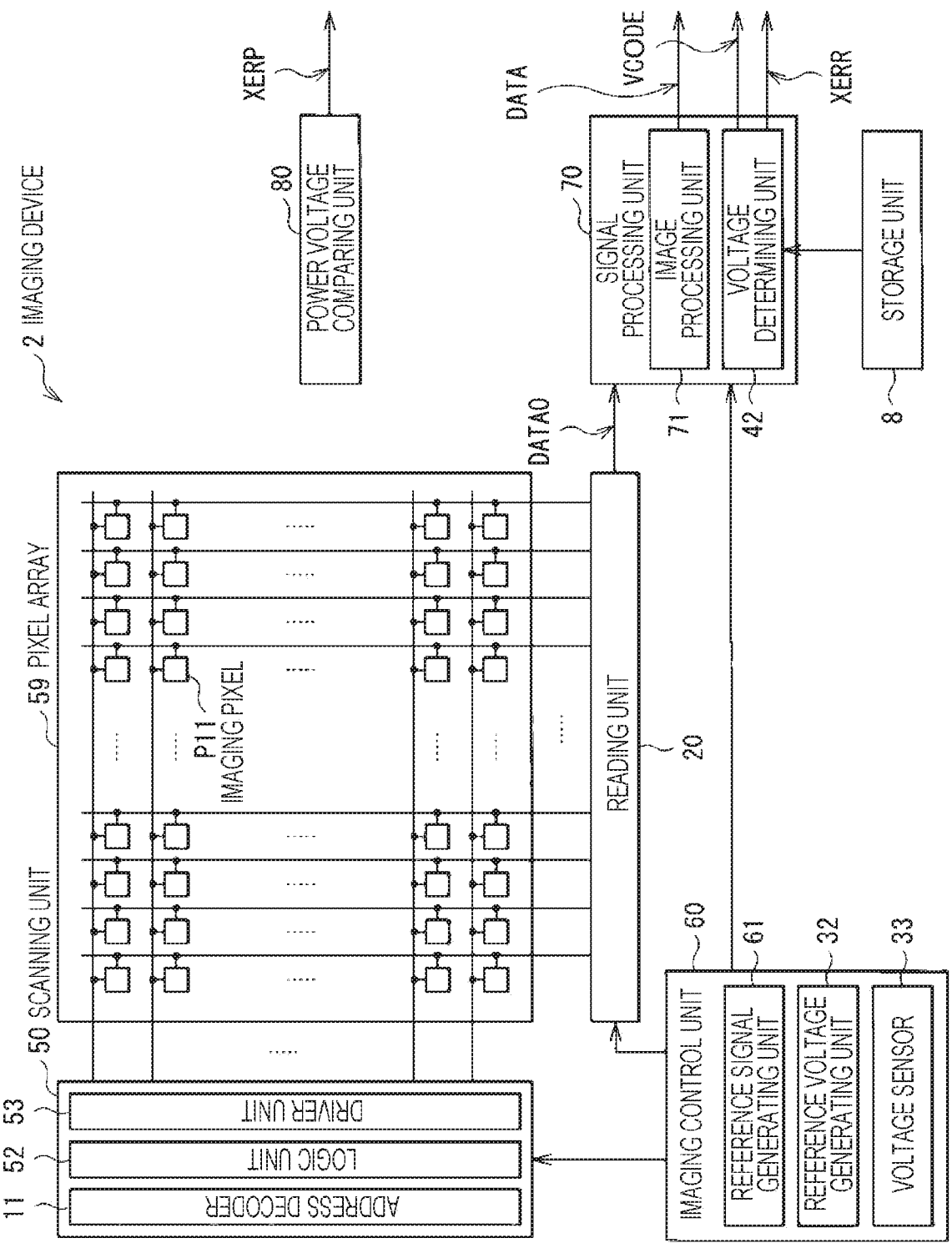
FIG. 32 is a block diagram illustrating a configuration example of an imaging device according to another modified example.

FIG. 32 illustrates a configuration example of the imaging device 2. The imaging device 2 includes a pixel array 59, a scanning unit 50, a reading unit 20, an imaging control unit 60, and a signal processing unit 70.

The pixel array 59 includes a plurality of imaging pixels P11 which are arranged in a matrix form.

Figure 33:
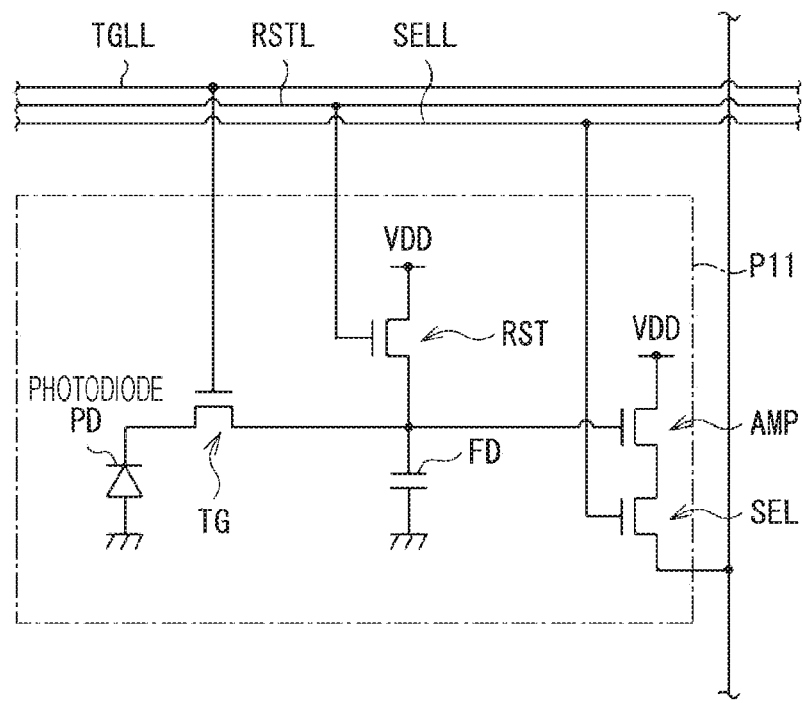
FIG. 33 is a circuit diagram illustrating a configuration example of an imaging pixel illustrated in FIG. 32.

FIG. 33 illustrates a configuration example of the imaging pixel P11. The pixel array 59 includes a plurality of control line TGLLs, a plurality of control line RSTLs, a plurality of control line SELLs, and a plurality of signal line SGLs. The control line TGLL extends in the horizontal direction (the traverse direction in FIG. 32), and the signal STG is applied to the control line TGLL by the scanning unit 50. The control line RSTL extends in the horizontal direction, and the signal SRST is applied to the control line RSTL by the scanning unit 50. The control line SELL extends in the horizontal direction, and the signal SSEL is applied to the control line SELL by the scanning unit 50. The signal line SGL extends in the vertical direction (the longitudinal direction in FIG. 32) and is connected to the reading unit 20.

The imaging pixel P11 includes a photodiode PD, a transistor TG, a transistor RST, a floating diffusion FD, and transistors AMP and SEL. The transistors TG, RST, and SEL are N-type MOS transistors in this example. The photodiode PD is a photoelectric conversion element that generates an amount of electric charges corresponding to an amount of received light and accumulates the electric charges therein. An anode of the photodiode PD is grounded, and a cathode is connected to the source of transistor TG. A gate of the transistor TG is connected to the control line TGLL, a source is connected to the cathode of the photodiode PD, and a drain is connected to the floating diffusion FD. A gate of the transistor RST is connected to the control line RSTL, a drain is supplied with the power voltage VDD, and a source is connected to the floating diffusion FD.

With this configuration, in the imaging pixel P11, the transistor SEL enters the ON state on the basis of the signal SSEL applied to the control line SELL, and thus the imaging pixel P11 is electrically connected to the signal line SGL. Further, the imaging pixel P11 outputs the pixel voltage VP corresponding to the voltage in the floating diffusion FD to the signal line SGL as the signal SIG. Specifically, the imaging pixel P11 sequentially outputs two pixel voltages VP (VP11 and VP12) in two periods (a P-phase period TP and a D phase period TD) in the so-called horizontal period H as described later.

Figure 34:
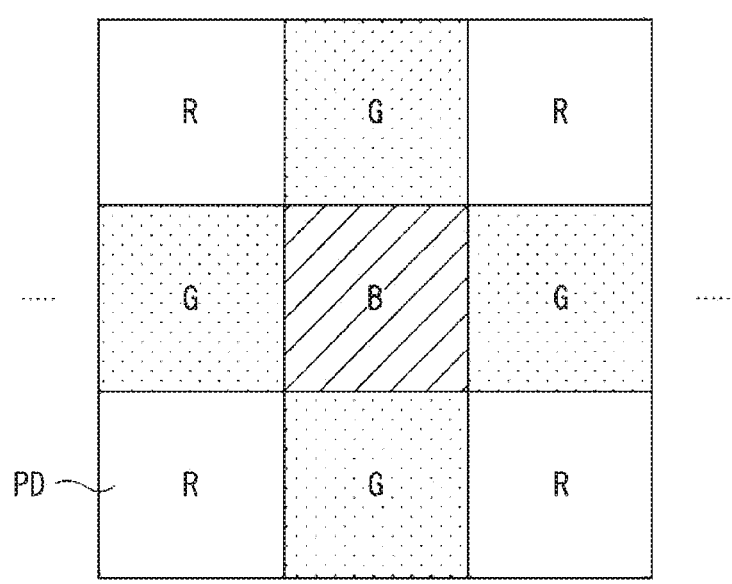
FIG. 34 is an explanatory diagram illustrating a configuration example of a pixel array illustrated in FIG. 32.

FIG. 34 illustrates an example of an array of the photodiode PDs. In FIG. 34, "R" indicates a red color filter, "G" indicates a ruled color filter, and "B" indicates a blue color filter. The photodiode PDs are arranged in a matrix form.

The scanning unit 50 (FIG. 32) sequentially drives the imaging pixel P11 in the pixel array 59 in units of pixel lines L on the basis of an instruction from the imaging control unit 60. The scanning unit 50 includes an address decoder 11, a logic unit 52, and a driver unit 53. The logic unit 52 generates signals STG1, SRST1, and SSEL1 corresponding to the respective pixel lines L on the basis of an instruction from the address decoder 11. The driver unit 53 generates the signals STG, SRST, and SSEL corresponding to the respective pixel lines L on the basis of the signals STG1, SRST1, and SSEL1 corresponding to the respective pixel lines L.

The imaging control unit 60 supplies the control signals to the scanning unit 50, the reading unit 20, and the signal processing unit 70 and controls the operation of the imaging device 2 by controlling the operations of the circuits. The imaging control unit 60 includes a reference signal generating unit 61. The reference signal generating unit 61 generates the reference signal REF. The reference signal REF has a so-called ramp waveform in which the voltage level gradually decreases with the passage of time in the two periods (the P-phase period TP and the D phase period TD) in which the AD conversion is performed.

The signal processing unit 70 includes an image processing unit 71. The image processing unit 71 performs predetermined image processing on the image indicated by the image signal DATA0.

In the imaging device 2, the accumulation start drive D1 and the read drive D2 are performed similarly to those of the imaging device 1 (FIG. 16).

Figure 35:
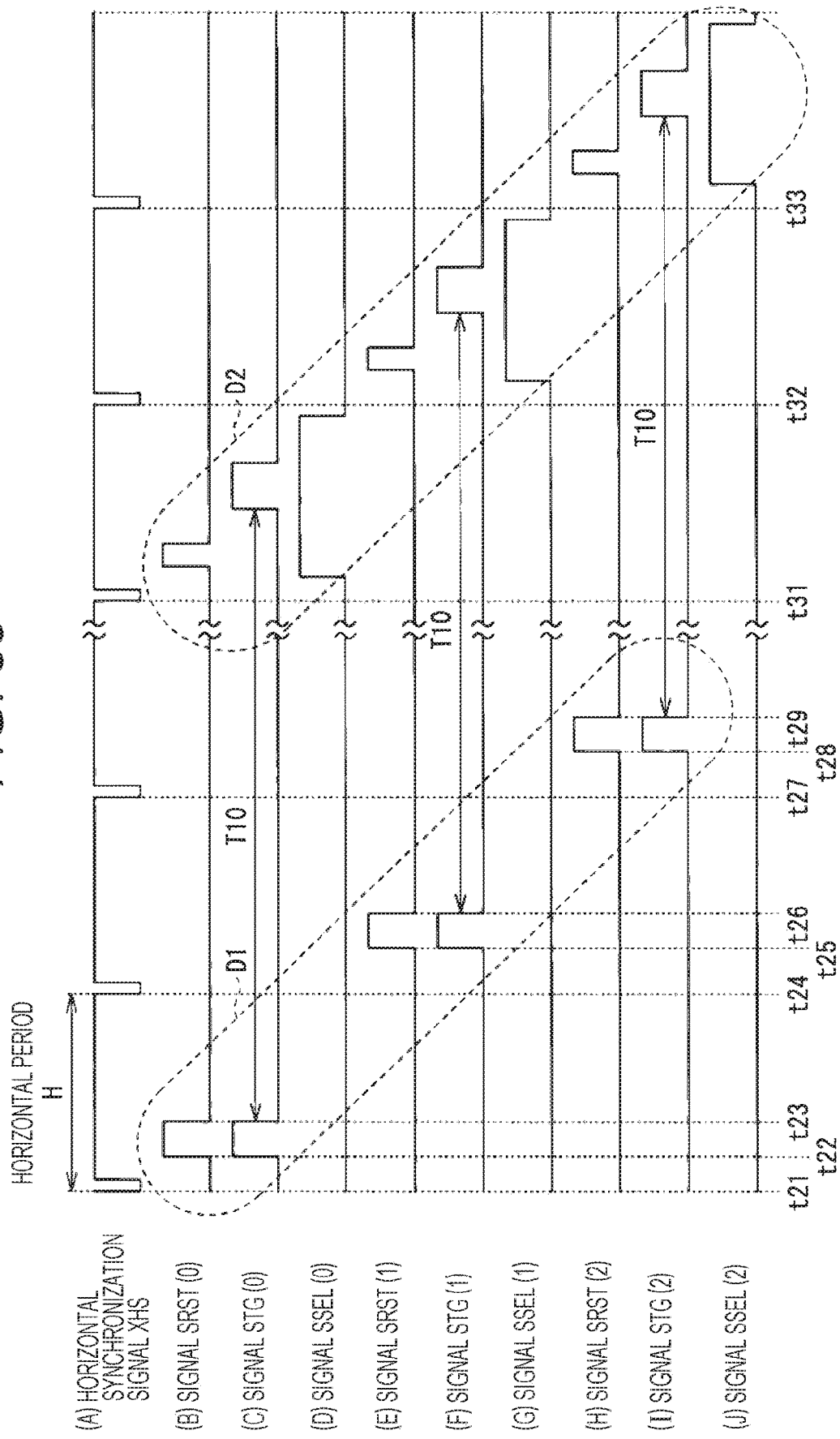
FIG. 35 is a timing waveform diagram illustrating an operation example of an imaging device illustrated in FIG. 32.

FIG. 35 illustrates an operation example of the imaging device 2, and (A) illustrates the waveform of horizontal synchronization signal XHS, (B) illustrates the waveform of a signal SRST(0) in a control line RSTL(0) related to a 0-th pixel line L, (C) illustrates the waveform of a signal STG(0) in a control line TGLL(0) related to the 0-th pixel line L, (D) illustrates the waveform of a signal SSEL(0) in a control line SELL(0) related to the 0-th pixel line L, (E) illustrates the waveform of a signal SRST(1) in a control line RSTL(1) related to the first pixel line L, (F) illustrates the waveform of a signal STG(1) in a control line TGLL(1) related to the first pixel line L, (G) illustrates the waveform of a signal SSEL(1) in a control line SELL(1) related to the first pixel line L, (H) illustrates the waveform of a signal SRST(2) in a control line RSTL(2) related to the second pixel line L, (I) illustrates the waveform of a signal STG(2) in a control line TGLL(2) related to the second pixel line L, and (J) illustrates the waveform of a signal SSEL(2) in a control line SELL(2) related to the second pixel line L.

In the accumulation start drive D1, the scanning unit 50 sets the transistors TG and RST to the ON state in a predetermined period within the horizontal period H in units of pixel lines L, for example, in order from the top in the vertical direction, and then sets the transistors to the OFF state. Accordingly, in each of a plurality of imaging pixels P11, the electric charges are accumulated in the accumulation period T10 until the read drive D2 is performed.

Then, in the read drive D2, the scanning unit 50 controls the operations of the transistors TG, RST, and SEL in units of pixel lines L, for example, in the vertical direction in order from the top. Accordingly, each of a plurality of imaging pixels P11 sequentially outputs the two pixel voltages VP (VP11 and VP12). The reading unit 20 performs the AD conversion on the basis of the two pixel voltages VP11 and VP12 and outputs the digital code CODE.

Figure 36:
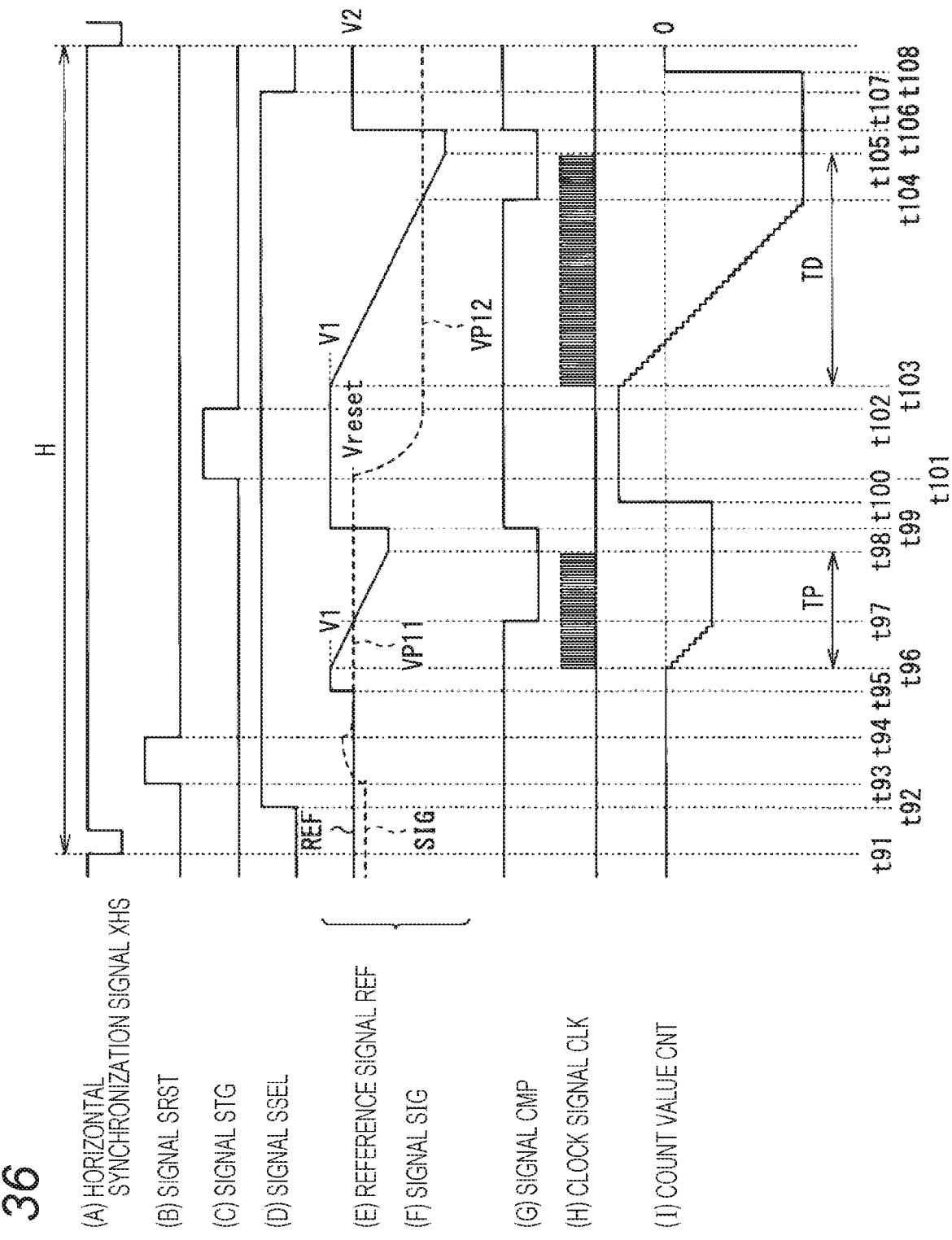
FIG. 36 is another timing waveform diagram illustrating an operation example of an imaging device illustrated in FIG. 32.

FIG. 36 illustrates an operation example of the read drive D2 in an imaging pixel P11A of interest, and (A) illustrates the waveform of the horizontal synchronization signal XHS, (B) illustrates the waveform of the signal SRST, (C) illustrates the waveform of the signal STG(D) illustrates the waveform of the signal SSEL, (E) illustrates the waveform of the reference signal REF, (F) illustrates the waveform of the signal SIG, (G) illustrates the waveform of the signal CMP output from the comparator 24 of the AD converting unit ADC, (H) illustrates the waveform of the clock signal CLK, and (I) illustrates the count value CNT in the counter 25 of the AD converting unit ADC. Here, the reference signal REF of (E) of FIG. 36 indicates the waveform at the positive input terminal of the comparator 24, and the signal SIG of (F) of FIG. 36 indicates the waveform at the negative input terminal of the comparator 24.

In the imaging device 2, in a certain horizontal period (H), the scanning unit 50 first performs a reset operation on the imaging pixel P11A, and the AD converting unit ADC performs the AD conversion on the basis of the pixel voltage VP11 output from the imaging pixel P11A in the subsequent P-phase period TP. Then, the scanning unit 50 performs the charge transfer operation on the imaging pixel P11A, and the AD converting unit ADC performs the AD conversion on the basis of the pixel voltage VP12 output from the imaging pixel P11A in the D phase period TD. The operation will be described below in detail.

First, in a case in which the horizontal period H starts at a timing t91, at a timing t92, the scanning unit 50 causes the voltage of the signal SSEL to be changed from the low level to the high level ((D) of FIG. 36) Accordingly, in the imaging pixel P11A, the transistor SEL enters the ON state, and thus the imaging pixel P11A is electrically connected to the signal line SGL.

Then, at a timing t93, the scanning unit 50 causes the voltage of the signal SRST to be changed from the low level to the high level ((B) of FIG. 36). Accordingly, in the imaging pixel P11A, the transistor RST enters the ON state, and thus the voltage of the floating diffusion FD is set to the power voltage VDD (the reset operation).

Then, at a timing t94, the scanning unit 50 causes the voltage of the signal SRST to be changed from the high level to the low level ((B) of FIG. 36). Accordingly, in the imaging pixel P11A, the transistor RST enters the OFF state. Further, the comparator 24 performs the zero adjustment for electrically connecting the positive input terminal with the negative input terminal in a period of the timing t94 to a timing t95.

Then, at the timing t95, the comparator 24 finishes the zero adjustment and electrically disconnects the positive input terminal from the negative input terminal. Then, at the timing t95, the reference signal generating unit 61 causes the voltage of the reference signal REF to be changed to the voltage V1 ((E) of FIG. 36).

Accordingly, in the imaging pixel P11A, the transistor SEL enters the ON state, and the transistors TG and RST enter the OFF state. The floating diffusion FD holds the electric charges when the floating diffusion FD is reset in a period from the timings t93 to the timing t94. The imaging pixel P11A outputs the pixel voltage VP (the pixel voltage VP11) corresponding to the voltage at the floating diffusion FD at this time.

Then, in the period of the timing t96 to the timing t98 (the P-phase period TP), the reading unit 20 performs the AD conversion on the basis of the pixel voltage VP11. Specifically, at the timing t96, the imaging control unit 60 starts to generate the clock signal CLK ((H) of FIG. 36), and at the same time, the reference signal generating unit 61 starts to lower the voltage of the reference signal REF from the voltage V1 by a predetermined change degree ((E) of FIG. 36). In response to this, the counter 25 of the AD converting unit ADC starts the count operation and causes the count value CNT to be changed sequentially ((I) of FIG. 36).

Then, at a timing t97, the voltage of the reference signal REF is lower than the pixel voltage VP11 ((E) and (F) of FIG. 36). In response to this, the comparator 24 of the AD converting unit ADC causes the voltage of the signal CMP to be changed from the high level to the low level ((G) of FIG. 36). Accordingly, the counter 25 stops the count operation ((I) of FIG. 36).

Then, at the timing t98, the imaging control unit 60 stops the generation of the clock signal CLK with the end of the P-phase period TP ((H) of FIG. 36). At the same time, the reference signal generating unit 61 stops the changing of the voltage of the reference signal REF, and causes the voltage of the reference signal REF to be changed to the voltage V1 at a subsequent timing t99 ((E) of FIG. 36). Since the voltage of the reference signal REF exceeds the pixel voltage VP11 accordingly ((E) and (F) FIG. 36), the comparator 24 of the AD converting unit ADC causes the voltage of the signal CMP to be changed from the low level to the high level ((G) of FIG. 36).

Then, at a timing t100, the counter 25 of the AD converting unit ADC inverts a polarity of the count value CNT on the basis of the control signal CC ((I) of FIG. 36).

Then, at a timing t101, the scanning unit 50 causes the voltage of the signal STG to be changed from the low level to the high level ((C) of FIG. 36). Accordingly, in the imaging pixel P11A, the transistor TG enters the ON state, and as a result, the electric charges generated in the photodiode PD are transferred to the floating diffusion FD (the charge transfer operation). In response to this, the voltage of the signal SIG decreases ((F) of FIG. 36).

Then, at a timing t102, the scanning unit 50 causes the voltage of the signal STG to be changed from the high level to the low level ((C) of FIG. 36). Accordingly, in the imaging pixel P11A, the transistor TG enters the OFF state.

Accordingly, in the imaging pixel P11A, the transistor SEL enters the ON state, and the transistors TG and RST enter the OFF state. The floating diffusion FD holds the electric charges transferred from the photodiode PD in a period of the timing t101 to the timing t102. The imaging pixel P11A outputs the pixel voltage VP (the pixel voltage VP12) corresponding to the voltage at the floating diffusion FD at this time.

Then, in a period of a timing t103 to a timing t105 (the D phase period TD), the reading unit 20 performs the AD conversion on the basis of the pixel voltage VP12. Specifically, at the timing t103, the imaging control unit 60 starts to generate the clock signal CLK ((H) of FIG. 36), and at the same time, the reference signal generating unit 61 starts to lower the voltage of the reference signal REF from the voltage V1 by a predetermined change degree ((E) of FIG. 36). In response to this, the counter 25 of the AD converting unit ADC starts the count operation and causes the count value CNT to be changed sequentially ((I) of FIG. 36).

Then, at a timing t104, the voltage of the reference signal REF is lower than the pixel voltage VP12 ((E) and (F) of FIG. 36). In response to this, the comparator 24 of the AD converting unit ADC causes the voltage of the signal CMP to be changed from the high level to the low level ((G) of FIG. 36). Accordingly, the counter 25 stops the count operation ((I) of FIG. 36). As described above, the AD converting unit ADC obtains the count value CNT corresponding to the difference between the pixel voltages VP11 and VP12. Then, the latch 26 of the AD converting unit ADC outputs the count value CNT as the digital code CODE.

Then, at a timing t105, the imaging control unit 60 stops the generating of the clock signal CLK with the end of the D phase period TD ((H) of FIG. 36). At the same time, the reference signal generating unit 61 stops the changing of the voltage of the reference signal REF and causes the voltage of the reference signal REF to be changed to a voltage V2 at a subsequent timing t106 ((E) of FIG. 36). Since the voltage of the reference signal REF exceeds the pixel voltage VP12 accordingly ((E) and (F) of FIG. 36), the comparator 24 of the AD converting unit ADC causes the voltage of the signal CMP to be changed from the low level to the high level ((G) of FIG. 36).

Then, at a timing t107, the scanning unit 50 causes the voltage of the signal SSEL to be changed from the high level to the low level ((D) of FIG. 36). Accordingly, in the imaging pixel P11A, the transistor SEL enters the OFF state, and the imaging pixel P11A is electrically disconnected from the signal line SGL.

Then, at a timing t108, the counter 25 of the AD converting unit ADC resets the count value CNT to "0" on the basis of the control signal CC ((I) of FIG. 36).

As described above, in the imaging device 2, the count operation is performed on the basis of the pixel voltage VP11 in the P-phase period TP, the polarity of the count value CNT is inverted, and then the count operation is performed on the basis of the pixel voltage VP12 in the D phase period TD I made it. Accordingly, the imaging device 2 can acquire the digital code CODE corresponding to the difference voltage between the pixel voltages VP11 and VP12. Since the correlated double sampling is performed in the imaging device 2, it is possible to remove the noise component included in the pixel voltage VP12, and it is possible to improve the image quality of the captured image accordingly.

The imaging device 2 performs the voltage detection operation using the blanking period T20 similarly to the imaging device 1 according to the above embodiment. Specifically, the AD converting unit ADC of the reading unit 20 performs the AD conversion on the basis of the signal SIGV in the detection period M having the same length as the horizontal period H (FIG. 36) in the blanking period T20. In the detection period M, the reference signal generating unit 61 and the reading unit 20 perform an operation similar to that in the horizontal period H (FIG. 36). In the detection period M, the imaging control unit 60 sets the control signal SSELV (FIG. 4) to the high level. Accordingly, in the reading unit 20, in each of a plurality of AD converting units ADC, the transistor 29 enters the ON state, and the signal corresponding to the signal SIGV generated by the voltage sensor 33 is input to the negative input terminal of the comparator 24 via the transistor 29 and the capacitive element 22. Then, similarly to the case of the above embodiment (FIG. 21), the AD converting unit ADC performs the AD conversion on the basis of the voltage VDDH34 in the signal SIGV in the P-phase period TP, and generates the digital code CODE by performing the AD conversion on the basis of the voltage VDDH12 in the signal SIGV in the D phase period TD.

Then, the calculating unit 43 of the voltage determining unit 42 performs the calculation process on the basis of the digital value VALV using the digital code CODE as the digital value VALV and generates the voltage code VCODE1 having a predetermined code system. As described above, the calculating unit 43 generates a plurality of voltage codes VCODE1 on the basis of a plurality of digital value VALVs obtained from a plurality of AD converting units ADC. Then, the calculating unit 43 generates the voltage code VCODE by obtaining the average value of the values indicated by a plurality of voltage codes VCODE1.

Fifth Modified Example

Figure 37:
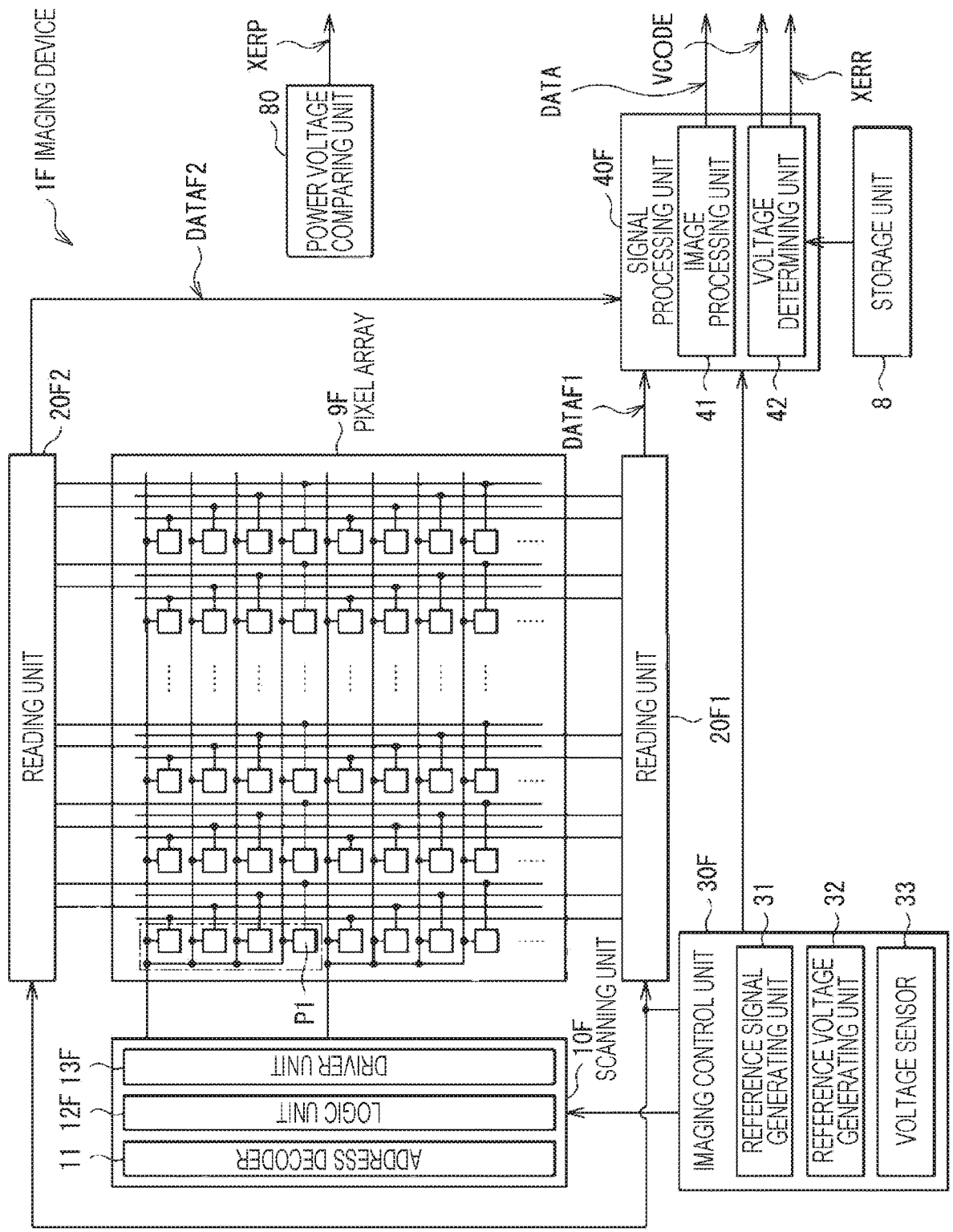
FIG. 37 is a block diagram illustrating a configuration example of an imaging device according to another modified example.

In the above embodiment, for example, a plurality of imaging pixels P1 connected to the same control lines TGLL, FDGL, RSTL, FCGL, TGSL, and SELL are arranged in parallel in the horizontal direction in the pixel array 9, but the present disclosure is not limited thereto. Instead, for example, as in an imaging device 1F illustrated in FIG. 37, a plurality of imaging pixels P1 (the four imaging pixels P1 in this example) connected to the same control lines TGLL, FDGL, RSTL, FCGL, TGSL, and SELL may be arranged in parallel in the vertical direction. The imaging device 1F includes a pixel array 9F, a scanning unit 10F, reading units 20F1 and 20F2, an imaging control unit 30F, and a signal processing unit 40F. The even numbered signal lines SGL (0-th, second, fourth, . . . ) of the pixel array 9F are connected to the reading unit 20F1, the odd numbered signal lines SGL (first, third, fifth, . . . ) of pixel array 9F re connected to the reading unit 20F2. The control lines TGLL, FDGL, RSTL, FCGL, TGSL, and SELL are connected to the scanning unit 10F. In this example, the four imaging pixels P1 connected to the same control lines TGLL, FDGL, RSTL, FCGL, TGSL, and SELL are arranged in parallel in the vertical direction (the longitudinal direction in FIG. 37). The scanning unit 10F includes a logic unit 12F and a driver unit 13F. The reading unit 20F1 generates image signal DATAF1 by performing the AD conversion on the basis of the signal SIG supplied from the pixel array 9F via the even-numbered signal line SGL. The reading unit 20F2 generates image signal DATAF2 by performing the AD conversion on the basis of the signal SIG supplied from the pixel array 9F via the odd numbered signal line SGL. The signal processing unit 40F performs signal processing on the images indicated by the image signals DATAF1 and DATAF2.

Sixth Modified Example

Figure 38:
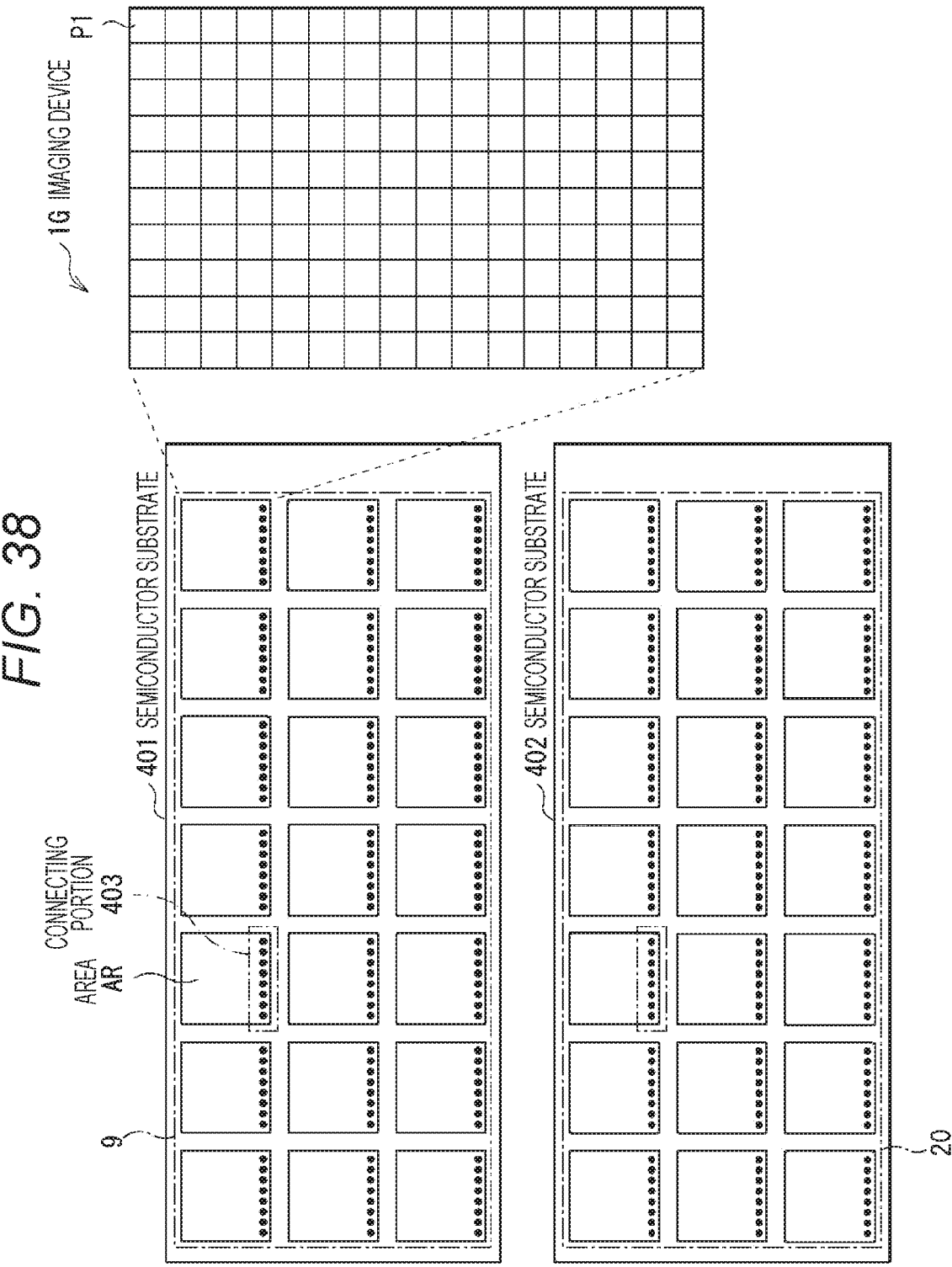
FIG. 38 is an explanatory diagram illustrating an implementation example of an imaging device according to another modified example.

In the above embodiment, each AD converting unit ADC is connected to a plurality of imaging pixels P1 corresponding to one column in the pixel array 9, but the present disclosure is not limited thereto, and instead, for example, as in an imaging device 1G illustrated in FIG. 38, each AD converting unit ADC may be connected to a plurality of imaging pixels P1 belonging to a predetermined area. The imaging device 1F is formed in two semiconductor substrates 401 and 402. The pixel array 9 is formed on the semiconductor substrate 401. The pixel array 9 is divided into a plurality of areas AR (21 areas in this example), and each area AR includes a plurality of imaging pixels P1 (160 imaging pixels P1 in this example). The reading unit 20 is formed on the semiconductor substrate 402. Specifically, in the semiconductor substrate 402, an AD converting unit ADC connected to a plurality of imaging pixels P1 belonging to the area AR is formed in each of a plurality of regions corresponding to a plurality of areas AR in the semiconductor substrate 401. The semiconductor substrate 401 and the semiconductor substrate 402 are overlapped and electrically connected to each other via a connecting portion 403, for example, using a Cu—Cu connection. Further, in this example, the pixel array 9 is divided into 21 areas AR, but the present disclosure is not limited thereto, and instead, the pixel array 9 may be divided into, for example, 20 or less areas AR or 22 or more areas AR. Further, in this example, 160 imaging pixels P1 are disposed in each area AR, but the present disclosure is not limited thereto, and instead, for example, 159 or less imaging pixels P1 or 161 or more imaging pixels P1 may be disposed.

Other Modified Examples

Further, two or more of the present modified examples may be combined.

2. Use Example of Imaging Device

Figure 39:
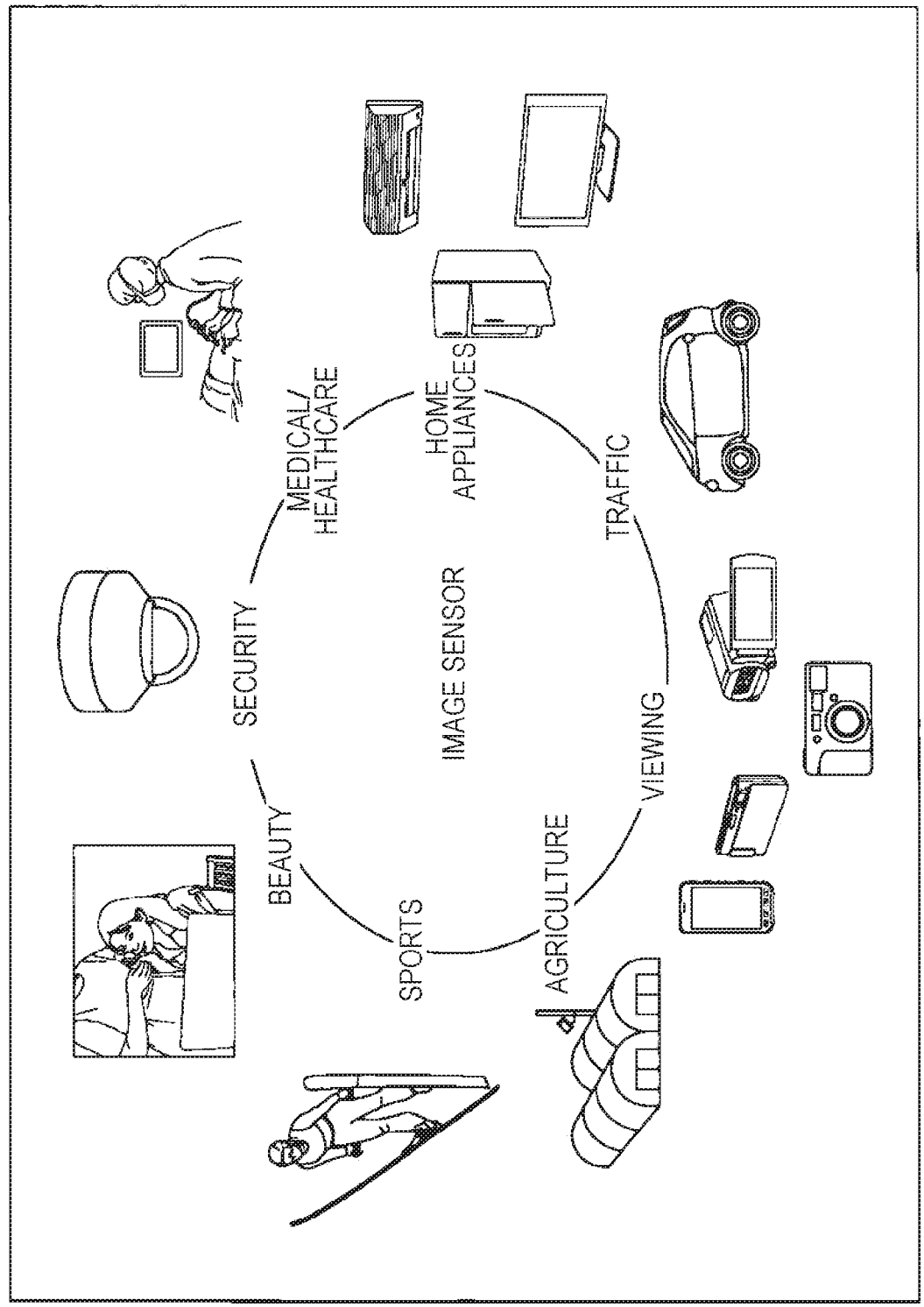
FIG. 39 is an explanatory diagram illustrating a use example of an imaging device.

FIG. 39 illustrates a use example of the imaging device 1 according to the above embodiment or the like. The imaging device 1 or the like described above can be used in various cases of sensing light such as visible light, infrared light, ultraviolet light, X rays, or the like, for example, as described below.

Devices of capturing an image used for viewing such as digital cameras or portable devices with a camera function Devices used for traffic such as in-vehicle sensors of photographing a front, a back, a surrounding area, an inside, or the like of an automobile, surveillance cameras of monitoring traveling vehicles or roads, and distance measuring sensors of measuring an inter-vehicle distance or the like, for safe driving such as automatic stop, recognition of a state of a driver, and the like Devices used for home appliances such as televisions, refrigerators, air conditioners, or the like to photograph user gestures and perform device operations in accordance with the gestures Devices used for medical or healthcare such as endoscopes or devices of receiving infrared light and performing angiography Devices used for security such as surveillance cameras for security purpose or cameras for person authentication Devices used for beauty purpose such as skin measuring instruments of photographing the skin or microscopes of photographing the scalp Device used for sports or the like such as action cameras for sports use or wearable cameras Devices used for agriculture such as cameras of monitoring states of fields or crops 3. Application Example to Mobile Object The technology according to the present disclosure (the present technology) can be applied to various products. For example, the technology according to the present disclosure may be implemented as devices mounted on all types of mobile object such as automobiles, electric vehicles, hybrid electric vehicles, tricycles, bicycles, personal mobilities, airplanes, drones, ships, robots, or the like.

Figure 40:
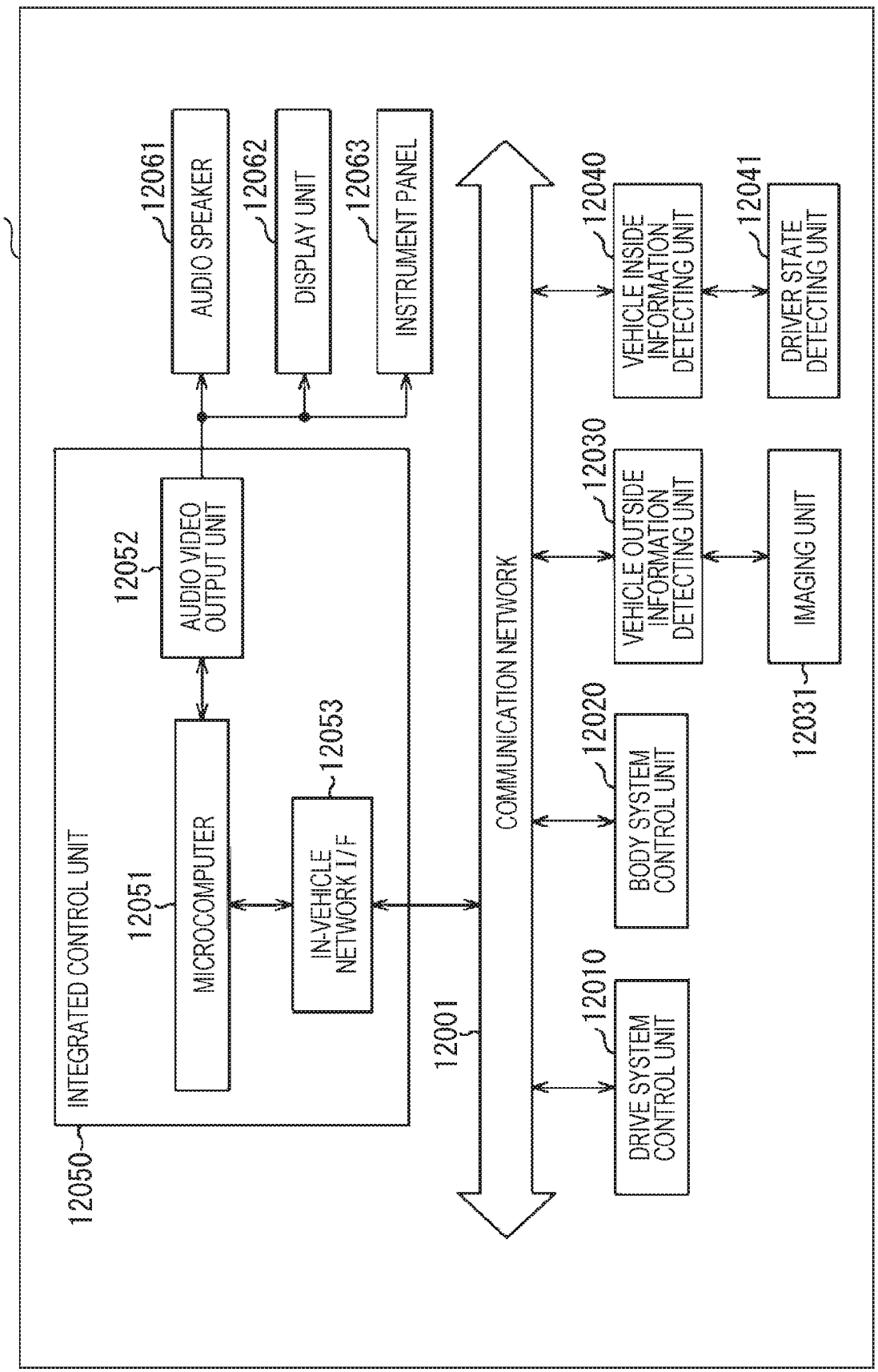
FIG. 40 is a block diagram illustrating an example of a schematic configuration of a vehicle control system.

FIG. 40 is a block diagram illustrating a schematic configuration example of a vehicle control system which is an example of a mobile object control system to which the technology according to the present disclosure can be applied.

A vehicle control system 12000 includes a plurality of electronic control units connected via a communication network 12001. In the example illustrated in FIG. 40, the vehicle control system 12000 includes a drive system control unit 12010, a body system control unit 12020, a vehicle outside information detecting unit 12030, a vehicle inside information detecting unit 12040, and an integrated control unit 12050. Further, as a functional configuration of the integrated control unit 12050, a microcomputer 12051, an audio video output unit 12052, and an in-vehicle network interface (I/F) 12053 are illustrated.

The drive system control unit 12010 controls an operation of a device associated with a drive system of the vehicle in accordance with various programs. For example, the drive system control unit 12010 functions as a drive force generating device for generating drive force of the vehicle such as an internal combustion engine or a driving motor, a drive force transmission mechanism for transmitting the drive force to wheels, a steering mechanism for adjusting a rudder angle of the vehicle, and a control device such as a braking device for generating braking force of the vehicle.

The body system control unit 12020 controls operations of various devices installed in the vehicle body in accordance with various programs. For example, the body system control unit 12020 functions as a keyless entry system, a smart key system, a power window device, or a control device for various lamps such as a headlamp, a back lamp, a brake lamp, a turn signal lamp, and a fog lamp. In this case, a radio wave transmitted from a portable device substituting a key or signals of various switches can be input to the body system control unit 12020. The body system control unit 12020 receives an input of the radio wave or the signal and controls a door lock device, a power window device, a lamp, or the like of the vehicle.

The vehicle outside information detecting unit 12030 detects information about the outside of the vehicle equipped with the vehicle control system 12000. For example, an imaging unit 12031 is connected to the vehicle outside information detecting unit 12030. The vehicle outside information detecting unit 12030 causes the imaging unit 12031 to capture an image of the outside of the vehicle and receives the captured image. The vehicle outside information detecting unit 12030 may perform an object detection process or a distance detection process on a person, a car, an obstacle, a sign, a character on a road surface, or the like on the basis of the received image.

The imaging unit 12031 is a light sensor that outputs an electric signal corresponding to an amount of received light. The imaging unit 12031 can output an electric signal as an image or can output an electric signal as distance measurement information. Further, the light received by the imaging unit 12031 may be visible light or may be invisible light such as infrared light.

The vehicle inside information detecting unit 12040 detects information about the inside of the vehicle. For example, a driver state detecting unit 12041 that detects the state of the driver is connected to the vehicle inside information detecting unit 12040. The driver state detecting unit 12041 may include, for example, a camera that images the driver, and the vehicle inside information detecting unit 12040 may calculate a degree of fatigue or a degree of concentration of the driver on the basis of the detection information input from the driver state detecting unit 12041 or determine whether or not the driver dozes.

The microcomputer 12051 calculates a control target value of the drive force generating device, the steering mechanism, or the braking device on the basis of the information about the outside or the inside of the vehicle acquired by the vehicle outside information detecting unit 12030 or the vehicle inside information detecting unit 12040, and outputs a control command to the drive system control unit 12010. For example, the microcomputer 12051 is able to perform cooperative control intended for implementing a function of advanced driver assistance system (ADAS) including collision avoidance or impact mitigation of the vehicle, follow-up traveling based on a distance between vehicles, constant speed traveling, a vehicle collision warning, a vehicle lane deviation warning, or the like.

Further, the microcomputer 12051 can perform cooperative control intended for automatic driving in which traveling is performed autonomously regardless of a manipulation of the driver or the like by controlling the drive force generating device, the steering mechanism, the braking device, or the like on the basis of the information about the surrounding area of the vehicle acquired by the vehicle outside information detecting unit 12030 or the vehicle inside information detecting unit 12040.

Further, the microcomputer 12051 can output a control command to the body system control unit 12020 on the basis of the information about the outside of the vehicle acquired by the vehicle outside information detecting unit 12030. For example, the microcomputer 12051 performs cooperative control intended for a fender of switching a high beam to a low beam by controlling the headlamp in accordance with a position of a preceding vehicle or an oncoming vehicle detected by the vehicle outside information detecting unit 12030.

The audio video output unit 12052 transmits an output signal of at least one of an audio and a video to an output device capable of visually or audibly notifying a passenger of the vehicle or the outside of the vehicle of information. In the example of FIG. 39, an audio speaker 12061, a display unit 12062, and an instrument panel 12063 are illustrated as output devices. The display unit 12062 may include, for example, at least one of an on-board display and a head-up display.

Figure 41:
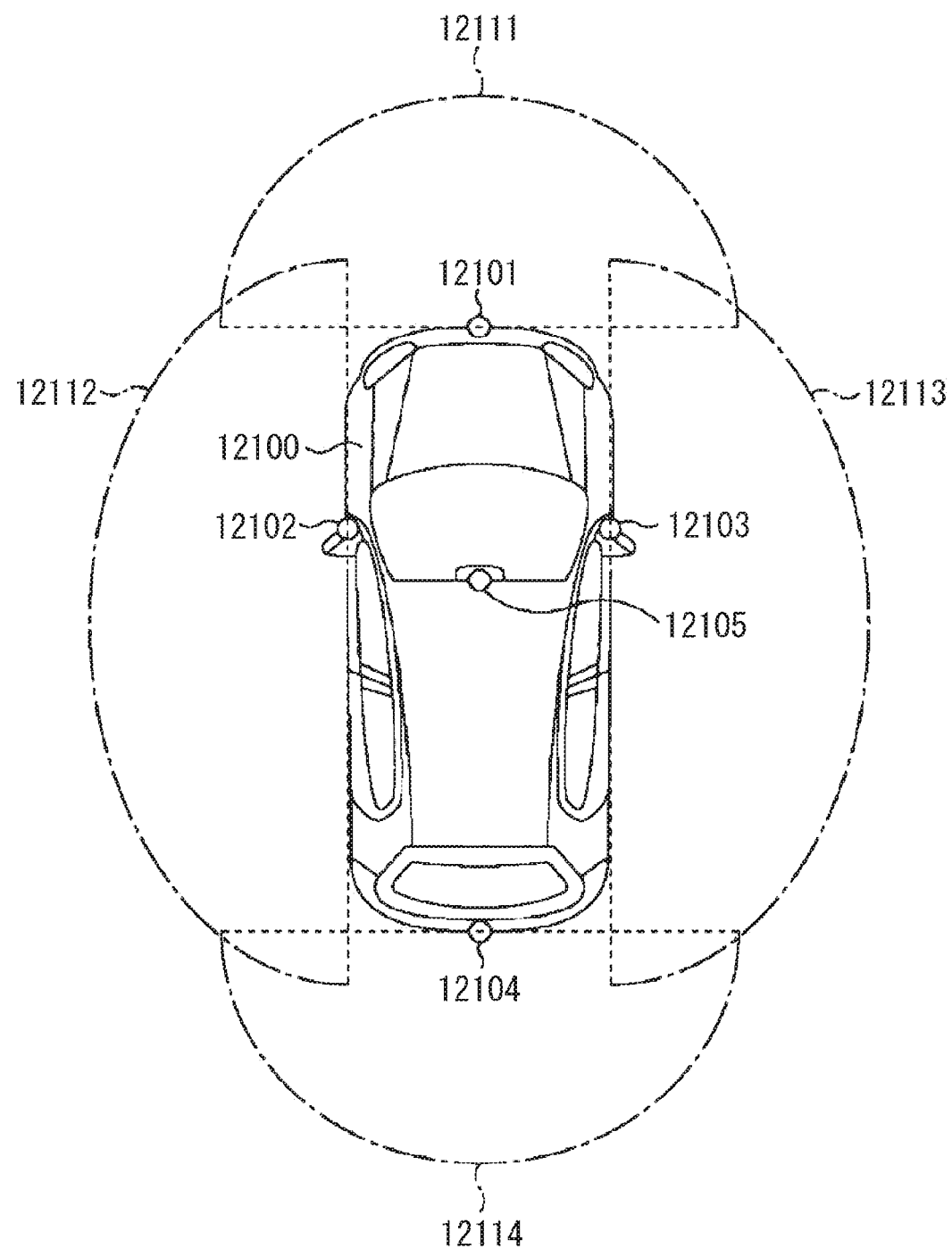
FIG. 41 is an explanatory diagram illustrating an example of installation positions of a vehicle outside information detecting unit and an imaging unit.

FIG. 41 is a diagram illustrating an example of the installation position of the imaging unit 12031.

In FIG. 41, a vehicle 12100 includes imaging units 12101, 12102, 12103, 12104, and 12105 as the imaging unit 12031.

For example, the imaging units 12101, 12102, 12103, 12104, and 12105 are installed at positions such as a front nose, a side mirror, a rear bumper, a back door, and an upper part of a windshield in a passenger compartment of the vehicle 12100. The imaging unit 12101 installed in the front nose and the imaging unit 12105 installed in the upper part of the windshield in the vehicle compartment mainly acquire an image of an area in front of the vehicle 12100. The imaging units 12102 and 12103 installed in the side mirrors mainly acquire an image of the side of the vehicle 12100. The imaging unit 12104 installed in the rear bumper and the back door mainly acquires an image of an area behind the vehicle 12100. The images of the front area acquired by the imaging units 12101 and 12105 are mainly used for detection of a preceding vehicle, a pedestrian, an obstacle, a traffic light, a traffic sign, a lane, or the like.

Further, FIG. 41 illustrates an example of an imaging range of the imaging units 12101 to 12104. An imaging range 12111 indicates an imaging range of the imaging unit 12101 installed in the front nose, imaging ranges 12112 and 12113 indicate imaging ranges of the imaging units 12102 and 12103 installed in the side mirrors, and an imaging range 12114 indicates an imaging range of the imaging unit 12104 installed in the rear bumper or the back door. For example, since image data captured by the imaging units 12101 to 12104 overlap, a plane view image in which the vehicle 12100 is viewed from above is obtained.

At least one of the imaging units 12101 to 12104 may have a function of acquiring distance information. For example, at least one of the imaging units 12101 to 12104 may be a stereo camera including a plurality of imaging elements or may be an imaging element including pixels for phase difference detection.

For example, the microcomputer 12051 can obtain distances to three-dimensional objects in the imaging range 12111 to 12114 and a temporal change in distance (a relative speed with respect to the vehicle 12100) on the basis of the distance information obtained from the imaging units 12101 to 12104 and extract, particularly, a three-dimensional object which is closest on a traveling path of the vehicle 12100 and travels at a predetermined speed (for example, 0 km/h or more) in substantially the same direction as the preceding vehicle. Further, the microcomputer 12051 can set an inter-vehicle distance to be secured in advance short of the preceding vehicle and perform automatic brake control (including follow-up stop control), automatic acceleration control (including follow-up start control), or the like. As described above, it is possible to perform the cooperative control for autonomous driving or the like in which traveling is performed autonomously without depending on the operation of the driver.

For example, the microcomputer 12051 classifies three-dimensional object data related to the three-dimensional objects into three-dimensional objects such as a two-wheeled vehicle, a regular vehicle, a large vehicle, a pedestrian, and other three-dimensional objects such as an electric pole on the basis of the distance information obtained from the imaging units 12101 to 12104, extracts three-dimensional objects, and use it for obstacle automatic avoidance. For example, the microcomputer 12051 identifies an obstacle around the vehicle 12100 as an obstacle visible to the driver of the vehicle 12100 and an obstacle invisible to the driver of the vehicle 12100. Then, the microcomputer 12051 determines a collision risk indicating the risk of collision with each obstacle, and in a case in which the collision risk is higher than a set value, and there is a possibility of collision, the microcomputer 12051 performs driving assistance for collision avoidance by outputting a warning to the driver via the audio speaker 12061 or the display unit 12062 or performing forced deceleration or avoiding steering via the drive system control unit 12010.

At least one of the imaging units 12101 to 12104 may be an infrared camera for detecting infrared rays. For example, the microcomputer 12051 can recognize a pedestrian by determining whether or not there is a pedestrian in the captured images of the imaging units 12101 to 12104. Such pedestrian recognition is carried out, for example, by a procedure of extracting feature points in the captured images of the imaging units 12101 to 12104 serving as an infrared camera and a procedure of performing a pattern matching process at a series of feature points indicating a contour of an object and determining whether or not it is a pedestrian. If the microcomputer 12051 determines that there is a pedestrian in the captured images of the imaging units 12101 to 12104 and recognizes the pedestrian, the audio video output unit 12052 controls the display unit 12062 such that a rectangular contour for emphasis is displayed superimposed on the recognized pedestrian. Further, the audio video output unit 12052 may control the display unit 12062 such that an icons or the like indicating the pedestrian is displayed at a desired position.

The example of the vehicle control system to which the technology according to the present disclosure can be applied has been described above. The technology according to the present disclosure can be applied to the imaging unit 12031 among the above-described configurations. Accordingly, in the vehicle control system 12000, it is possible to detect whether or not the power voltage VDD supplied to the imaging unit 12031 is normal and whether or not the voltage Vbgr generated in the imaging unit 12031 is normal. Further, in a case in which one or more of the voltages is abnormal, for example, the microcomputer 12051 is notified of the detection result, and thus the vehicle outside information detecting unit 12030 in the vehicle control system 12000 can detect that the defect occurs in the imaging unit 12031. Here, the vehicle outside information detecting unit 12030 corresponds to a specific example of a "processing device" in the present disclosure. The imaging unit 12031 corresponds to a specific example of an "imaging device" in the present disclosure. Accordingly, in the vehicle control system 12000, for example, since an appropriate process of urging the driver to attract attention or the like can be performed, reliability can be improved. Further, in the vehicle control system 12000, the function of controlling the vehicle can be restricted on the basis of the detection result. Specific examples of the function of controlling the vehicle include a vehicle collision avoidance or collision mitigation function, a follow-up traveling function based on an inter-vehicle distance, a constant speed traveling function, a vehicle collision warning function, a vehicle lane deviation warning function, and the like. In a case in which it is determined that the voltage in the imaging unit 12031 is abnormal, the function of controlling the vehicle can be restricted or prohibited. Specifically, the vehicle outside information detecting unit 12030 the vehicle control system 12000 can control the brake, the engine output, and the transmission. Accordingly, in the vehicle control system 12000, it is possible to prevent accidents caused by erroneous detection based on a voltage abnormality in the imaging unit 12031.

Further, for example, in a case in which the vehicle control system 12000 includes two redundant imaging units 12031 (imaging units 12031A and 12031B), if a voltage in one imaging unit 12031A is determined to be abnormal, and a defect of the imaging unit 12031A is suspected, the other imaging unit 12031B may be caused to operate. Further, for example, in a case in which the vehicle control system 12000 includes a distance measuring unit for detecting a distance to an object (for example, a light detection and ranging (LIDAR) device or a time off flight (TOF) image sensor) in addition to the imaging unit 12031, if the voltage is determined to be abnormal, the distance measuring unit may be caused to operate. In this case, since it is possible to detect at least the distance to the object, it is possible to prevent accidents caused by the erroneous detection based on the voltage abnormality in the imaging unit 12031.

Although the present technology has been described using the embodiment, the modified examples, and the specific application examples, the present technology is not limited to the embodiments and the like, and various modifications can be made.

For example, in the imaging device 1, as illustrated in FIG. 20, the reading unit 20 outputs the digital code CODE2 and CODE3, and the image processing unit 41 calculates the pixel value VAL1 by subtracting the digital code CODE2 from the digital code CODE3 (CODE3−CODE2), but the present disclosure is not limited thereto. Instead, similarly to the case of the imaging device 2 according to the fourth modified example (FIG. 36), the reading unit 20 may invert the polarity of the count value CNT after the conversion period T2 and output the digital code CODE corresponding to the difference between the digital codes CODE2 and the CODE3. The same applies to the digital codes CODE5 and CODE6, the digital codes CODE7 and CODER, and the digital codes CODEA and CODEB.

Further, for example, in the imaging device 1, as illustrated in FIG. 20, the reading unit 20 outputs the digital codes CODE1 and CODE4, and the image processing unit 41 calculates the pixel value VAL2 by subtracting the digital code CODE1 from the digital code CODE4 (CODE4−CODE1), but the present disclosure is not limited thereto. Instead, the AD converting unit ADC of the reading unit 20 may temporarily store the count value CNT at that time therein after the conversion period T1, set the count value CNT in the counter 25 before the conversion period T4, and invert the polarity of the count value CNT. Even in the case, the image processing unit 41 can obtain the digital code CODE corresponding to the difference between the digital codes CODE1 and CODE4, similarly to the case of the imaging device 2 according to the fourth modified example (FIG. 36).

Further, for example, the imaging device 1 is not limited to the configuration illustrated in FIG. 1 or the like and may be modified as appropriate. Similarly, for example, the imaging device 2 is not limited to the configuration illustrated in FIG. 32 or the like and may be modified as appropriate.

Further, the effects described in the specification are merely examples and not limited, and other effects may be included.

Further, the present technology can have the following configurations.

(1)

An imaging device, including:
an imaging unit that is capable of generating image data by performing an imaging operation on the basis of a first power voltage;
an image processing unit that is capable of performing image processing on the image data on the basis of a second power voltage;
a reference voltage generating unit that is capable of generating a first reference voltage on the basis of the first power voltage; and
a first flag generating unit that is capable of comparing the second power voltage with the first reference voltage and generating a first flag signal for the second power voltage and capable of outputting the first flag signal.

(2)

The imaging device according to (1), in which the first flag generating unit is capable of setting the first flag signal to a first logical level indicating that there is an error in a case in which the second power voltage is lower than the first reference voltage.

(3)

The imaging device according to (2), in which the first flag generating unit is capable of setting the first flag signal to a second logical level in a case in which the second power voltage is higher than the first reference voltage, and
a voltage of the second logical level is the first power voltage.

(4)

The imaging device according to (2) or (3), in which a voltage of the first logical level is a ground voltage.

(5)

The imaging device according to any of (1) to (4), in which the second power voltage is lower than the first power voltage.

(6)

The imaging device according to any of (1) to (5), in which the reference voltage generating unit includes a first terminal, a grounded second terminal, and a plurality of resistive elements inserted between the first terminal and the second terminal and connected to one another in series, and is capable of generating a voltage in any one of the plurality of resistive elements as the first reference voltage.

(7)

The imaging device according to (6), in which the first terminal is able to be supplied with the first power voltage.

(8)

The imaging device according to (6), further including a standard voltage generating unit that is capable of generating a standard voltage on the basis of the first power voltage and capable of supplying the standard voltage to the first terminal.

(9)

The imaging device according to any of (1) to (8), further including:
a first power terminal to which the first power voltage is able to be supplied, and
in which a distance between the first power terminal and the reference voltage generating unit is smaller than a distance between the first power terminal and the imaging unit.

(10)

The imaging device according to any of (1) to (9), further including:
- a second power terminal to which the second power voltage is able to be supplied,
- in which a distance between the second power terminal and the first flag generating unit is smaller than a distance between the second power terminal and the image processing unit.

(11)

The imaging device according to any of (1) to (10), in which the reference voltage generating unit is able to further generate a second reference voltage on the basis of the first power voltage, and
- the first flag generating unit is able to further compare the second power voltage with the second reference voltage and generate the first flag signal.

(12)

The imaging device according to (11), in which the first flag generating unit is
- capable of setting the first flag signal to a first logical level indicating that there is an error in a case in which the second power voltage is higher than the second reference voltage and
- capable of setting a voltage of the first flag signal to a second logical level in a case in which the second power voltage is lower than the second reference voltage.

(13)

The imaging device according to any of (1) to (12), further including:
- a data generating unit that is capable of generating power voltage data corresponding to the first power voltage; and
- a second flag generating unit that is capable of comparing the power voltage data with reference data and generating a second flag signal for the first power voltage.

(14)

The imaging device according to (13), in which the data generating unit includes a converting unit that is capable of performing AD conversion, and the converting unit is capable of performing the AD conversion on the basis of a voltage value of the first power voltage and generating the power voltage data.

(15)

The imaging device according to (14), in which the data generating unit is operable on the basis of the second power voltage and further includes a calculating unit that is capable of converting a result of performing the AD conversion on the basis of the voltage value of the first power voltage through the converting unit into data having a predetermined code system and generating the power voltage data.

(16)

An imaging system, including:
- an imaging device that is mountable in a vehicle and capable of imaging an area around the vehicle and generating an image;
- a processing device that is mountable in the vehicle and capable of executing a process of controlling the vehicle on the basis of the image;
- in which the imaging device includes an imaging unit that is capable of generating image data by performing an imaging operation on the basis of a first power voltage;
- an image processing unit that is capable of performing image processing on the image data on the basis of a second power voltage;
- a reference voltage generating unit that is capable of generating a first reference voltage on the basis of the first power voltage; and
- a first flag generating unit that is capable of comparing the second power voltage with the first reference voltage and generating a first flag signal for the second power voltage and capable of outputting the first flag signal.

(17)

An imaging method, including:
- generating image data by performing an imaging operation on the basis of a first power voltage;
- performing image processing on the image data on the basis of a second power voltage;
- generating a first reference voltage on the basis of the first power voltage; and
- comparing the second power voltage with the first reference voltage and generating a first flag signal for the second power voltage and outputting the first flag signal.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1, 1A, 1B, 1C, 1D, 1E, 1F, 1G, 2 Imaging device
8 Storage unit
8A Non-volatile memory
8B, 8C, 8D Register
9, 9A, 9B, 9F, 59 Pixel array
10, 10F, 50 Scanning unit
11 Address decoder
12, 12F, 52 Logic unit
13, 13F, 53 Driver unit
20, 20A, 20F1, 20F2 Reading unit
21, 22 Capacitive element
23 Current source
24 Comparator
25 Counter
26 Latch
28, 29 Transistor
30, 30A, 30B, 30F, 60 Imaging control unit
31, 61 Reference signal generating unit
32 Standard voltage generating unit
33 Voltage sensor
40, 40B, 40F, 70 Signal processing unit
41, 71 Image processing unit
42, 42B Voltage determining unit
43 Calculating unit
44 Determining unit
45, 46 Comparator
47 OR circuit
80, 80C, 80E Power voltage comparing unit
81, 85E Resistive circuit portion
82, 82C, 86E Comparing unit
83L, 83H Comparison circuit
84 AND circuit
91L, 92L, 93L, 94L, 96L, 98L, 99L, 91H, 92H, 93H, 94H, 96H Transistor
95L, 97L, 95H, 97H Current source
200, 301, 302, 401, 402 Semiconductor substrate
201, 311 Peripheral circuit portion
202, 203, 312, 313 Terminal portion
303 Via
403 Connecting portion AMP, FCG, FDG, RST, SEL, TG, TGL, TGS Transistor
AMPV Amplifier
AR Area
ASEL Selector
BF Buffer
BFOUT1, BFOUT2 Output buffer
BUS Bus line
CC Control signal
CLK Clock signal
CODE Digital code
CMP Signal
CMPH, CMPL Signal
CNT Count value
DATA, DATAF1, DATAF2, DATA0 Image signal
D1 Accumulation start drive
D2 Read drive
FCGL, FDGL, RSTL, SELL, SIGVL, TGLL, TGSL Control line
FC Capacitive element
FD Floating diffusion
PCAL Calibration parameter
PD, PD1, PD2 Photodiode
PIC Image
PICA Captured image
P1, P11 Imaging pixel
P2 Dummy pixel
REF Reference signal
RG1 Imaging pixel region
RG2, RG3 Dummy pixel region
RH, RL, RM, RR Resistive circuit portion
SASEL Control signal
SELSW Control signal
SFCG, SFDG, SRST, SSEL, STGL, STGS Signal
SGL Signal line
SIG Signal
SIGV Signal
SSELV Control signal
SSW Control signal
SW Switch unit
SWH, SWL, SWM, SWR Switch
TA, TB, T1 to T8 Conversion period
TD D phase period
THmax, THmin Threshold value
TOUT1, TOUT2 Output terminal
TP P-phase period
TVDDH, TVDDL, TVDDM Power terminal
TVSSH, TVSSL, TVSSM Ground terminal
TVbgr Terminal
T10 Accumulation period
T20 Blanking period
VALV Digital value
VAL1 to VAL4 Pixel value
Vbgr Voltage
VCODE, VCODE1 Voltage code
VDDH, VDDL, VDDM Power voltage
VP, VP1 to VP8 Pixel voltage
VSSH, VSSL, VSSM Ground voltage
VthL, Vth Threshold voltage
XER, XERP, XERR Error flag signal
XERP1, XERR1 Signal
XHS Horizontal synchronization signal

The invention claimed is:

1. An imaging device, comprising:
a pixel array configured to generate image data based on a first power voltage; and
circuitry configured to:
perform image processing on the image data based on a second power voltage;
generate a first reference voltage based on the first power voltage;
compare the second power voltage with the first reference voltage;
generate a first flag signal for the second power voltage based on the comparison of the second power voltage with the first reference voltage; and
output the first flag signal.

2. The imaging device according to claim 1, wherein the circuitry is further configured to set the first flag signal to a first logical level indicating an error in a case where the second power voltage is lower than the first reference voltage.

3. The imaging device according to claim 2, wherein
the circuitry is further configured to set the first flag signal to a second logical level in a case where the second power voltage is higher than the first reference voltage, and
a voltage of the second logical level is the first power voltage.

4. The imaging device according to claim 2, wherein a voltage of the first logical level is a ground voltage.

5. The imaging device according to claim 1, wherein the second power voltage is lower than the first power voltage.

6. The imaging device according to claim 1, wherein the circuitry includes:
a first terminal;
a second terminal; and
a plurality of resistive elements between the first terminal and the second terminal, wherein
each resistive element of the plurality of resistive elements is connected to one another in series,
the second terminal is grounded, and
the circuitry is further configured to generate the first reference voltage based on a voltage in at least one resistive element of the plurality of resistive elements.

7. The imaging device according to claim 6, wherein the first terminal is configured to receive a supply of the first power voltage.

8. The imaging device according to claim 6, wherein the circuitry is further configured to:
generate a standard voltage based on the first power voltage; and
supply the standard voltage to the first terminal.

9. The imaging device according to claim 1, further comprising a first power terminal configured to receive a supply of the first power voltage, wherein a distance between the first power terminal and the circuitry that generates the first reference voltage is smaller than a distance between the first power terminal and the pixel array.

10. The imaging device according to claim 1, further comprising a second power terminal configured to receive a supply of the second power voltage is configured to be supplied, wherein a distance between the second power terminal and the circuitry that generates the first flag signal is smaller than a distance between the second power terminal and the pixel array.

11. The imaging device according to claim 1, wherein the circuitry is further configured to:
generate a second reference voltage based on the first power voltage;
compare the second power voltage with the second reference voltage; and
generate the first flag signal.

12. The imaging device according to claim 11, wherein the circuitry is further configured to:
set the first flag signal to a first logical level indicating an error in a case where the second power voltage is higher than the second reference voltage; and
set a voltage of the first flag signal to a second logical level in a case where the second power voltage is lower than the second reference voltage.

13. The imaging device according to claim 1, wherein the circuitry is further configured to:
generate power voltage data corresponding to the first power voltage;
compare the power voltage data with reference data; and
generate a second flag signal for the first power voltage.

14. The imaging device according to claim 13, wherein the circuitry is further configured to:
perform AD conversion based on a voltage value of the first power voltage; and
generate the power voltage data based on the AD conversion.

15. The imaging device according to claim 14, wherein the circuitry is further configured to:
convert a result of the AD conversion into data having a determined code system; and
generate the power voltage data based on the data.

16. An imaging system, comprising:
an imaging device that is mountable in a vehicle, wherein the imaging device is configured to image an area around the vehicle to generate an image; and
a processing device that is mountable in the vehicle, wherein
the processing device is configured to execute a process to control the vehicle based on the image, and
the imaging device includes circuitry configured to:
perform an imaging operation to generate image data, wherein the generation of the image data is based on a first power voltage;
perform image processing on the image data based on a second power voltage;
generate a first reference voltage based on the first power voltage;
compare the second power voltage with the first reference voltage;
generate a first flag signal for the second power voltage based on the comparison of the second power voltage with the first reference voltage; and
output the first flag signal.

17. An imaging method, comprising:
in an imaging device comprising a pixel array:
generating, by the pixel array, image data by an imaging operation, wherein the generation of the image data is based on a first power voltage;
performing image processing on the image data based on a second power voltage;
generating a first reference voltage based on the first power voltage;
comparing the second power voltage with the first reference voltage;
generating a first flag signal for the second power voltage based on the comparison of the second power voltage with the first reference voltage; and
outputting the first flag signal.

* * * * *